US009167407B2

(12) United States Patent
Holman et al.

(10) Patent No.: US 9,167,407 B2
(45) Date of Patent: *Oct. 20, 2015

(54) SYSTEMS AND METHODS FOR COMMUNICATING BEYOND COMMUNICATION RANGE OF A WEARABLE COMPUTING DEVICE

(71) Applicant: Elwha LLC, Bellevue, WA (US)

(72) Inventors: Pablos Holman, Seattle, WA (US);
Roderick A. Hyde, Redmond, WA (US);
Royce A. Levien, Lexington, MA (US);
Richard T. Lord, Tacoma, WA (US);
Robert W. Lord, Seattle, WA (US);
Mark A. Malamud, Seattle, WA (US);
Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/043,395

(22) Filed: Oct. 1, 2013

(65) Prior Publication Data

US 2015/0031286 A1    Jan. 29, 2015

Related U.S. Application Data

(63) Continuation-in-part of application No. 13/950,926, filed on Jul. 25, 2013, and a continuation-in-part of application No. 13/962,373, filed on Aug. 8, 2013, which is a continuation of application No. 13/961,187, (Continued)

(51) Int. Cl.
*H04B 7/00* (2006.01)
*H04W 8/00* (2009.01)

(Continued)

(52) U.S. Cl.
CPC .............. *H04W 8/005* (2013.01); *H04B 1/385* (2013.01); *H04W 4/008* (2013.01); *H04W 16/26* (2013.01); *H04W 76/02* (2013.01)

(58) Field of Classification Search
CPC ......... H04B 1/385; H04B 7/26; H04W 4/008; H04W 8/005
USPC ................. 455/41.1, 41.2, 63.4, 66.1, 550.1, 455/556.1, 551, 134, 135, 334
See application file for complete search history.

(56) References Cited

U.S. PATENT DOCUMENTS 6,711,414 B1   3/2004  Lightman et al.
6,771,224 B2   8/2004  Apostolos (Continued)

OTHER PUBLICATIONS

PCT International Search Report; International App. No. PCT/US2014/048167; Nov. 4, 2014; pp. 1-3.

(Continued)

*Primary Examiner* — Tuan Pham

(57) ABSTRACT

Computationally implemented methods and systems include determining presence of one or more external linking devices within communication range of a wearable computing device designed to be worn by a person, the determining being based, at least in part, on one or more signals transmitted by the one or more external linking devices and received by the wearable computing device, and the one or more external linking devices designed to communicate beyond the communication range of the wearable computing device, and directing the wearable computing device to communicate beyond the communication range via at least one of the one or more external linking devices that were determined to be within the communication range of the wearable computing device. In addition to the foregoing, other aspects are described in the claims, drawings, and text.

39 Claims, 37 Drawing Sheets

Related U.S. Application Data filed on Aug. 7, 2013, application No. 14/043,395, which is a continuation-in-part of application No. 14/017,693, filed on Sep. 4, 2013, which is a continuation of application No. 14/014,882, filed on Aug. 30, 2013.

(51) Int. Cl.
*H04W 4/00* (2009.01)
*H04B 1/3827* (2015.01)
*H04W 16/26* (2009.01)
*H04W 76/02* (2009.01)

(56) References Cited

U.S. PATENT DOCUMENTS

| | | | |
|---|---|---|---|
| 6,995,723 | B1 | 2/2006 | Adams |
| 7,500,747 | B2 | 3/2009 | Howell et al. |
| 7,715,873 | B1* | 5/2010 | Biere et al. .................... 455/557 |
| 7,929,914 | B2 | 4/2011 | Tegreene |
| 8,184,983 | B1 | 5/2012 | Ho et al. |
| 8,340,658 | B2 | 12/2012 | Tsui et al. |
| 8,430,310 | B1 | 4/2013 | Ho et al. |
| 8,442,542 | B2 | 5/2013 | Brisebois et al. |
| 8,489,546 | B2 | 7/2013 | Rappaport |
| 8,493,353 | B2 | 7/2013 | Blanchflower et al. |
| 8,493,849 | B2 | 7/2013 | Fuste Vilella et al. |
| 2002/0142734 | A1 | 10/2002 | Wickstead |
| 2009/0069045 | A1 | 3/2009 | Cheng |
| 2012/0194399 | A1 | 8/2012 | Bily et al. |
| 2012/0195464 | A1 | 8/2012 | Ahn |
| 2012/0250615 | A1 | 10/2012 | Gupta et al. |
| 2013/0044130 | A1* | 2/2013 | Geisner et al. ................ 345/633 |
| 2013/0080616 | A1 | 3/2013 | Tsui et al. |
| 2013/0165138 | A1 | 6/2013 | Bahl et al. |
| 2014/0241540 | A1* | 8/2014 | Hodges et al. ................. 381/74 |
| 2015/0031286 | A1 | 1/2015 | Holman et al. |
| 2015/0031290 | A1* | 1/2015 | Holman et al. ............. 455/41.2 |
| 2015/0031291 | A1* | 1/2015 | Holman et al. ............. 455/41.2 |
| 2015/0031292 | A1* | 1/2015 | Holman et al. ............. 455/41.2 |
| 2015/0031293 | A1* | 1/2015 | Holman et al. ............. 455/41.2 |
| 2015/0031294 | A1* | 1/2015 | Holman et al. ............. 455/41.2 |
| 2015/0031295 | A1* | 1/2015 | Holman et al. ............. 455/41.2 |
| 2015/0031296 | A1* | 1/2015 | Holman et al. ............. 455/41.2 |
| 2015/0031297 | A1* | 1/2015 | Holman et al. ............. 455/41.2 |
| 2015/0031298 | A1 | 1/2015 | Holman et al. |
| 2015/0031299 | A1 | 1/2015 | Holman et al. |
| 2015/0031300 | A1 | 1/2015 | Holman et al. |
| 2015/0031301 | A1 | 1/2015 | Holman et al. |

OTHER PUBLICATIONS

Brown, Michael, "Meet 60GHz Wi-Fi, the insanely fast future of wireless networking," PC World, Mar. 6, 2013, 4 pages, http://www.pcworld.com/article/2030041/meet-60ghz-wi-fi-the-insanely-fast-future-of-wireless-networking .html.

Experton Group, "Bluetooth to Decide on 60GHZ Standard this Month," Experton Group, Apr. 19, 2010, 1 page, http://www.experton-group.com/nc/home/itnews/itnewsarticle/article/bluetooth-to-decide-on-60ghz-standard-this-month.html.

mmWAVES, "60GHz Wireless Technology Overview," 2013, 4 pages, http://www.mmwaves.com/products.cfm/product/20-194-0.htm, accessed Jul. 25, 2013.

Stevens et al., "White Paper: The Benefits of 60 GHz Unlicensed Wireless Communications," Dec. 2011, 10 pages, Sub10 Systems Limited, http://www.sub10systems.com/wp-content/uploads/2011/03/White-Paper-Benefits-of-60GHz.pdf.

University of California, Berkely, "60 GHz Short-Range Wireless Communication," Connectivity Lab, Feb. 2008, 1 page, http://connectivitylab.eecs.berkeley.edu/brochures/60ghz.pdf.

* cited by examiner

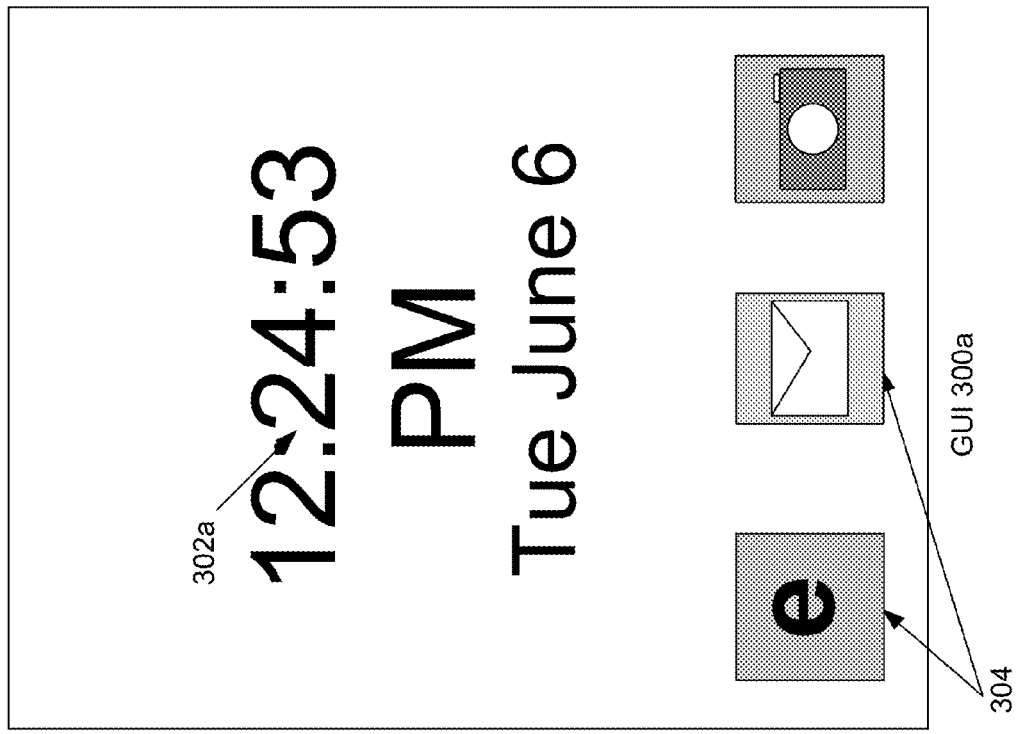

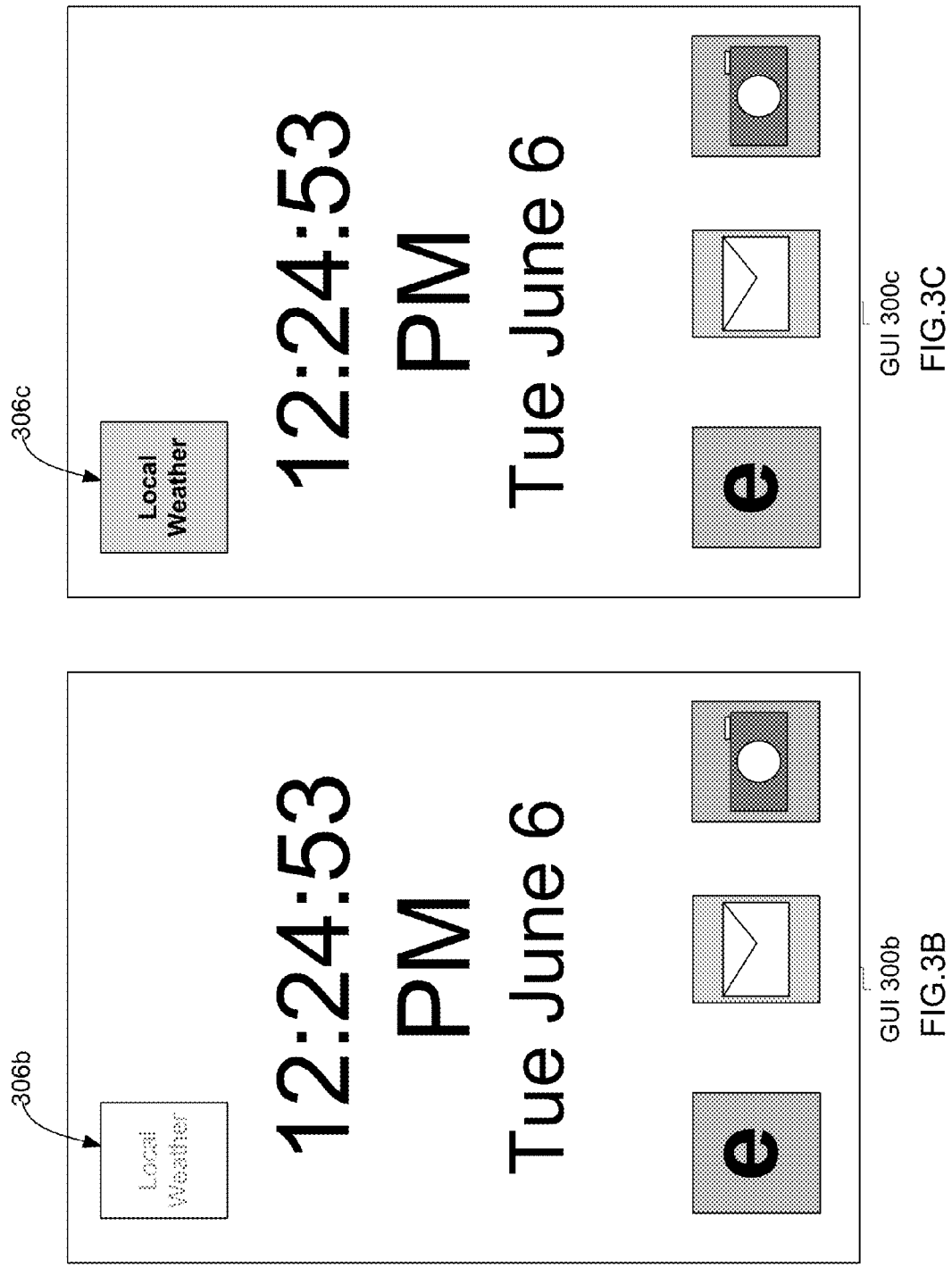

102\* External Linking Device Presence Ascertaining Module

502 Prompting Signal Broadcasting Device Controlling Module
 508 Transmitting Directional Antenna Controlling Module

504 Responsive Signal Ascertaining Module
 506 Responsive Signal Detecting Module

510 Beacon Signal Ascertaining Module
 512 Beacon Signal Strength Ascertaining Module

514 Nearest Device Ascertaining Module

516 Signal Strength Ascertaining Module

518 Least Power Requirement Device Ascertaining Module

520 Common User Associated Device Ascertaining Module
 522 Query Broadcasting Device Controlling Module

524 Communication Link Capable Device Ascertaining Module
 526 Communication Link Query Broadcasting Device Controlling Module
  530 Application Query Broadcasting Device Controlling Module
 528 Communication Link Confirmation Receiving Device Controlling Module

530 Receiving Directional Antenna Controlling Module

532 Receiving Omnidirectional Antenna Controlling Module

FIG. 5A

FIG. 8F (Start) → 604 Directing the wearable computing device to communicate beyond the communication range via at least one of the one or more external linking devices that were determined to be within the communication range of the wearable computing device 869 Directing the wearable computing device to communicate beyond the communication range via at least one of the one or more external linking devices that were determined to be within the communication range of the wearable computing device by selecting at least one external linking device from a plurality of external linking devices that were determined to be within the communication range of the wearable computing device for communicating beyond the communication range of the wearable computing device 870 Selecting the at least one external linking device from the plurality of external linking devices that were determined to be within the communication range of the wearable computing device by selecting, from the plurality of external linking devices, at least one external linking device that requires least amount of power to communicate with by the wearable computing device from amongst the plurality of external linking devices that were determined to be within the communication range of the wearable computing device 871 Selecting, from the plurality of external linking devices, the at least one external linking device that requires least amount of power to communicate with by the wearable computing device from amongst the plurality of external linking devices that were determined to be within the communication range of the wearable computing device by selecting, from the plurality of external linking devices, at least one external linking device that transmitted one or more signals that were received by the wearable computing device with greatest signal strength or strengths compared to the signal strength or strengths of one or more other signals received by the wearable computing device that were transmitted by one or more other external linking devices that were determined to be within the communication range of the wearable computing device 872 Selecting, from the plurality of external linking devices, the at least one external linking device that requires least amount of power to communicate with by the wearable computing device from amongst the plurality of external linking devices that were determined to be within the communication range of the wearable computing device by selecting, from the plurality of external linking devices, at least one external linking device that require least amount of power to successfully transmit data to by the wearable computing device from amongst the plurality of external linking devices that were determined to be within the communication range of the wearable computing device and that can be communicated with by the wearable computing device using one or more frequencies from a frequency band having a range between 57 GHz to 64 GHz → (End)

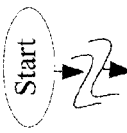

604 Directing the wearable computing device to communicate beyond the communication range via at least one of the one or more external linking devices that were determined to be within the communication range of the wearable computing device 869 Directing the wearable computing device to communicate beyond the communication range via at least one of the one or more external linking devices that were determined to be within the communication range of the wearable computing device by selecting at least one external linking device from a plurality of external linking devices that were determined to be within the communication range of the wearable computing device for communicating beyond the communication range of the wearable computing device 870 Selecting the at least one external linking device from the plurality of external linking devices that were determined to be within the communication range of the wearable computing device for communicating beyond the communication range of the wearable computing device by selecting, from the plurality of external linking devices, at least one external linking device that requires least amount of power to communicate with by the wearable computing device from amongst the plurality of external linking devices that were determined to be within the communication range of the wearable computing device 873 Selecting, from the plurality of external linking devices, the at least one external linking device that requires least amount of power to communicate with by the wearable computing device from amongst the plurality of external linking devices by selecting, from the plurality of external linking devices, the at least one external linking device based, at least in part, on responsive signals transmitted by the plurality of external linking devices in response to the external linking devices detecting one or more low-power prompting signals that were transmitted by the wearable computing device at different levels of transmit powers 874 Selecting, from the plurality of external linking devices, the at least one external linking device based, at least in part, on a determination that the at least one external linking device from the plurality of external linking devices responded earliest to one or more low-power prompting signals that were transmitted by the wearable computing device at incrementally increasing levels of transmit power, where the at least one external linking device responding to the one or more low-power prompting signals that were transmitted by the wearable computing device at incrementally increasing levels of transmit power by transmitting one or more responsive signals back to the wearable computing device

FIG. 8G (Start) →

604 Directing the wearable computing device to communicate beyond the communication range via at least one of the one or more external linking devices that were determined to be within the communication range of the wearable computing device 869 Directing the wearable computing device to communicate beyond the communication range via at least one of the one or more external linking devices that were determined to be within the communication range of the wearable computing device by selecting at least one external linking device from a plurality of external linking devices that were determined to be within the communication range of the wearable computing device for communicating beyond the communication range of the wearable computing device 875 Selecting the at least one external linking device from the plurality of external linking devices that were determined to be within the communication range of the wearable computing device for communicating beyond the communication range of the wearable computing device by selecting, from the plurality of external linking devices, at least one external linking device that was determined to provide earliest access to one or more communication links to beyond the communication range of the wearable computing device amongst the plurality of external linking devices 876 Selecting, from the plurality of external linking devices, the at least one external linking device that was determined to provide earliest access to one or more communication links to beyond the communication range of the wearable computing device amongst the plurality of external linking device by querying the at least one external linking device to provide one or more indications as to when the access to one or more communication links will be available for use by the wearable computing device 877 Selecting the at least one external linking device from the plurality of external linking devices that were determined to be within the communication range of the wearable computing device for communicating beyond the communication range of the wearable computing device by selecting, from the plurality of external linking devices, at least one external linking device that was determined to provide access to one or more communication links with highest data transfer rate to beyond the communication range of the wearable computing device amongst the plurality of external linking devices 878 Selecting, from the plurality of external linking devices, the at least one external linking device that was determined to provide access to one or more communication links with the highest data transfer rate to beyond the communication range of the wearable computing device amongst the plurality of external linking devices, the determination that the at least one external linking device provides access to one or more communication links that have the highest data transfer rate to beyond the communication range of the wearable computing device amongst the plurality of external linking devices is by querying the at least one external linking device to provide one or more indications as to the data transfer rate of the one or more communication links available through the at least one external linking device → (End)

FIG. 8H

SYSTEMS AND METHODS FOR COMMUNICATING BEYOND COMMUNICATION RANGE OF A WEARABLE COMPUTING DEVICE

PRIORITY APPLICATIONS

The present application constitutes a continuation-in-part of U.S. patent application Ser. No. 13/950,926, entitled SYSTEMS AND METHODS FOR PROVIDING ONE OR MORE FUNCTIONALITIES TO A WEARABLE COMPUTING DEVICE WITH SMALL FORM FACTOR, naming Pablos Holman, Roderick A. Hyde; Royce A. Levien; Richard T. Lord; Robert W. Lord; Mark A. Malamud; Clarence T. Tegreene as inventors, filed 25 Jul. 2013, which is currently co-pending or is an application of which a currently co-pending application is entitled to the benefit of the filing date.

The present application constitutes a continuation-in-part of U.S. patent application Ser. No. 13/962,373, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 8 Aug. 2013, which is currently co-pending or is an application of which a currently co-pending application is entitled to the benefit of the filing date, and which is a continuation of U.S. patent application Ser. No. 13/961,187, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 7 Aug. 2013.

The present application constitutes a continuation-in-part of U.S. patent application Ser. No. 14/017,693, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 4 Sep. 2013, which is currently co-pending or is an application of which a currently co-pending application is entitled to the benefit of the filing date, and which is a continuation of U.S. patent application Ser. No. 14/014,882, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 30 Aug. 2013.

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device, and directing the wearable computing device to communicate beyond the communication range via at least one of the one or more external linking devices that were determined to be within the communication range of the wearable computing device. In some implementations, at least one of the determining or directing being performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device, and means for directing the wearable computing device to communicate beyond the communication range via at least one of the one or more external linking devices that were determined to be within the communication range of the wearable computing device. In addition to the foregoing, other system aspects are described in the claims, drawings, and text forming a part of the disclosure set forth herein.

In one or more various aspects, a system includes, but is not limited to, circuitry for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device, and circuitry for directing the wearable computing device to communicate beyond the communication range via at least one of the one or more external linking devices that were determined to be within the communication range of the wearable computing device. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device, directing the wearable computing device to communicate beyond the communication range via at least one of the one or more external linking devices that were determined to be within the communication range of the wearable computing device, and operating the wearable computing device to present one or more results of the communication beyond the communication range using the at least one of the one or more external linking devices. In addition to the foregoing, other computer program product aspects are described in the claims, drawings, and text forming a part of the disclosure set forth herein.

In one or more various aspects, a system includes, but is not limited to, an external linking device presence ascertaining module configured to ascertain presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the external linking device presence ascertaining module ascertaining the presence of the one or more external linking devices within the communication range of a wearable computing device based, at least in part, on one or more signals transmitted by the one or more external linking devices and received by the wearable computing device, and the one or more external linking devices designed to communicate beyond the communication range of the wearable computing device; a communicating device controlling module configured to control the wearable computing device to communicate beyond the communication range via using at least one of the one or more external linking devices that were determined to be within the communication range of the wearable computing device; and a presenting device controlling module configured to control the wearable computing device to present one or more results of the communication beyond the communication range using the at least one of the one or more external linking devices.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3A shows an exemplary Graphical User Interface (GUI) that may be displayed by the wearable computing device 10* of FIGS. 1A, 1B, 1C, and 1D.

FIG. 3B shows another exemplary Graphical User Interface (GUI) that may be displayed by the wearable computing device 10* of FIGS. 1A, 1B, 1C, and 1D.

FIG. 3C shows another exemplary Graphical User Interface (GUI) that may be displayed by the wearable computing device 10* of FIGS. 1A, 1B, 1C, and 1D.

FIG. 5A shows another perspective of the external linking device presence ascertaining module 102* of FIGS. 4A and 4B (e.g., the external linking device presence ascertaining module 102' of FIG. 4A or the external linking device presence ascertaining module 102" of FIG. 4B) in accordance with various implementations.

FIG. 8F is a high-level logic flowchart of a process depicting alternate implementations of the communicating directing operation 604 of FIG. 6.

FIG. 8G is a high-level logic flowchart of a process depicting alternate implementations of the communicating directing operation 604 of FIG. 6.

FIG. 8H is a high-level logic flowchart of a process depicting alternate implementations of the communicating directing operation 604 of FIG. 6.

DETAILED DESCRIPTION

Figure 1A:
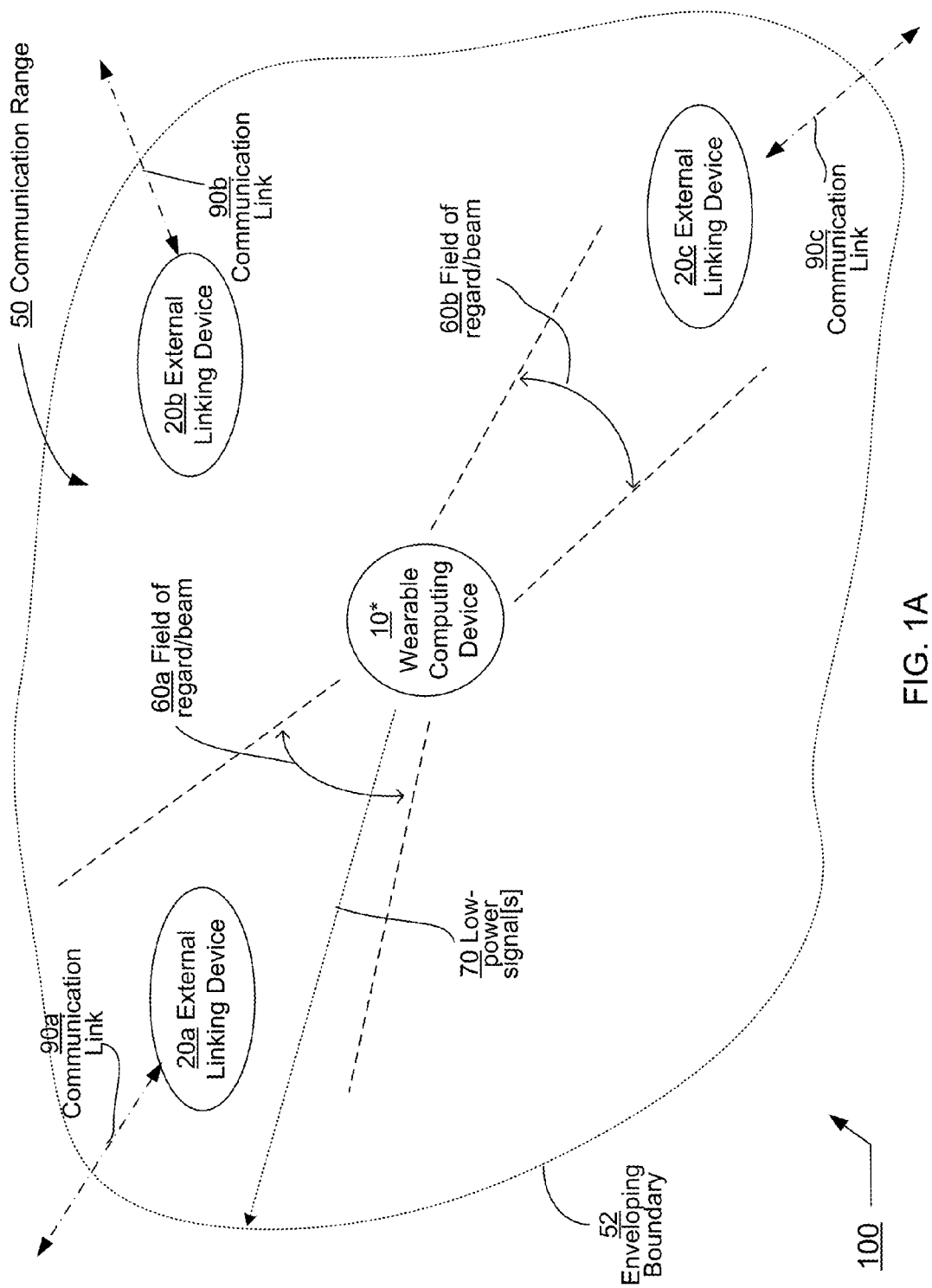
FIG. 1A is a high-level block diagram of one perspective of an example wearable computing device 10* operating in an exemplary environment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per-_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The rapid advancement and miniaturization of integrated circuitry and microelectronics over the last three decades have greatly facilitated those in the mobile computing industry to develop functionally powerful computing/communication devices, from the original clunky brick-sized portable telephones to today's sleek cellular telephones and Smartphones, and from yesterday's bulky laptops to today's slim tablet computers and e-readers. One recent trend in the evolution of mobile computing is the development of wearable computing devices. That is, there are currently multiple efforts by various high-tech groups to develop computing/communication devices in the form of wearable computing devices. Such devices having very small form-factors that are designed to be worn by people and that will supposedly be able to provide various functionalities beyond simple time/chronograph functionalities including, for example, at least some communication capabilities (e.g., connectivity to Wi-Fi or cellular networks) and capabilities for executing applications (e.g., software programs). Examples of such wearable computing devices include, for example, augmented reality (AR) devices having the form of glasses or goggles (herein "computing glasses"), and computerized watches (herein "computing watches" or "Smartwatches")

Although the recent advancements in the fields of integrated circuitry and microelectronics (e.g., microprocessors) make the eventual implementation of wearable computing devices a likely inevitability, developers of such devices still face a number of hurdles that may prevent such devices from being able to provide the same type of functionalities that larger mobile devices (e.g., Smartphones, tablet computers, and so forth) can provide. One of the problems faced by developers of wearable computing devices is to try to cram into such small form-factor devices all of the components that may be necessary in order to provide the same functionalities provided by larger mobile devices. That is, because a wearable computing device (e.g., an AR device or a Smartwatch) is designed to be worn by a user, it is generally preferable that such devices have relatively small form-factors and be relatively lightweight. As a result, such a device may only accommodate a small and/or limited number of core components including a power storage device (e.g., batteries) that is relatively small (and as a result, with limited power storage capabilities) and light, and a relatively small communication system (e.g., a communication system that employs a small and/or limited number of antennas).

For example, and in contrast, larger mobile devices such as Smartphones and tablet computers typically have multiple antennas for various functionalities including, for example, an antenna for global positioning system (GPS), an antenna for Wi-Fi connectivity, and an antenna for cellular network connectivity. It may not be practical, if not impossible, to include multiple antennas into a small form-factor wearable computing device such as a computing watch or computing glasses. Also, because such wearable computing devices will be located somewhere on or adjacent to the body of a user, it will be generally desirable to employ a communication system that emits relatively low electromagnetic radiation at least towards the user's body.

In various embodiments, systems, articles of manufacture and methods are provided herein that allow a wearable computing device to have an extremely small form-factor while seamlessly providing the ability to communicate beyond the normal or maximum communication range of the wearable computing device, the wearable computing device having very limited communication range in order to minimize the size of its communication components (e.g., a relatively small antenna) and to minimize power consumption requirements during communication operations. For these embodiments, a wearable computing device may be a computing device designed to be coupled to at least a portion (e.g., a limb or head) of a user and that has a relatively small form factor so that it can be comfortably worn by the user. Examples of a wearable computing device include, for example, a computing watch or computing glasses/goggles (e.g., augmented reality device or simply "AR" device). These wearable computing devices may include one or more components (e.g., eyeglass frame or wristband, or a clip to couple to a frame of a pair of glasses or a pin to couple to a wristband) to facilitate coupling the wearable computing device to at least a portion of a user's body.

In order to provide the same or similar communication capabilities provided by larger mobile devices (e.g. Smartphones, tablet computers, and so forth), the wearable computing device, in accordance with various embodiments, may be designed to "borrow" communication functionalities from one or more nearby "external linking devices" (e.g., Smartphones, tablet computers, workstations, access points, and so forth) that are near the wearable computing device within the extremely limited communication range of the wearable computing device. In various embodiments, and for purposes of the following description, an external linking device is a computing/communication device that is located within a very limited communication range of the wearable computing device and that is designed to communicate with the wearable computing device as well as to beyond the communication range of the wearable computing device. Thus, in essence, an external linking device may be considered as a communication bridge for the wearable computing device to communicate beyond the normal communication range of the wearable computing device. The communication range of a wearable computing device is a spatial volume that includes the wearable computing device and being externally defined by an enveloping boundary, where low-power signals (e.g., wireless signals transmitted with less than 0.8 milliwatt of transmit power) transmitted by the wearable computing device being discernible over background noise within the enveloping boundary and not discernible over background noise outside the enveloping boundary.

In order to minimize the power requirements for communicating with nearby external linking devices, the wearable computing device may be designed to communicate with the nearby external linking devices using a directional antenna, such as a metamaterial antenna, to transmit low-power signals (e.g., less than 1 milliwatt of transmit power). In some embodiments, the employment of a directional antenna rather than other types of antennas (e.g., omnidirectional antenna) to communicate with nearby external linking devices may provide certain advantages including reducing power requirements for communicating with the nearby external linking devices and minimizing the amount of electromagnetic (EM) radiation that the user of the wearable computing device may be exposed to by directing EM radiation away from the user.

In various embodiments, the systems, articles of manufacture and methods may be designed to, among other things, determine presence of one or more external linking devices within communication range of a wearable computing device designed to be worn by a person; direct the wearable computing device to communicate beyond the communication range via at least one of the one or more external linking devices that were determined to be within the communication range of the wearable computing device; and/or operate the wearable computing device to present one or more results of the communication beyond the communication range using the at least one of the one or more external linking devices.

Referring now to FIG. 1A, which is a block diagram of a wearable computing device 10* operating in an exemplary environment 100 in in accordance with various embodiments. For ease of illustration and in order to facilitate understanding of various concepts to be introduced herein, the user (e.g., person) who is wearing/using the wearable computing device 10* while the wearable computing device 10* is operating will not be depicted in FIG. 1A (as well as FIGS. 1B, 1C, and 1D) even though the wearable computing device 10* may be actually designed to operate while being worn by a user. Note that in the following, "*" represents a wildcard. Thus, references in the following description to, for example, "wearable computing device 10*" may be in reference to the example wearable computing device 10* of FIG. 1A, as well as to the example wearable computing device 10' of FIG. 4A or to the wearable computing device 10" of FIG. 4B, which are two different implementations of the wearable computing device 10* of FIG. 1A (as well as of FIGS. 1B, 1C, and 1D).

In the illustrated environment 100, the wearable computing device 10* may employ a directional antenna or an omnidirectional antenna (e.g., antenna 130 in FIGS. 4A and 4B) in order to communicate with one or more external linking devices 20* (e.g., external linking device 20a, external linking device 20b, and/or external linking device 20c). If the wearable computing device 10* employs an omnidirectional antenna, then the process for communicating with the one or more external linking devices 20* by the wearable computing device 10* is fairly straightforward by simply making sure that the transmit power of the signals transmitted by the wearable computing device 10* is sufficiently high enough to ensure that the signals reach the one or more external linking devices 20*. If the wearable computing device 10*, on the other hand, employs a directional antenna such as metamaterial antenna, then the wearable computing device 10* may only communicate with the one or more external linking devices 20* by pointing the directional antenna to different portions of the environment 100. In particular, the wearable computing device 10* may communicate with the various external linking devices 20* by moving the field of regard/beam 60* (e.g., FIG. 1A shows a first field of regard/beam 60a and a second field of regard/beam 60b as a result of pointing the directional antenna at different directions) of the directional antenna of the wearable computing device 10* to scan the surrounding environment 100.

By convention, "field of regard" is sometimes used herein when describing an example wherein a directional antenna is likely to receive a signal while a "beam" is used herein when describing an example wherein a directional antenna is likely to transmit a signal. That is, a directional antenna when transmitting signals (e.g., transmitting electromagnetic radiation) will transmit the signals primarily towards one direction thus having greater gain then, for example, multi-directional antennas such as omnidirectional antennas or isotropic radiators (note that a gain is a measure of how much of the power is radiated in a given direction relative to other directions). The narrower the beamwidth of the emitted radiation, the greater the gain. When the same directional antenna is in receiving mode, it may be able to receive signals from the same direction that the directional antenna primarily radiates signals to. Thus, references in the following to "pointing the directional antenna" or similar such phrases may be in reference to steering or directing the field of regard/beam of the directional antenna to different portions of the surrounding environment. A more detailed discussion related to the "field of regard" and "beam" is provided in U.S. Pat. No. 7,929,914, which is hereby incorporated by reference.

In order to communicate with the one or more external linking devices 20* of FIG. 1A, the wearable computing device 10* may transmit one or more low-power signals 70 with limited transmission range (e.g., less than 30 feet) using a directional antenna (or an omnidirectional antenna). The range of the low-power signals 70 may define a communication range 50 that surrounds the wearable computing device 10*. From another perspective, the communication range 50 of the wearable computing device 10* may be a spatial volume that includes the wearable computing device 10* and that is externally defined by an enveloping boundary 52, where low-power signals 70 transmitted via the directional antenna (or by an omnidirectional antenna) being discernible over background noise within the enveloping boundary 52 and not discernible over background noise outside the enveloping boundary 52.

In various embodiments, references in the following to low-power signals may be in reference to wireless signals that may be transmitted using a directional antenna or a omnidirectional antenna with substantially less than 1 milliwatt of transmit power such as 0.5 milliwatt of transmit power. Note that the shape of the communication range 50 will not be spherical in most cases since the size and shape of the communication range 50 will be affected by environmental conditions (e.g., atmospheric conditions) and the presence of various objects in the environment (e.g., people, walls, chairs, etc.). Each of the external linking devices 20* (e.g., the external linking device 20a, the external linking device 20b, and the external linking device 20c) of FIG. 1A is illustrated as being able to communicate beyond the communication range 50 of the wearable computing device 10* via communication links 90a, 90b, or 90c. The illustrated communication links 90a, 90b, and 90c may be any one or more of a variety communication channels including, for example, Wireless Fidelity (Wi-Fi) links, cellular network links, Ethernet, optical communication links, and so forth.

Figure 1B:
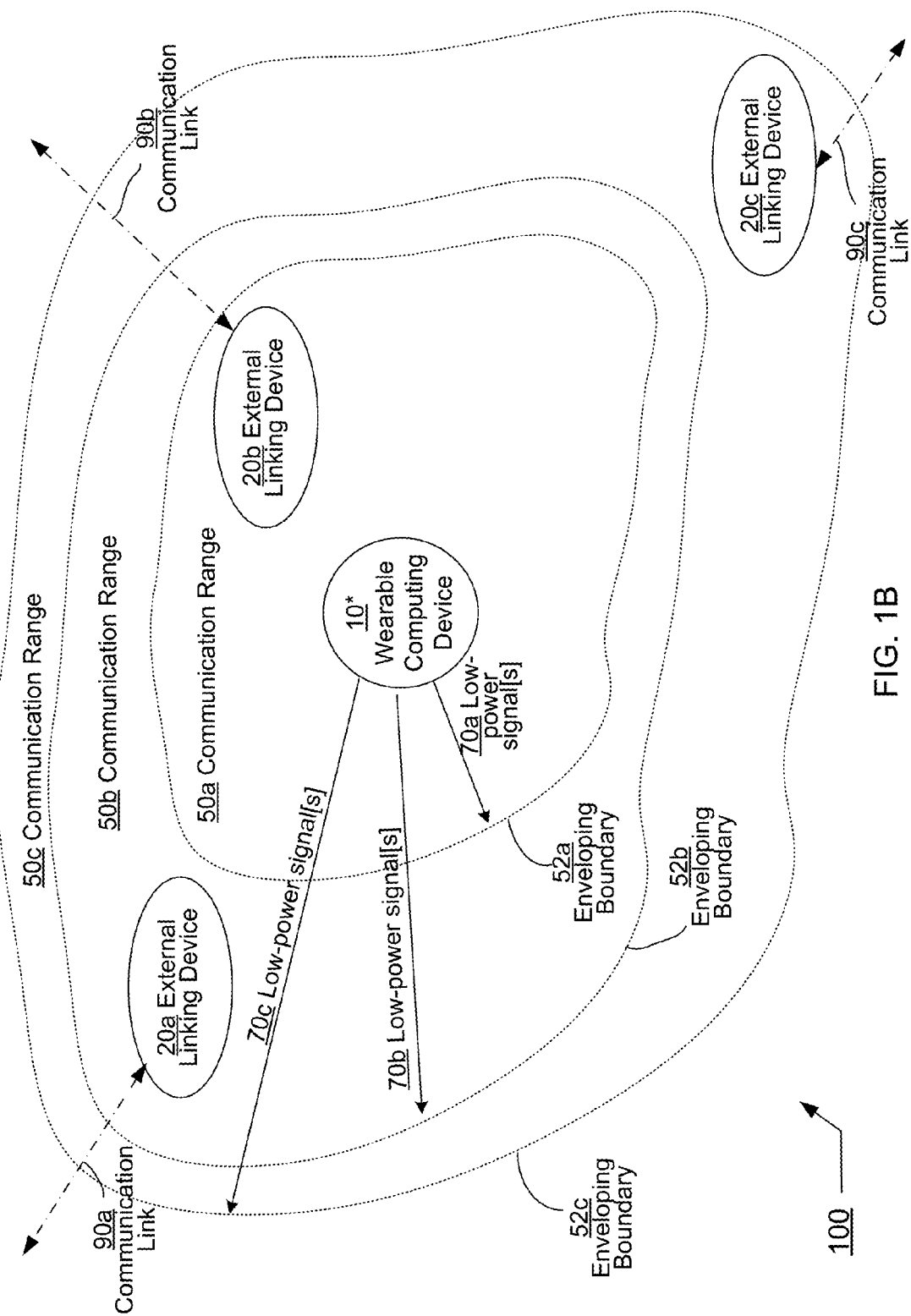
FIG. 1B is a high-level block diagram of another perspective of the example wearable computing device 10* operating in an exemplary environment.

Referring now to FIG. 1B, which illustrates another aspect of the wearable computing device 10* operating in the exemplary environment 100 of FIG. 1A in accordance with various embodiments. In FIG. 1B, the wearable computing device 10* is illustrated as transmitting low-power signals 70* (e.g., low power signals 70a, low-power signals 70b, and low-power signals 70c) at various levels of transmit powers in order to generate various sizes of communication ranges 50*. For example, the wearable computing device 10* may initially transmit one or more low-power signals 70a with a first transmit power (e.g., 0.1 milliwatt of transmit power) in order to create a first communication range 50a that surrounds the wearable computing device 10*. Because the first communication range 50a is relatively small, only external linking device 20b may be able to detect the one or more low-power signals 70a transmitted by the wearable computing device 10* and to respond to it when detected.

In order to increase the size of its communication range 50*, the wearable computing device 10* may then transmit one or more low-power signals 70b with a second transmit power (e.g., 0.2 milliwatt of transmit power) in order to create a second communication range 50b that surrounds the wearable computing device 10*. Because the second communication range 50b is bigger than the first communication range 50a, both external linking device 20a and external linking device 20b may be able to detect the one or more low-power signals 70b transmitted by the wearable computing device 10* and to respond to it when detected. In order to further increase the size of its communication range 50*, the wearable computing device 10* may then further transmit one or more low-power signals 70c with a third transmit power (e.g., 0.3 milliwatt of transmit power) in order to create a third communication range 50c that surrounds the wearable computing device 10*. Because the third communication range 50c is even bigger than the second communication range 50b, external linking devices 20a and 20b, as well as external linking device 20c may be able to detect the one or more low-power signals 70c transmitted by the wearable computing device 10* and to respond to it when detected.

There are at least two ways to determine whether there are any external linking devices 20* within a communication range[s] 50* of the wearable computing device 10* and/or which external linking devices 20* that are detected within the communication range 50* of the wearable computing device 10* is or are nearest to the wearable computing device 10* (e.g., which external linking devices 20* requires the least or less power to communicate with by the wearable computing device 10*). The first possible way is to measure the signal strengths of beacon signals received by the wearable computing device 10* and transmitted by each of the external linking devices 20*. That is, if each of the external linking devices 20* transmits beacon signals that were originally transmitted with known transmit power or powers, then by detecting the signal strengths of the beacon signals upon being received by the wearable computing device 10*, a determination can be made as to which of the external linking devices 20* are in the communication range 50* of the wearable computing device 10* (e.g., within the communication range of the wearable computing device 10*) and/or which of the external linking devices 20* are nearest to the wearable computing device 10* (as well as the amount of power needed by the wearable computing device 10* in order to communicate with such devices). That is, the amount of transmit power needed by the wearable computing device 10* in order to communicate with the one or more external linking devices 20* may be determined based on the detected signal strengths of the beacon signals received by the wearable computing device 10*. That is, the stronger the signal strength of the beacon signals received by the wearable computing device 10* (which suggests that the external linking device[s] 20* that transmitted the beacon signals are relatively close), the less transmit power will be needed by the wearable computing device 10* in order to successfully communicate with the external linking device[s] that transmitted the beacon signals.

A second way of determining which external linking devices 20* are within communication range[s] 50* of the wearable computing device 10* and/or which of the external linking devices 20* that are detected near the wearable computing device 10* are nearest to the wearable computing device 10* is by having the wearable computing device 10* to transmit one or more low-power "prompting" signals at various levels of low transmission power and wait to see if any of the external linking devices 20* respond to the prompting signals after each transmission of the prompting signals at each level of low transmission power. For example, the wearable computing device 10* may initially transmit first prompting signals at a very low transmit power (0.1 milliwatt of transmit power) that are designed to, upon being received/detected by an external linking device 20*, prompt the external linking device 20* to transmit back to the wearable computing device 10* one or more responsive signals. After the transmission of the first prompting signals, the wearable computing device 10* may monitor for the one or more responsive signals in order to determine whether any external linking devices 20* are nearby.

If the wearable computing device 10* does not detect any responsive signals from an external linking device 20* and/or if there is a need to find more external linking devices 20* (that may be further away from the wearable computing device 10*) then the wearable computing device 10* may repeat the above process by transmitting a second prompting signal at a higher transmit power (e.g., 0.2 milliwatt of transmit power) than the first prompting signal and then monitoring for responsive signals. This process may then be repeated over and over again for incrementally higher transmit powers in order to determine whether there are any external linking devices 20* near the wearable computing device 10* within different communication ranges 50* of the wearable computing device 10*, to determine the amount of power needed to communicate with those external linking devices 20* found nearby, and/or to determine which external linking devices 20* are nearest to the wearable computing device 10* when multiple external linking devices 20* are located nearby. In some cases, this process of transmitting prompting signals and monitoring for responsive signals may be part of a handshaking protocol.

In some embodiments, two different processes may be executed in order for the wearable computing device 10* to communicate beyond the communication range 50* using at least one of one or more external linking devices 20* that are located within the communication range 50* of the wearable computing device 10*. The first process involves determining whether there are any external linking devices 20* located within a communication range 50* of the wearable computing device 10*. The second process involves determining which, if any, of the one or more external linking devices 10* that are detected within the communication range 50* of the wearable computing device 10* should be used by the wearable computing device 10* for communicating beyond the communication range 50* of the wearable computing device 10*. Such an operation may actually involve making one or more specific determinations including, for example, determining which nearby external linking device 20* provides a communication link 90* that is a preferred Ethernet link rather than a cellular network link, which nearby external linking device 20* provides the communication link 90* with the highest data rates and/or provides earliest access to a communication link 90*, and so forth. Note that it may be possible to combine these two processes (e.g., the process for determining whether there are any external linking device 20* located within the communication range 50* of the wearable computing device 10* and the process for determining which, if any, of one or more external linking devices 20* that are detected within the communication range 50* should be used for communicating beyond the communication range 50* of the wearable computing device 10*) into a single process in various alternative embodiments as will be described herein.

Figure 1C:
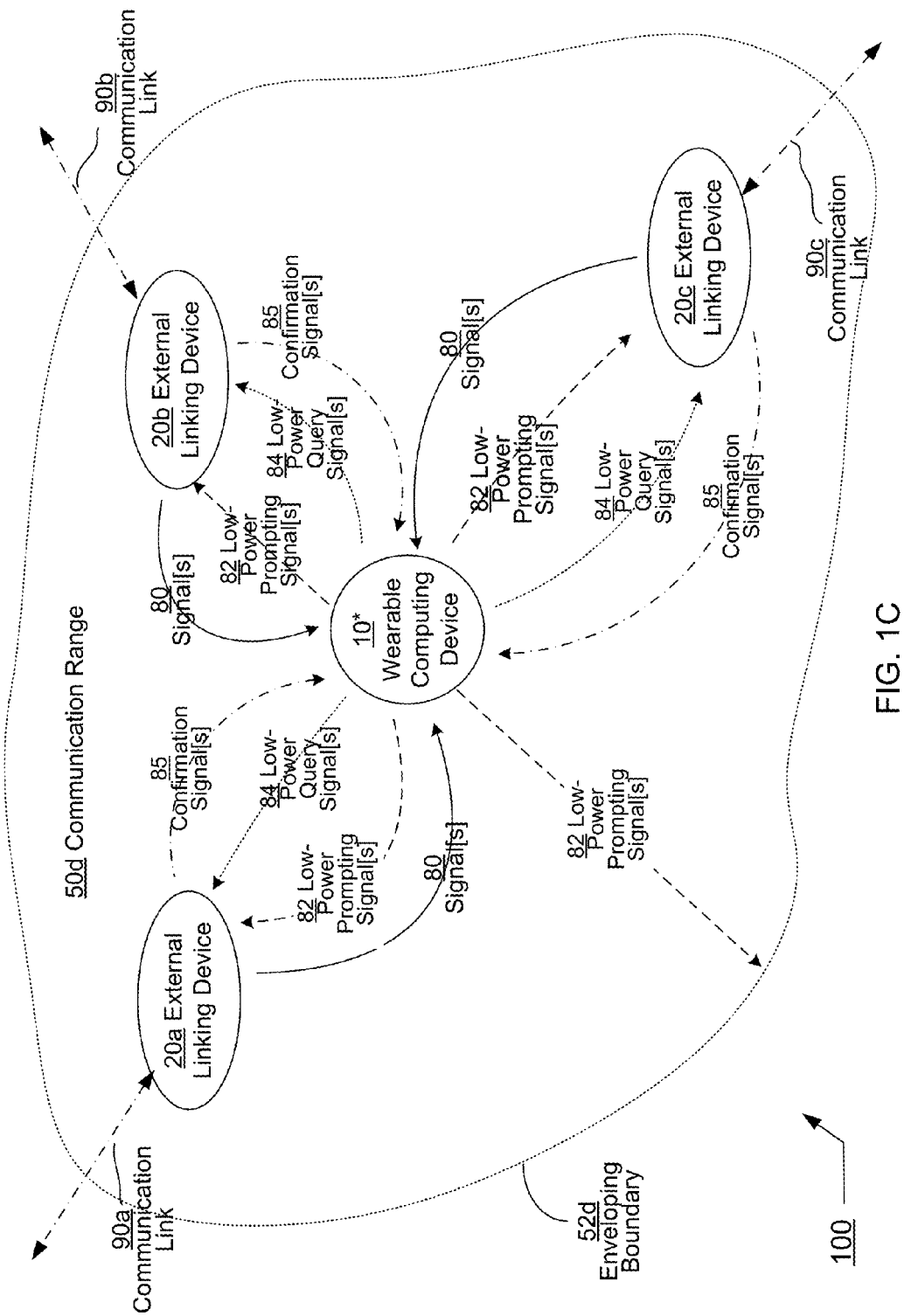
FIG. 1C is a high-level block diagram of still another perspective of the example wearable computing device 10* operating in an exemplary environment.

FIG. 1C illustrates how the wearable computing device 10* may communicate with at least one of one or more external linking devices 20* that are within the communication range 50d of the wearable computing device 10* in order to communicate beyond the communication range 50d of the wearable computing device 10* (note that in situations where multiple external linking devices 20* are detected within the communication range 50d of the wearable computing device 10*, only a subset of the external linking devices 20* detected within the communication range 50d may actually be used in order to communicate beyond the communication range 50d). As described previously, a communication range 50d of the wearable computing device 10* is a spatial volume that includes the wearable computing device 10* and that is externally defined (e.g., enclosed) by an enveloping boundary 52d, where low-power signals (e.g., signals transmitted with less than 0.5 or 0.8 milliwatt of transmit power) transmitted via an antenna 130 (e.g., directional or omnidirectional antenna) being discernible over background noise (e.g., noise as a result of background radiation) within the enveloping boundary 52d and not discernible over background noise outside the enveloping boundary 52d.

In various embodiments, in order to determine whether there are one or more external linking devices 20* within the communication range 50d of the wearable computing device 10*, the wearable computing device 10* through transceiver 118 and an antenna 130 (see FIG. 4A or 4B) may be controlled or directed to initially receive or capture one or more signals 80 transmitted by the one or more external linking devices 20*. In some embodiments, the one or more signals 80 that are received by wearable computing device 10* may be one or more beacon signals that were transmitted by the one or more external linking devices 20* with known amounts of transmit powers. In such cases, the signal strengths of the one or more beacon signals upon being received by the wearable computing device 10* may be ascertained in order to determine whether the one or more external linking devices 20* are within the communication range 50d of the wearable computing device 10*, to determine the amount of transmission power needed by the wearable computing device 10* to communicate with the one or more external linking devices 20*, and/or to determine which of the external linking devices 20* are nearest to the wearable computing device 10* (e.g., requires least amount of power to communicate with the wearable computing device 10*).

In alternative embodiments, the one or more signals 80 that are received by wearable computing device 10* may be one or more responsive signals that were transmitted by the one or more external linking devices 20* in response to the one or more external linking devices 20* receiving/detecting one or more low-power prompting signals 82 (e.g., signals designed to prompt an external linking device 20*, upon receiving/detecting the signals, to transmit responsive signals) broadcasted by the wearable computing device 10*. In some embodiments, by merely detecting the one or more responsive signals (e.g., one or more signals 80) transmitted by the one or more external linking devices 20*, a determination can be made that the one or more external linking devices 20* are within the communication range 50d of the wearable computing device 10*. If multiple external linking devices 20* transmit multiple responsive signals in respond to the one or more low-power prompting signals 82, then the wearable computing device 10* may determine which of the external linking devices 20* are nearest to the wearable computing device 10* based on the detected signal strengths of the responsive signals (e.g., signals 80). Note that shown at the bottom left side of FIG. 1C is one or more low-power promoting signals 82 that has a range only up to the edge (e.g., enveloping boundary 52d) of the communication range 50d.

In some embodiments, the wearable computing device 10* may be directed (or at least its components such as the transceiver 118) to transmit the one or more low-power prompting signals 82 at different levels of transmit powers. The wearable computing device 10* may then be directed (e.g., controlled, instructed, or configured) in order to monitor for responsive signals (e.g., one or more signals 80 of FIG. 1C) transmitted by the one or more external linking devices 20* in response to the one or more external linking devices 20* detecting the one or more low-power prompting signals 82 transmitted at varying levels of transmit powers. Such operations may be executed, in some cases, in order to see which external linking devices 20* are closest to the wearable computing device 10* based on how nearby external linking devices 20* respond to the prompting signals 82 transmitted by the wearable computing device 10* at varying transmit powers. That is, an inference may be made that those external linking devices 20* that respond to low-power prompting signals 82 that were transmitted by the wearable computing device 10* at relatively low transmit powers may be closer to the wearable computing device 10* (and thus requires less power to communicate with) than those external linking device 20* that respond only when the wearable computing device 10* transmits the low-power prompting signals 82 at relatively higher levels of transmit powers.

In some embodiments, the wearable computing device 10* (e.g., the components of the wearable computing device 10*) may be directed (e.g., controlled, instructed, or configured) to transmit one or more low-power query signals 84 to query each of the one or more external linking devices 20* that are near the wearable computing device 10* to provide certain information or confirmations that may be useful in determining which external linking device 20* should be used in order to provide to the wearable computing device 10* one or more communication links 90* to beyond the communication range 50* of the wearable computing device 10*. For example, in some cases, the low-power query signals 84 that may be transmitted to the one or more external linking device 20* may be transmitted in order to obtain confirmation (e.g., in the form of one or more confirmation signals 85) that the one or more external linking devices 20* can provide one or more communication links 90* for communicating beyond the communication range 50d. If the one or more external linking devices 20* can confirm that they can provide the one or more communication links 90*, then in various embodiments the one or more external linking devices 20* may transmit back to the wearable computing device 10* one or more confirmation signals 85 to confirm the availability of the one or more communication links 90* through the one or more external linking devices 20*.

Other types of information/confirmations may also be sought through the low-power query signals 84 as will be further described herein with respect to the process and operations to be described herein. For example, in some cases the low-power query signals 84 may be transmitted to the one or more external linking device 20* in order to, among other things, obtain one or more indications of one or more data transfer rates of the one or more communication links 90* available through the one or more external linking devices 20*, obtain indications of the types of communication links 90* available through the one or more external linking devices 20*, obtain indications as to when the one or more communication links 90* will become available for use by the wearable computing device 10*, and so forth.

In some embodiments, the above described processes for determining whether there are any external linking devices 20* within the communication range 50d of the wearable computing device 10* and the process for determining whether those external linking devices 20* detected as being within the communication range 50d can provide the one or more communication links 90* for communicating beyond the communication range 50d of the wearable computing device 10* can be combined into a single process. That is, in various alternative embodiments, the wearable computing device 10* may be directed to broadcast the low-power query signals 84 and then directed to monitor for one or more confirmation signals 85 transmitted by one or more external linking devices 20* in response to the one or more external linking devices 20* detecting the low-power query signals 84. If the wearable computing device 10* detects a confirmation signal 85 transmitted by an external linking devices 20*, then a determination can be made that the responding external linking device 20* associated with the confirmation signal 85 is within the communication range 50d of the wearable computing device 10* as well as, among other things, confirmation that the one or more responding external linking devices 20* can provide access to the one or more communication links 90* for communicating beyond the communication range 50d of the wearable computing device 10*.

Figure 1D:
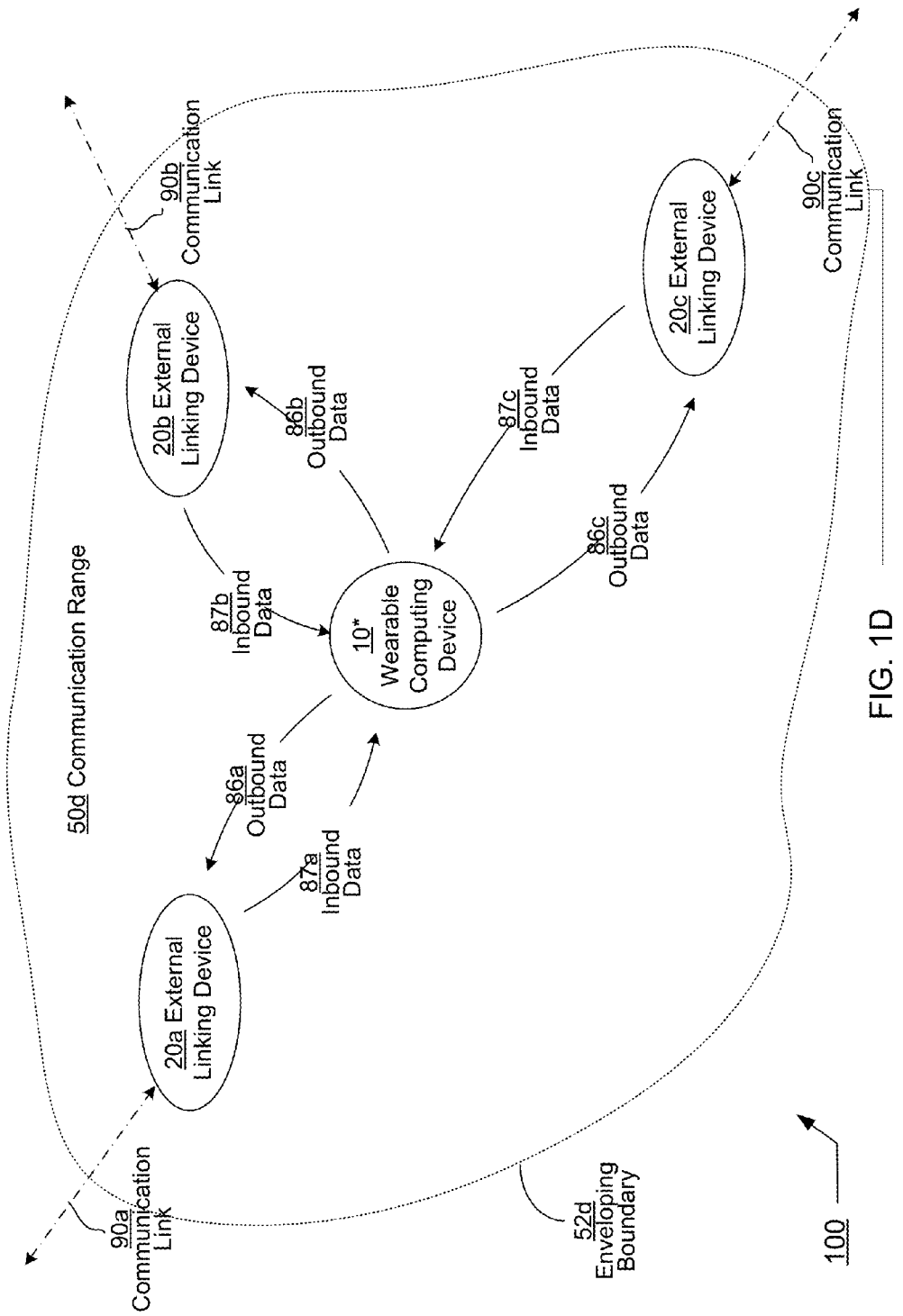
FIG. 1D is a high-level block diagram of yet another perspective of the wearable computing device 10* operating in an exemplary environment.

Turning now to FIG. 1D, which illustrates how the wearable computing device 10* may communicate beyond the communication range 50d of the wearable computing device 10* using one or more external linking devices 20*. In various embodiments, and as previous described, each of the one or more external linking devices 20* may be able to communicate beyond the communication range 50d of the wearable computing device 10* via communication link 90a, 90b, or 90c (e.g., Wi-Fi links, cellular network links, Ethernet, optical links, and so forth). In order to communicate beyond the communication range 50d, the wearable computing device 10* may in some embodiments transmit to the one or more external linking devices 20* outbound data 86* (e.g., outbound data 86a, outbound data 86b, and/or outbound data 86c). Alternatively or additionally, the wearable computing device 10* in order to communicate beyond the communication range 50* may receive inbound data 87* (e.g., inbound data 87a, inbound data 87b, and/or inbound data 87c) from beyond the communication range 50d via the one or more external linking devices 20*.

The outbound data 86* that may be transmitted by the wearable computing device 10* to beyond the communication range 50* via the one or more external linking devices 20* may include a variety of information/data in various alternative embodiments. For example, in various embodiments, the outbound data 86* may include one or more addresses such as URLs (uniform resource locators), one or more web-based application commands/requests, one or more electronic messages (e.g., telephone calls, emails text messages, instant messages, and so forth), and so forth. The outbound data 86* that may be transmitted by the wearable computing device 10* may be in the form of one or more low-power signals 70* (see FIG. 1A or 1B) transmitted with one or more frequencies from, for example, the 2.4 GHz frequency band (e.g., frequency range between 2.400 GHz and 2.4835 GHz), 5 GHz frequency band (e.g., frequency range between 5.180 GHz and 5.825 GHz), or 60 GHz frequency band (e.g., frequency range between 57 GHz and 64 GHz).

The inbound data 87* that may be received from beyond the communication range 50* via the one or more external linking devices 20* may also include a variety of information/data in various alternative embodiments. For example, in various embodiments, the inbound data 87* may include one or more electronic messages (e.g., telephone calls, emails text messages, instant messages, and so forth), one or more web-based application GUIs (graphical user interfaces), one or more results of executing one or more web-based applications, content from consumer media such as news or movies, and so forth. Additional discussions related to the outbound data 86* and the inbound data 87* will be provided below with respect to the processes/operations to be described herein.

Figure 2A:
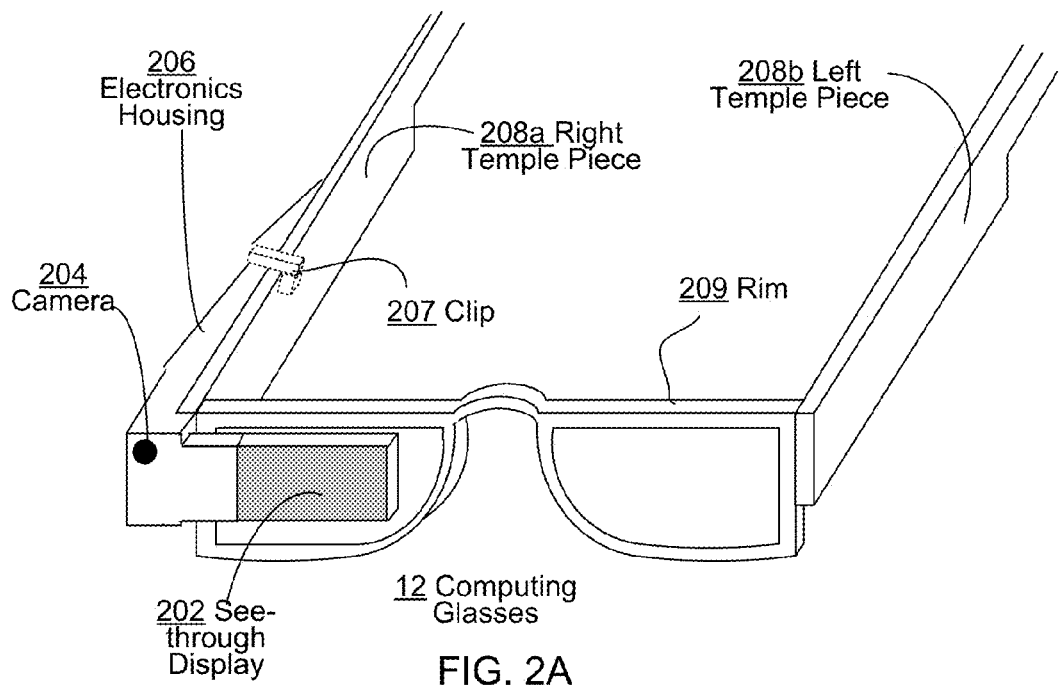
FIG. 2A shows exemplary computing glasses 12 that the example wearable computing device 10* of FIGS. 1A, 1B, 1C, and 1D may be in the form of in accordance with various embodiments.

FIG. 2A illustrates exemplary computing glasses 12, which is one form that the wearable computing device 10* of FIGS. 1A, 1B, 1C, and 1D (as well as FIG. 4A or 4B) may take on in accordance with various embodiments. The computing glasses 12, in various embodiments, may be an augmented reality (AR) system or device. The computing glasses 12 may comprise a see-through display 202, a camera 204, an electronic housing 206 (which houses the electronics), and/or a frame that comprises a right temple piece 208a, a left temple piece 208b, and a rim 209. The right temple piece 208a and the left temple piece 208b are designed to extend to and wrap around the ears of the user and to couple the computing glasses 12 to the head of the user. Note that in alternative implementations, the wearable computing device 10* may take on the form of computing goggles rather than computing glasses 12, where the computing goggles employ a "regular" display such as a light emitting diode (LED) display rather than a see-through display 202. Note further that in some cases, a wearable computing device 10* may comprise merely the electronic housing 206 and the electronics housed by the electronic housing 206, the see-through display 202, the camera 204, and a coupling component such as a clip 207 for coupling to a frame (e.g., the rim 209 and the right temple piece 208a and the left temple piece 208b). That is, the rim 209 and the right and left temple pieces 208* are optional and may not necessarily be required in various alternative embodiments.

Figure 2B:
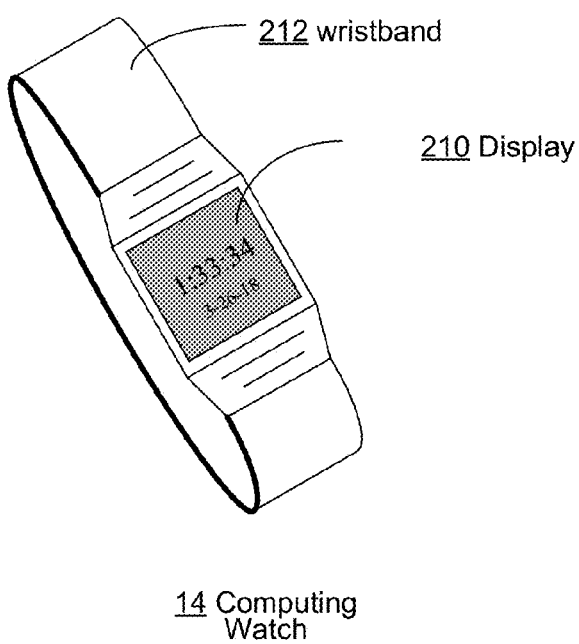
FIG. 2B shows an exemplary computing watch 14 that the example wearable computing device 10* of FIGS. 1A, 1B, 1C, and 1D may be in the form of in accordance with various embodiments.

FIG. 2B illustrates an exemplary computing watch 14, which is another form that the wearable computing device 10* of FIGS. 1A, 1B, 1C, and 1D (as well as FIG. 4A or 4B) may take on in accordance with various embodiments. The computing watch 14 includes at least a display 210 and a wristband 212 for wrapping around the wrist/arm of a user (e.g., coupling with the limb of the user). The display 210 may be a variety of displays including, for example, an LED display or liquid crystal display (LCD). In some embodiments, the wearable computing device 10* may comprise merely the watch portion of the computing watch 14 without the wristband 212 and one or more coupling components that couples with the wristband 212 (e.g., the wristband 212 portion of the computing watch is optional). Note that both forms of the wearable computing device 10* illustrated, for example, in FIGS. 2A and 2B (e.g., computing glasses 12 or computing watch 14) include one or more components (e.g., the right temple piece 208a, the left temple piece 208b, and the rim 209 of the computing glasses 12, a clip 207 of the computing glasses 12, or the wristband 212 of the computing watch 14) to facilitate coupling the wearable computing device 10* to at least a portion of a user's body.

In some embodiments, the wearable computing device 10* may employ only a single directional antenna 130 (see FIG. 4A or 4B) that may be used to communicate with one or more nearby external linking devices 20*. In various embodiments, the antenna 130 that may be employed may be an omnidirectional antenna, or alternatively, a directional antenna such as a metamaterial antenna (see, for example, U.S. Patent Application Pub. No. 2012/0194399, which is hereby incorporated by reference).

In various embodiments, the wearable computing device 10* may wirelessly communicate with one or more external linking devices 20* that are located within communication range 50* of the wearable computing device 10* via one or more low-power wireless signals having one or more frequencies from at least one of a variety of frequency bands. For example, in some embodiments, the wearable computing device 10* may communicate with nearby external linking devices 20* via one or more signals 80 having one or more frequencies from the 2.4 GHz industrial, scientific and medical (ISM) frequency band, which has a frequency range from 2.4 GHz to 2.4835 GHz. Alternatively, the wearable computing device 10* may communicate with nearby external linking devices 20* via one or more signals 80 having one or more frequencies from the 5 GHz ISM frequency band or the 5 GHz U-NII (Unlicensed National Information Infrastructure) frequency band with a frequency range between 5.180 GHz and 5.825 GHz. In still other alternative embodiments, the wearable computing device 10* may communicate with nearby external linking devices 20* via one or more signals 80 having one or more frequencies from the 60 GHz band (e.g., millimeter waveband or mmWave band with a frequency range between 57 and 64 GHz (U.S) or between 57 and 66 GHz (Japan and Europe)).

Note that the 60 GHz frequency band provides certain advantages over the other two frequency bands. For example, signals from the 60 GHz frequency band tend to attenuate very quickly in nominal environmental conditions (e.g., gets easily absorbed by materials, moisture, etc.) and therefore when used for communicating by the wearable computing device 10* may cause the communication range 50* of the wearable computing device 10* to be relatively small (which may be desirable in some cases in order to avoid overlapping with adjacent communication ranges of other devices). Further, higher data rates are possible using the 60 GHz frequency band rather than the two lower frequency bands (2.4 GHz frequency band and the 5 GHz frequency band).

In various embodiments, a communication range 50* that envelopes a wearable computing device 10* may be a spatial volume that includes the wearable computing device 10* and that is externally defined or enclosed by an enveloping boundary 52*, where low-power wireless signals generated by the wearable computing device 10* being discernible over background noise (e.g., background electromagnetic radiation noise) within the enveloping boundary 52* and not discernible over background noise outside the enveloping boundary 52*. In various embodiments, references in the following to "low-power signals" may be in reference to wireless signals that were transmitted using less than 1 milliwatt of transmitting power. In some cases, low-power signals 70* (see FIG. 1A or 1B) may be, for example, wireless signals that were transmitting with 0.8 milliwatt, 0.5 milliwatt, 0.3 milliwatt, or less than 0.3 milliwatt of transmit power.

In various embodiments, the low-power signals 70* that may define the enveloping boundary 52* of a communication range 50* may be the maximum low-power wireless signals that may be allowed to be transmitted by the wearable computing device 10*. That is, in order to keep the size of a communication range 50* of the wearable computing device 10* relatively small and to keep power consumption relatively low, the logic endowed in the wearable computing device 10* may restrict the transmission power of wireless signals transmitted by the wearable computing device.

Turning now to FIGS. 3A, 3B, and 3C, which illustrate exemplary graphical user interfaces (GUIs) that the wearable computing device 10* may present through a display (e.g., liquid crystal display) when the wearable computing device 10* is in the form of a computing watch 14. Turning particularly now to FIG. 3A, which illustrates an exemplary GUI 300a that includes three icons 304 representing three different applications that may be available through the wearable computing device 10*. Note that at least some of the applications (e.g., browser or email application) that may be provided through the wearable computing device 10* may only be available only if the wearable computing device 10* is able to communicate beyond the communication range 50* via one or more external linking devices 20*.

FIG. 3B illustrates an exemplary GUI 300b that may be displayed by the wearable computing device 10*. In particular, the exemplary GUI 300b includes an icon 306b that represents an application (e.g., local weather reporting application) and that is being displayed in a first format (e.g., semi-transparent) that indicates that the application is disabled. That is, the associated application (e.g., local weather reporting application) may be fully executable only if the wearable computing device 10* has obtained access to communication links 90* to beyond the communication range 50* of the wearable computing device 10*. In contrast, the GUI 300c of FIG. 3C may be displayed by the wearable computing device 10* once the wearable computing device 10* is able to communicate beyond the communication range 50* via the one or more external linking devices 20*. The GUI 300c includes icon 306c, which is similar or the same as icon 306b of FIG. 3B except that icon 306c being in a second format (e.g., bolded) that indicates that the associated application (e.g., local weather reporting application) is now functional or executable as a result of the wearable computing device 10* establishing a communication link 90* to beyond the communication range 50* of the wearable computing device 10* via the one or more external linking devices 20*.

Figure 4A:
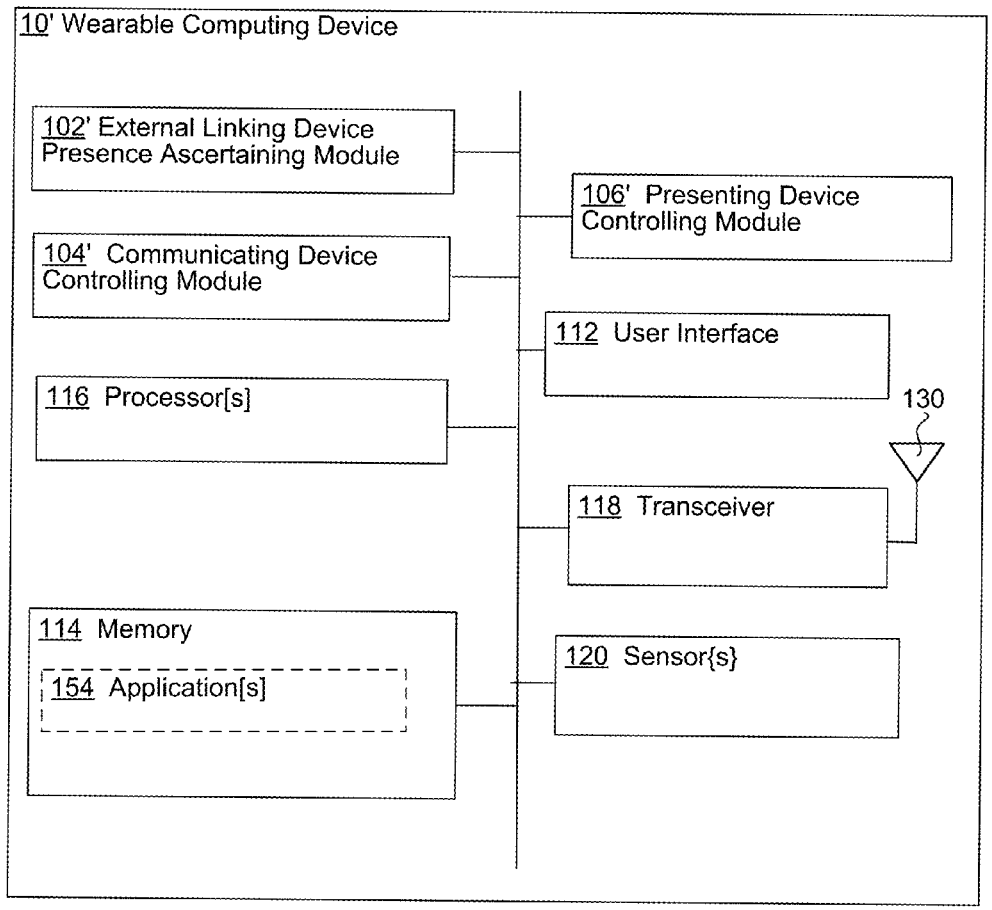
FIG. 4A shows a block diagram of particular implementation of the wearable computing device 10* of FIGS. 1A, 1B, 1C, and 1D.
Figure 4B:
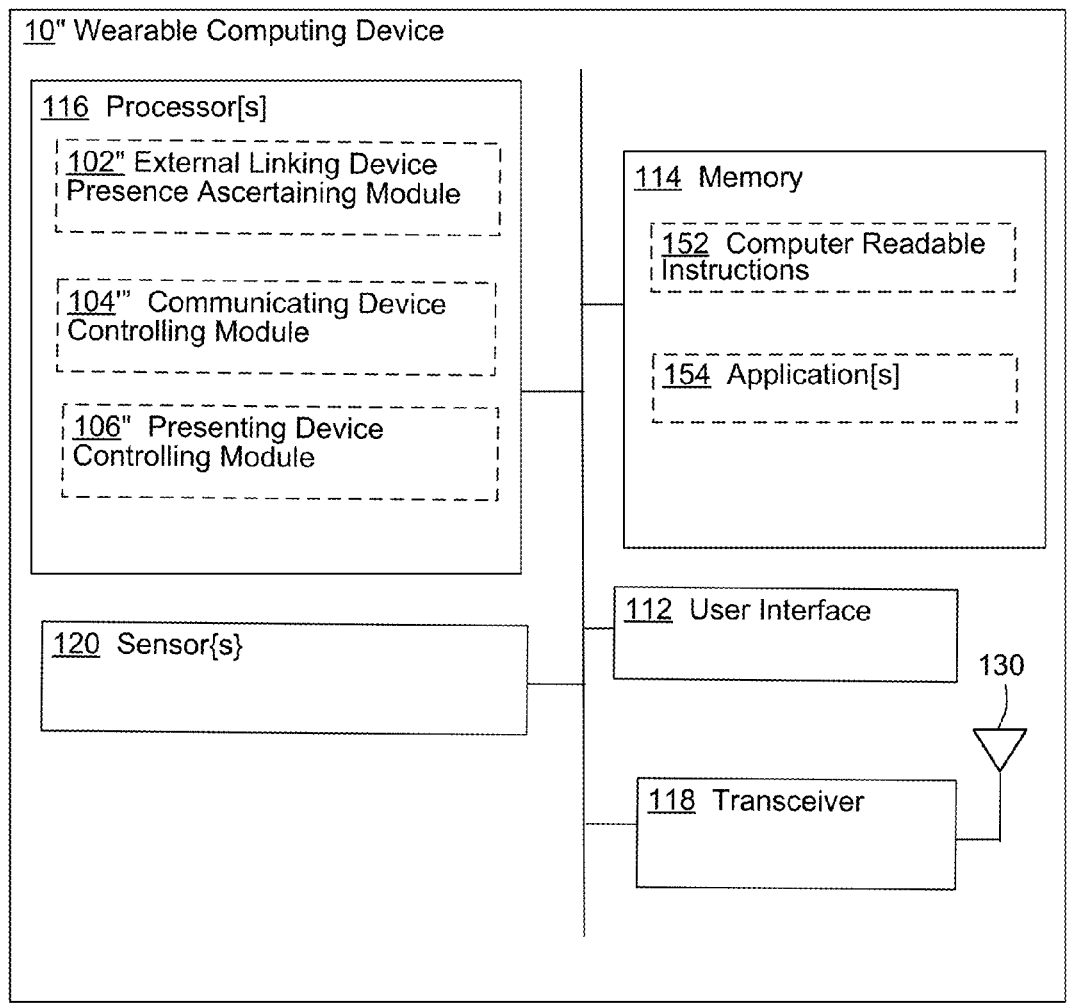
FIG. 4B shows a block diagram of another implementation of the wearable computing device 10* of FIGS. 1A, 1B, 1C, and 1D

Referring now to FIGS. 4A and 4B, illustrating two block diagrams representing two different implementations of the wearable computing device 10* of FIGS. 1A, 1B, 1C, and 1D and that are designed to execute the operations and processes to be described herein. In particular, and as will be further described herein, FIG. 4A illustrates a wearable computing device 10' that is the "hardwired" or "hard" implementation of a small form-factor wearable device that can implement the operations and processes to be described herein. The wearable computing device 10' may comprise certain logic modules including, for example, an external linking device presence ascertaining module 102', a communicating device controlling module 104', and/or a presenting device controlling module 106' that are implemented using purely hardware or circuitry components (e.g., application specific integrated circuit or "ASIC"). In contrast, FIG. 4B illustrates a wearable computing device 10" that is the "soft" implementation of a small form-factor wearable device that can implement the operations and processes to be described herein. In various embodiments, the wearable computing device 10" may also include certain logic modules including, for example, an external linking device presence ascertaining module 102", a communicating device controlling module 104", and/or a presenting device controlling module 106" that are implemented using electronic circuitry (e.g., one or more processors 116 including one or more microprocessors, controllers, etc.) executing one or more programming instructions (e.g., software in the form of computer readable instructions 152—see FIG. 4B).

The embodiments of the wearable computing device 10\* illustrated in FIGS. 4A and 4B are two extreme implementations of a small form-factor wearable system in which all of the logic modules (e.g., the external linking device presence ascertaining module 102', the communicating device controlling module 104', and the presenting device controlling module 106') are implemented using purely hardware solutions (e.g., circuitry such as ASIC) as illustrated in, for example, FIG. 4A or in which all of the logic modules (e.g., the external linking device presence ascertaining module 102", the communicating device controlling module 104", and the presenting device controlling module 106") are implemented using software solutions (e.g., programmable instructions in the form of computer readable instructions 152 being executed by hardware such as one or more processors 116) as illustrated in, for example, FIG. 4B. Since there are many ways of combining hardware, software, and/or firmware in order to implement the various logic modules (e.g., the external linking device presence ascertaining module 102\*, the communicating device controlling module 104\*, and the presenting device controlling module 106\*), only the two extreme implementations (e.g., the purely hardware solution as illustrated in FIG. 4A and the software solution of FIG. 4B) are illustrated here. It should be noted here that with respect to the "soft" implementation illustrated in FIG. 4B, hardware in the form of circuitry such as one or more processors 116 are still needed in order to execute the software. Further details related to the two implementations of the wearable computing device 10\* illustrated in FIGS. 4A and 4B will be provided in greater detail below.

In other implementations, the wearable computing device 10\* may not actually include the various logic modules (e.g., the external linking device presence ascertaining module 102\*, the communicating device controlling module 104\*, and the presenting device controlling module 106\*) that implements the various operations/processes described herein. Instead, such logic modules may be located in a remote device such as another device located near the wearable computing device 10\* (e.g., another computing device located within the communication range 50\* of the wearable computing device 10\*).

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 4A, which illustrates a block diagram of an wearable computing device 10' that includes an external linking device presence ascertaining module 102', a communicating device controlling module 104', a presenting device controlling module 106', memory 114, user interface 112 (e.g., a display, a speaker, and so forth), one or more processors 116 (e.g., one or more microprocessors), transceiver 118, one or more sensors 120, and a directional antenna 130. In various embodiments, the memory 114 may store one or more applications 154 (e.g., communication applications such as email, instant messaging, text messaging, and VoIP applications, personal information manager application such as Microsoft Outlook, gaming application, and so forth). The one or more sensors 120 that may be included in the wearable computing device 10' may include, for example, one or more audio sensors (e.g., microphones), one or more visual sensors (e.g., cameras), one or more myoelectric sensors, and so forth.

In various embodiments, the external linking device presence ascertaining module 102' of FIG. 4A is a logic module that may be designed to, among other things, ascertain presence of one or more external linking devices 20\* within communication range 50\* of the wearable computing device 10' that is designed to be worn by a person, the communication range 50\* being a spatial volume that includes the wearable computing device 10' and being externally defined by an enveloping boundary 52\*, where low-power signals 70\* transmitted by the wearable computing device 10' being discernible over background noise within the enveloping boundary 52\* and not discernible over background noise outside the enveloping boundary 52\*, the external linking device presence ascertaining module 102\* ascertaining the presence of the one or more external linking devices 20\* within the communication range 50\* of a wearable computing device 10' based, at least in part, on one or more signals 80 transmitted by the one or more external linking devices 20\* and received by the wearable computing device 10', and the one or more external linking devices 20\* designed to communicate beyond the communication range 50\* of the wearable computing device 10'. In contrast, the communicating device controlling module 104' of FIG. 4A is a logic module that may be configured to control (e.g., direct, instruct, or configure) the wearable computing device 10' to communicate beyond the communication range 50\* using at least one of the one or more external linking devices 20\* that were ascertained to be within the communication range 50\* of the wearable computing device 10'. The presenting device controlling module 106' of FIG. 4A, on the other hand, is a logic module that may be configured to control (e.g., direct, instruct, or configure) the wearable computing device 10' to present one or more results of the communication beyond the communication range 50\* using the at least one of the one or more external linking devices 20\*.

Turning now to FIG. 4B, which illustrates a block diagram of another wearable computing device 10" that can implement the operations and processes to be described herein. As indicated earlier, the wearable computing device 10" in FIG. 4B is merely the "soft" version of the wearable computing device 10' of FIG. 4A because the various logic modules: the external linking device presence ascertaining module 102", the communicating device controlling module 104", and the presenting device controlling module 106" are implemented using one or more processors 116 (e.g., one or more microprocessors or controllers) executing software (e.g., computer readable instructions 152) rather than being implemented using purely hardware (e.g., ASIC) solutions as was the case in the wearable computing device 10' of FIG. 4A. Thus, the external linking device presence ascertaining module 102", the communicating device controlling module 104", and the presenting device controlling module 106" of FIG. 4B may be designed to execute the same functions as the external linking device presence ascertaining module 102', the communicating device controlling module 104', and the presenting device controlling module 106' of FIG. 4A. The wearable computing device 10", as illustrated in FIG. 4B, may include other components (e.g., the user interface 112, the transceiver 118, directional antenna 130, memory 114 that stores one or more applications 154 as well as the computer readable instructions 152, and so forth) that are the same or similar to the other components that may be included in the wearable computing device 10' of FIG. 4A. Note that in the embodiment of the wearable computing device 10" illustrated in FIG. 4B, the various logic modules (e.g., the external linking device presence ascertaining module 102", the communicating device controlling module 104", and the presenting device controlling module 106") may be implemented by the one or more processors 116 (or other types of circuitry such as field programmable gate arrays or FPGAs) executing one or more computer readable instructions 152 stored in memory 114.

In various embodiments, the memory 114 of the wearable computing device 10' of FIG. 4A and the wearable computing device 10" of FIG. 4B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Turning now to FIG. 5A illustrating a particular implementation of the external linking device presence ascertaining module 102* (e.g., the external linking device presence ascertaining module 102' or the external linking device presence ascertaining module 102") of FIGS. 4A and 4B. As illustrated, the external linking device presence ascertaining module 102* may include one or more sub-logic modules in various alternative implementations. For example, in various embodiments, the external linking device presence ascertaining module 102* may include a prompting signal broadcasting device controlling module 502 (which may further include a transmitting directional antenna controlling module 508), a responsive signal ascertaining module 504 (which may further include a responsive signal detecting module 506), a beacon signal ascertaining module 510 (which may further include a beacon signal strength ascertaining module 512), a nearest device ascertaining module 514, a signal strength ascertaining module 516, a least power requirement device ascertaining module 518, a common user associated device ascertaining module 520 (which may further include a query broadcasting device controlling module 522), a communication link capable device ascertaining module 524, which may further include a communication link query broadcasting device controlling module 526 (which may further include an application query broadcasting device controlling module 530) and/or a communication link confirmation receiving device controlling module 528, a receiving directional antenna controlling module 530, and/or a receiving omnidirectional antenna controlling module 532. Specific details related to the external linking device presence ascertaining module 102* as well as the above-described sub-modules of the external linking device presence ascertaining module 102* will be provided below with respect to the operations and processes to be described herein.

Figure 5B:
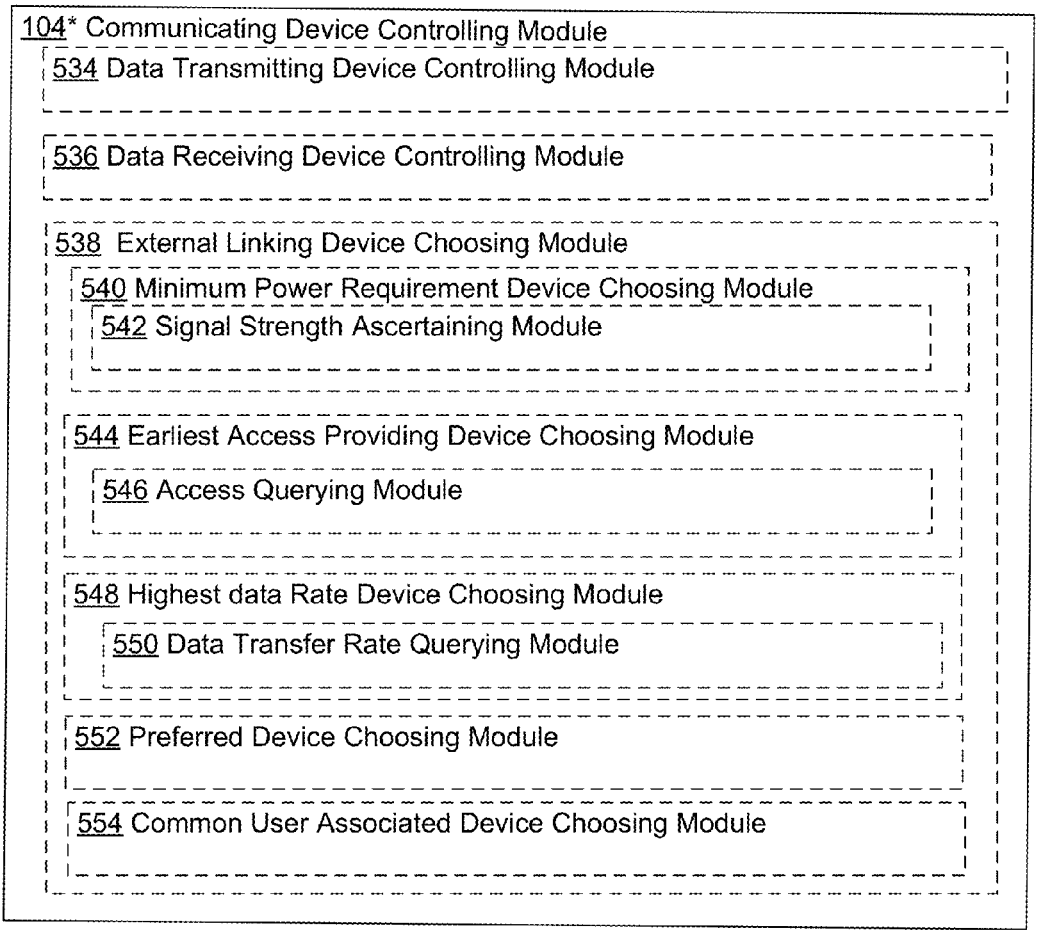
FIG. 5B shows another perspective of the communicating device controlling module 104* of FIGS. 4A and 4B (e.g., the communicating device controlling module 104' of FIG. 4A or the communicating device controlling module 104" of FIG. 4B) in accordance with various implementations.

Turning now to FIG. 5B illustrating a particular implementation of the communicating device controlling module 104* (e.g., the communicating device controlling module 104' or the communicating device controlling module 104") of FIGS. 4A and 4B. As illustrated, the communicating device controlling module 104* may include one or more sub-logic modules in various alternative implementations. For example, in various embodiments, the communicating device controlling module 104* may include a data transmitting device controlling module 534, a data receiving device controlling module 536, and/or an external linking device choosing module 538 that may further include a minimum power requirement device choosing module 540 (which may further include a signal strength ascertaining module 542), an earliest access providing device choosing module 544 (which may further include an access query module 546), a highest data rate device choosing module 548 (which may further include a data transfer rate querying module 550), a preferred device choosing module 552, and/or a common user associated device choosing module 554. Specific details related to the communicating device controlling module 104* as well as the above-described sub-modules of the communicating device controlling module 104* will be provided below with respect to the operations and processes to be described herein.

Figure 5C:
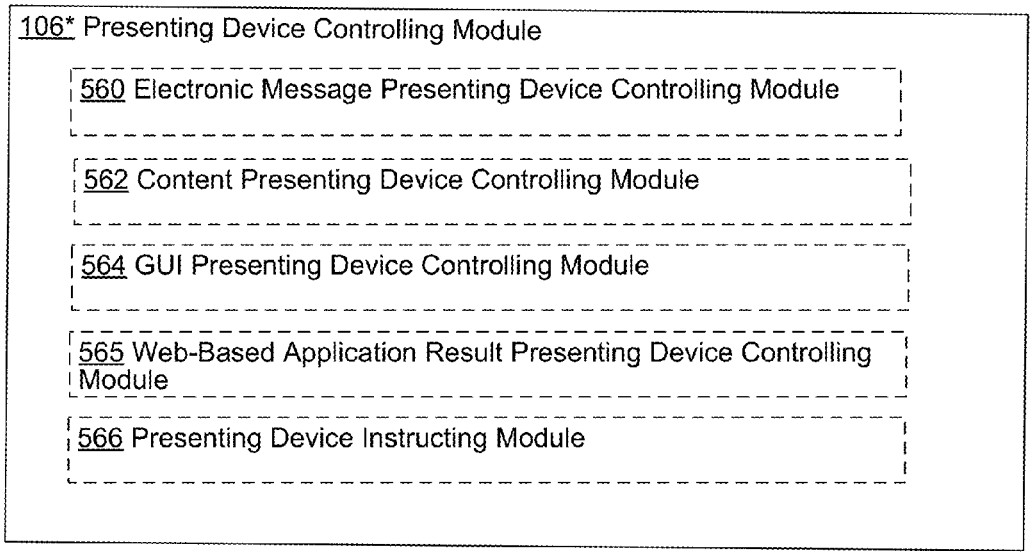
FIG. 5C shows another perspective of the presenting device controlling module 106* of FIGS. 4A and 4B (e.g., the presenting device controlling module 106' of FIG. 4A or the presenting device controlling module 106" of FIG. 4B) in accordance with various implementations.

FIG. 5C illustrates a particular implementation of the presenting device controlling module 106* (e.g., the presenting device controlling module 106' or the presenting device controlling module 106") of FIG. 4A or 4B. As illustrated, the presenting device controlling module 106* may include one or more sub-logic modules in various alternative embodiments. For example, in various embodiments, the presenting device controlling module 106* may include an electronic message presenting device controlling module 560, a content presenting device controlling module 562, a GUI presenting device controlling module 564, a web-based application result presenting device controlling module 565, and/or a presenting device instructing module 566. Specific details related to the presenting device controlling module 106*, as well as the above-described sub-modules of the presenting device controlling module 106*, will be provided below with respect to the operations and processes to be described herein.

Figure 6:
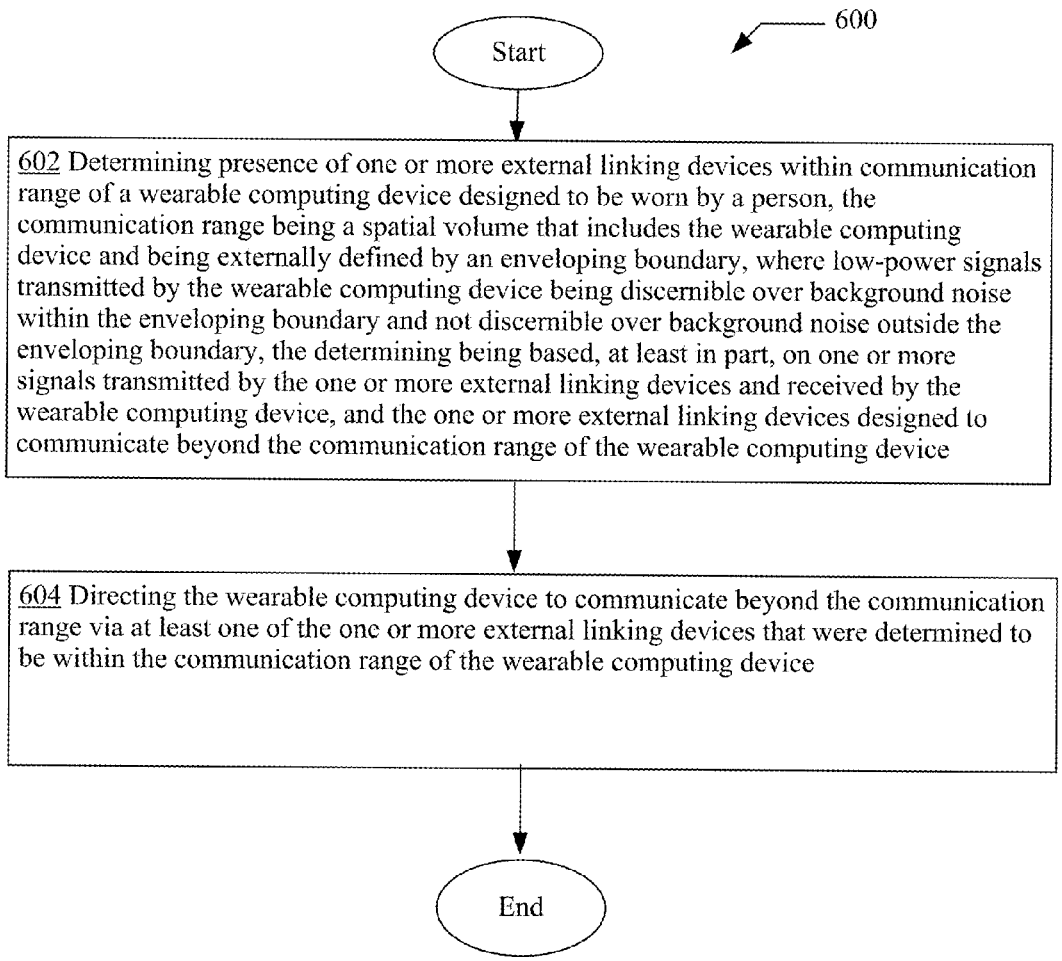
FIG. 6 is a high-level logic flowchart of a process, e.g., operational flow 600, according to some embodiments.

A more detailed discussion related to the wearable computing device 10* (e.g., the wearable computing device 10' of FIG. 4A or the wearable computing device 10" of FIG. 4B) discussed above will now be provided with respect to the processes and operations to be described herein. FIG. 6 illustrates an operational flow 600 representing example computationally-implemented operations that may be implemented for, among other things, determining or ascertaining presence of one or more external linking devices 20* within the communication range 50* of a wearable computing device 10* designed to be worn by a person, the determining being based, at least in part, on one or more signals 80 transmitted by the one or more external linking devices 20* and received by the wearable computing device 10*; and directing or operating the wearable computing device 10* to communicate beyond the communication range 50* via at least one of the one or more external linking devices 20* that were determined to be within the communication range 50* of the wearable computing device 10*. In various implementations, these operations may be implemented through the wearable computing device 10* of FIG. 4A or 4B (as well as FIG. 1A, 1B, 1C, or 1D).

In FIG. 6 and in the following figures that include various examples of operational flows, discussions and explanations will be provided with respect to the wearable computing device 10* described above and as illustrated in FIGS. 4A, 4B, 5A, 5B, 5C, and/or with respect to other examples (e.g., as provided in FIGS. 1A, 1B, 1C, 1D, 2A, 2B, 3A, 3B, and 3C) and contexts. However, it should be understood that the operational flows may be executed in a number of other environments and contexts, and/or in modified versions of FIGS. 1A, 1B, 1C, 1D, 2A, 2B, 3A, 3B, 3C, 4A, 4B, 5A, 5B, and/or 5C. Also, although the various operational flows are presented in the sequence(s) illustrated, it should be understood that the various operations may be performed in orders other than those which are illustrated, or may be performed concurrently.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 600 of FIG. 6 may move to an external linking device presence determining operation 602 for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device. For instance, and as illustration, the external linking device presence ascertaining module 102* of the wearable computing device 10* of FIG. 4A or 4B (e.g., the external linking device presence ascertaining module 102' of FIG. 4A or the external linking device presence ascertaining module 102" of FIG. 4B) determining or ascertaining presence of one or more external linking devices 20* within communication range 50* of a wearable computing device 10* designed to be worn by a person, the communication range 50* being a spatial volume that includes the wearable computing device 10* and being externally defined by an enveloping boundary 52*, where low-power signals 70* transmitted by the wearable computing device 10* being discernible over background noise (e.g., background noise as a result of, for example, background radiation) within the enveloping boundary 52* and not discernible over background noise outside the enveloping boundary 52*, the determining being based, at least in part, on one or more signals 80* transmitted by the one or more external linking devices 20*and received by the wearable computing device 10*, and the one or more external linking devices 20* designed to communicate (e.g., transmit or receive data) beyond the communication range 50* of the wearable computing device 10*.

Operational flow 600 may also include a communicating directing operation 604 for directing the wearable computing device to communicate beyond the communication range via at least one of the one or more external linking devices that were determined to be within the communication range of the wearable computing device. For instance, the communicating device controlling module 104* (e.g., the communicating device controlling module 104' of FIG. 4A or the communicating device controlling module 104" of FIG. 4B) of the wearable computing device 10* of FIG. 4A or 4B directing or controlling the wearable computing device 10* to communicate (e.g., to receive data from or to transmit data to) beyond the communication range 50* via at least one of the one or more external linking devices 20* that were determined to be within the communication range 50* of the wearable computing device 10*.

Figure 7A:
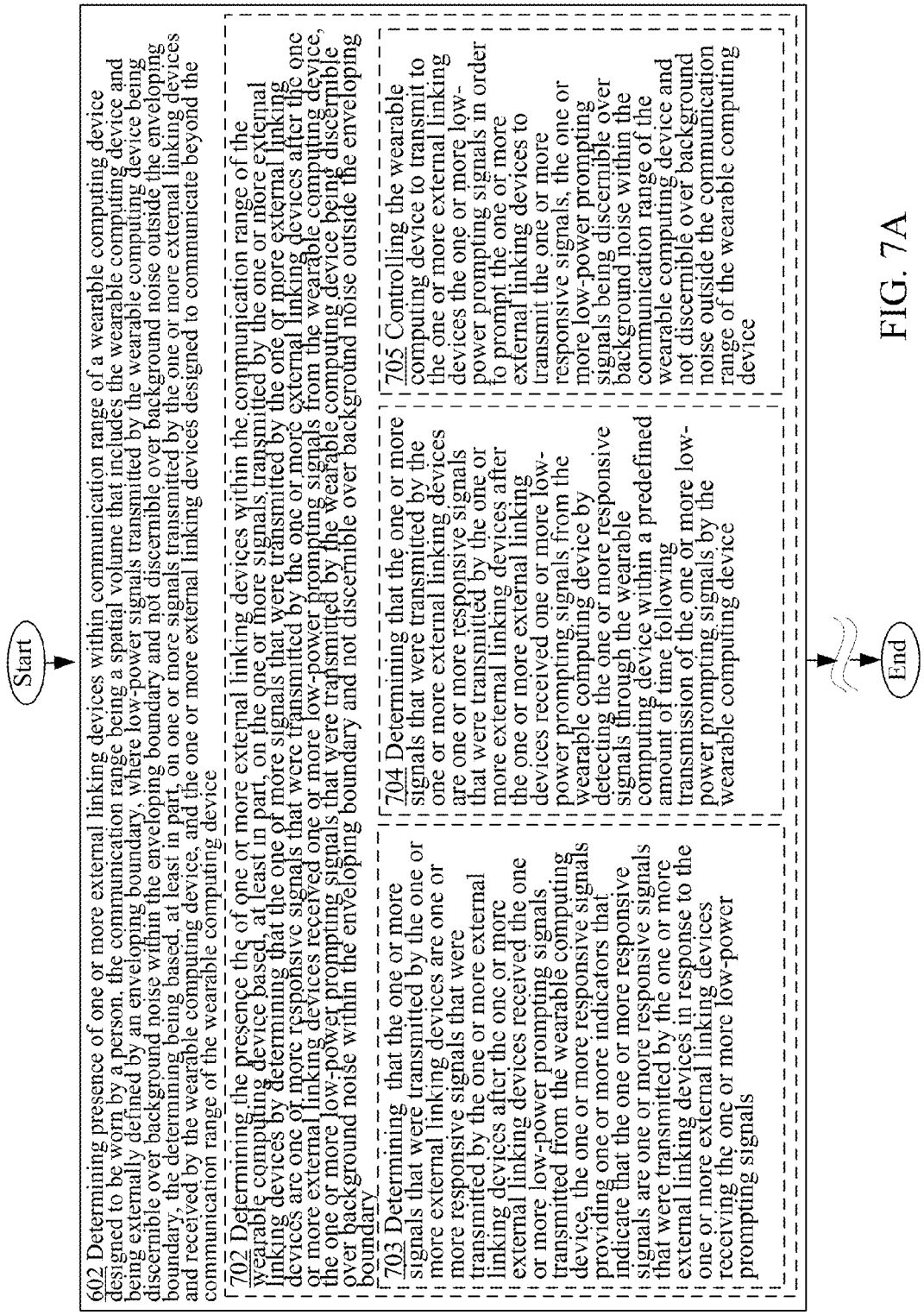
FIG. 7A is a high-level logic flowchart of a process depicting alternate implementations of the external linking device presence determining operation 602 of FIG. 6.

As will be described below, the external linking device presence determining operation 602 and the communicating directing operation 604 may be executed in a variety of different ways in various alternative implementations. FIGS. 7A, 7B, 7C, 7D, 7E, 7F, 7G, 7H, 7J, 7K, 7I, and 7M for example, illustrate at least some of the alternative ways that the external linking device presence determining operation 602 of FIG. 6 may be executed in various alternative implementations. In some cases, for example, the external linking device presence determining operation 602 may actually include or involve an operation 702 for determining the presence of one or more external linking devices within the communication range of the wearable computing device based, at least in part, on the one or more signals transmitted by the one or more external linking devices by determining that the one or more signals that were transmitted by the one or more external linking devices are one or more responsive signals that were transmitted by the one or more external linking devices after the one or more external linking devices received one or more low-power prompting signals from the wearable computing device, the one or more low-power prompting signals that were transmitted by the wearable computing device being discernible over background noise within the enveloping boundary and not discernible over background noise outside the enveloping boundary as illustrated in FIG. 7A. For instance, the external linking device presence ascertaining module 102* including the responsive signal ascertaining module 504 (see FIG. 5A) of the wearable computing device 10* (e.g., the wearable computing device 10' of FIG. 4A or the wearable computing device 10" of FIG. 4B) determining the presence of one or more external linking devices 20* within the communication range 50* of the wearable computing device 10* based, at least in part, on the one or more signals 80 (see, for example, FIG. 2C) transmitted by the one or more external linking devices 20* when the responsive signal ascertaining module 504 determines or ascertains that the one or more signals 80 that were transmitted by the one or more external linking devices 20* are one or more responsive signals that were transmitted by the one or more external linking devices 20* in response to the one or more external linking devices 20* receiving one or more low-power prompting signals 82 (see FIG. 1C) from the wearable computing device 10*, the one or more low-power prompting signals 82 that were transmitted by the wearable computing device (e.g., that was transmitted by the prompting signal broadcasting device controlling module 502 of the wearable computing device 10* as illustrated, for example, in FIG. 5A) being discernible over background noise within the enveloping boundary 52* and not discernible over background noise outside the enveloping boundary. In some cases, the one or more prompting signals 82 transmitted by the wearable computing device 10* and the one or more responsive signals (e.g., signals 80 of FIG. 2C) transmitted by an external linking device 20* may have be transmitted as part of a handshaking protocol to establish a communication link between two devices (e.g., between the wearable computing device 10* and an external linking device 20*).

In various implementations, operation 702 may further include one or more additional operations including, in some implementations, an operation 703 for determining that the one or more signals that were transmitted by the one or more external linking devices are one or more responsive signals that were transmitted by the one or more external linking devices after the one or more external linking devices received the one or more low-power prompting signals transmitted from the wearable computing device, the one or more responsive signals providing one or more indicators that indicate that the one or more responsive signals are one or more responsive signals that were transmitted by the one or more external linking devices in response to the one or more external linking devices receiving the one or more low-power prompting signals. For instance, the responsive signal ascertaining module 504 of the wearable computing device 10* of FIG. 4A or 4B determining that the one or more signals 80 (see, for example, FIG. 2C) that were transmitted by the one or more external linking devices 20* are one or more responsive signals that were transmitted by the one or more external linking devices 20* after (e.g., in response to) the one or more external linking devices 20* receives the one or more low-power prompting signals 82 transmitted from the wearable computing device 10*, the one or more responsive signals (e.g., one or more signals 80) providing one or more indicators that indicate that the one or more responsive signals are one or more responsive signals that were transmitted by the one or more external linking devices 20* in response to the one or more external linking devices 20* receiving the one or more low-power prompting signals 82. In various embodiments, the prompting signal broadcasting device controlling module 502 (see FIG. 5A) of the wearable computing device 10* may direct or control the wearable computing device 10* to transmit one or more low-power prompting signals 82 in order to prompt the one or more external linking device 20* that detects the one or more low-power prompting signals 82 to transmit the one or more responsive signals (e.g., one or more signals 80 of FIG. 2C).

In the same or alternative implementations, operation 702 may additionally or alternatively include an operation 704 for determining that the one or more signals that were transmitted by the one or more external linking devices are one or more responsive signals that were transmitted by the one or more external linking devices after the one or more external linking devices received one or more low-power prompting signals from the wearable computing device by detecting the one or more responsive signals through the wearable computing device within a predefined amount of time following transmission of the one or more low-power prompting signals by the wearable computing device. For instance, the responsive signal ascertaining module 504 including the responsive signal detecting module 506 (see FIG. 5A) of the wearable computing device 10* of FIG. 4A or 4B determining that the one or more signals 80 that were transmitted by the one or more external linking devices 20* are one or more responsive signals that were transmitted by the one or more external linking devices 20* after the one or more external linking devices 20* received one or more low-power prompting signals 82 from the wearable computing device 10* when the responsive signal detecting module 506 detects the one or more responsive signals within a predefined amount of time (e.g., 0.1 second) following transmission of the one or more low-power prompting signals 82 by the responsive signal detecting module 506 of the wearable computing device 10*.

In the same or alternative implementations, the operation 702 may additionally or alternatively include or involve an operation 705 for controlling the wearable computing device to transmit to the one or more external linking devices the one or more low-power prompting signals in order to prompt the one or more external linking devices to transmit the one or more responsive signals, the one or more low-power prompting signals being discernible over background noise within the communication range of the wearable computing device and not discernible over background noise outside the communication range of the wearable computing device. For instance, the prompting signal broadcasting device controlling module 502 of the wearable computing device 10* of FIG. 4A or 4B controlling (e.g., directing, instructing, or configuring) the wearable computing device 10* to transmit (via an antenna 130) to the one or more external linking devices 20* the one or more low-power prompting signals 82 (see FIG. 2C) in order to prompt the one or more external linking devices 20* that detect the one or more low-power prompting signals 82 to transmit the one or more responsive signals (e.g., one or more signals 80 of FIG. 2C), the one or more low-power prompting signals 82 being discernible over background noise within the communication range 50* of the wearable computing device 10* and not discernible over background noise outside the communication range 50* of the wearable computing device 10*.

Figure 7B:
FIG. 7B is a high-level logic flowchart of a process depicting alternate implementations of the external linking device presence determining operation 602 of FIG. 6.
Figure 7C:
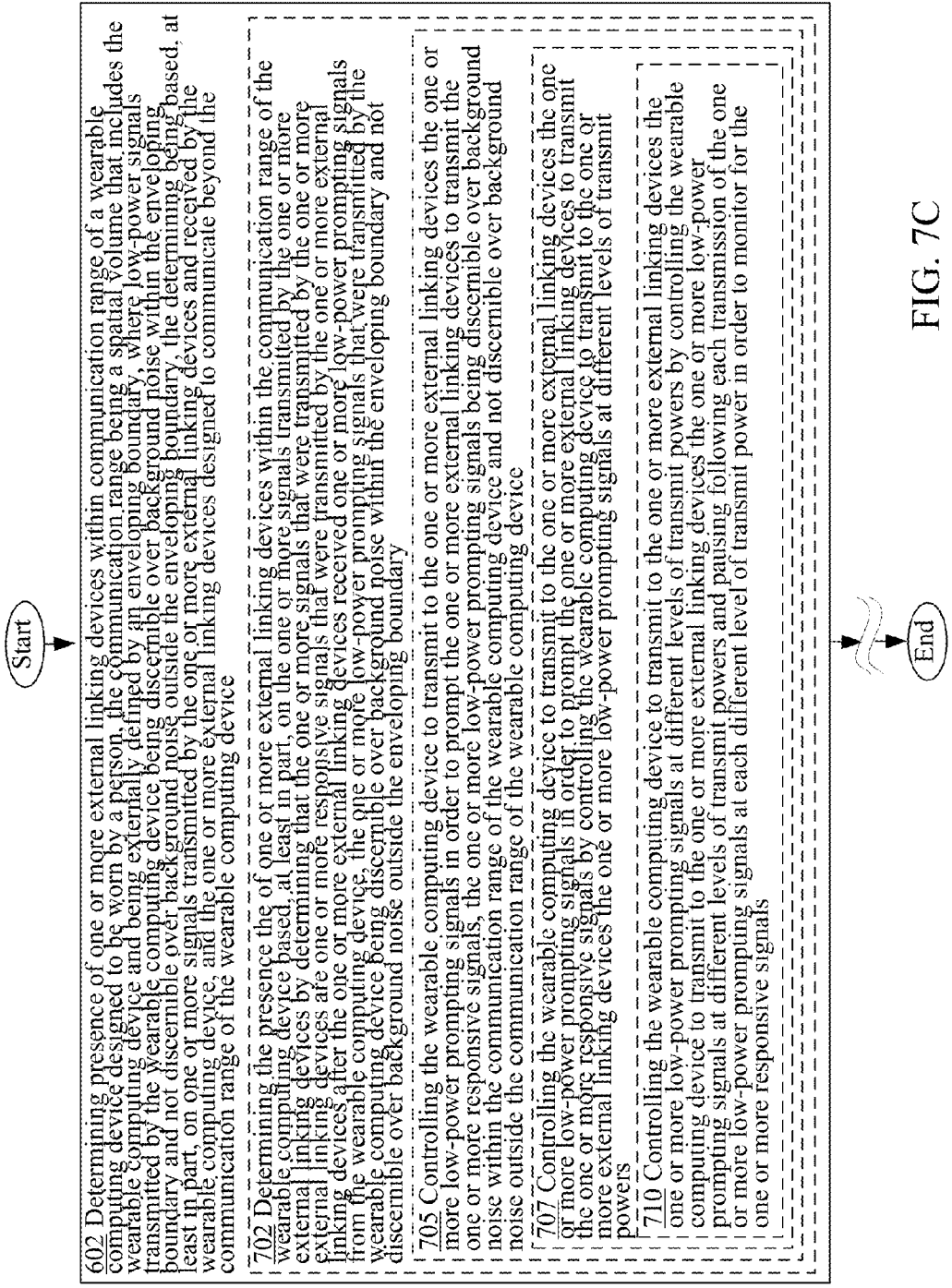
FIG. 7C is a high-level logic flowchart of a process depicting alternate implementations of the external linking device presence determining operation 602 of FIG. 6.
Figure 7D:
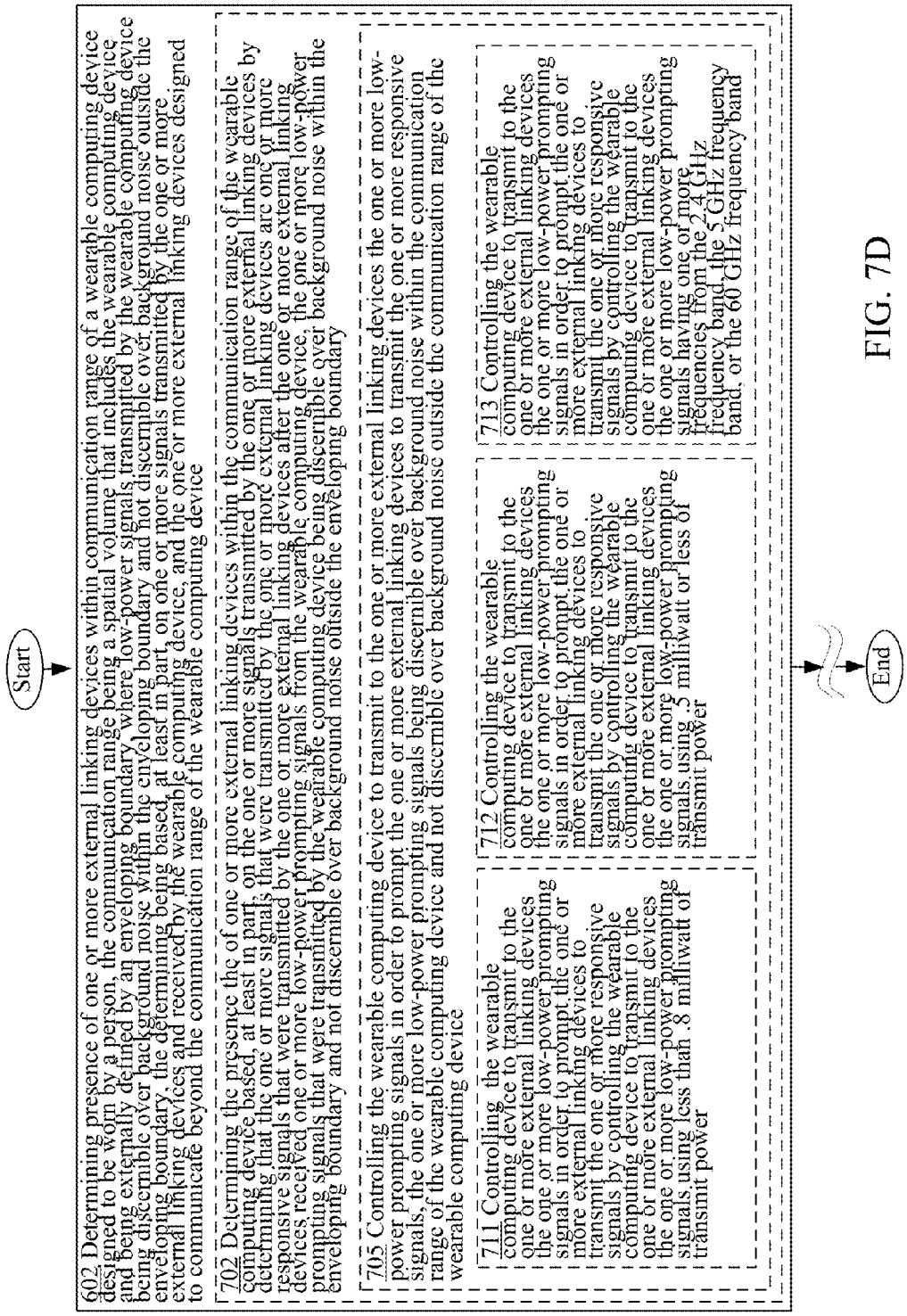
FIG. 7D is a high-level logic flowchart of a process depicting alternate implementations of the external linking device presence determining operation 602 of FIG. 6.

As further illustrated in FIGS. 7B, 7C, and 7D, operation 705 may further include one or more additional operations in various alternative implementations. For example, in some implementations, operation 705 may further include or involve an operation 706 for controlling the wearable computing device to transmit to the one or more external linking devices the one or more low-power prompting signals in order to prompt the one or more external linking devices to transmit the one or more responsive signals by controlling a directional antenna of the wearable computing device to point at different directions away from a user wearing the wearable computing device and transmitting the one or more low-power prompting signals in order for the one or more external linking devices to receive the one or more low-power prompting signals as illustrated in FIG. 7B. For instance, the prompting signal broadcasting device controlling module 502 including the transmitting directional antenna controlling module 508 (see FIG. 5A) of the wearable computing device 10* of FIG. 4A or 4B controlling the wearable computing device 10* to transmit to the one or more external linking devices 20* the one or more low-power prompting signals 82 in order to prompt the one or more external linking devices 20* that detect the one or more low-power prompting signals 82 to transmit the one or more responsive signals when the transmitting directional antenna controlling module 508 controls a directional antenna (e.g., antenna 130) of the wearable computing device 10\* to point at different directions away from a user wearing the wearable computing device 10\* and transmitting the one or more low-power prompting signals 82 (e.g., low-power signals with one or more frequencies from the 60 GHz frequency band) in order for the one or more external linking devices 20\* to receive the one or more low-power prompting signals 82.

In the same or alternative implementations, operation 705 may include or involve an operation 707 for controlling the wearable computing device to transmit to the one or more external linking devices the one or more low-power prompting signals in order to prompt the one or more external linking devices to transmit the one or more responsive signals by controlling the wearable computing device to transmit to the one or more external linking devices the one or more low-power prompting signals at different levels of transmit powers. For instance, the prompting signal broadcasting device controlling module 502 of the wearable computing device 10\* of FIG. 4A or 4B controlling the wearable computing device 10\* to transmit to the one or more external linking devices 20\* the one or more low-power prompting signals 82 in order to prompt the one or more external linking devices 20\* that detect the one or more low-power prompting signals 82 to transmit the one or more responsive signals (one or more signals 80 of FIG. 2C) by controlling the wearable computing device 10\* to transmit to the one or more external linking devices 20\* the one or more low-power prompting signals 82 at different levels of transmit powers. For example, the wearable computing device 10\* may be controlled or directed to transmit the one or more low-power prompting signals 82 at increasingly higher levels of transmit powers in order to, for example, determine which nearby external linking devices 20\* will respond to (via one or more responsive signals) the one or more low-power prompting signals 82 when transmitted at lower levels of transmit powers and which nearby external linking devices 20\* will respond to the one or more low-power prompting signals 82 when transmitted at higher levels of transmit powers.

In various implementations, operation 707 may further include or involve an operation 708 for controlling the wearable computing device to transmit to the one or more external linking devices the one or more low-power prompting signals at different levels of transmit powers by controlling the wearable computing device to transmit to the one or more external linking devices the one or more low-power prompting signals at different levels of transmit powers not greater than 0.8 milliwatt of transmit power. For instance, the prompting signal broadcasting device controlling module 502 of the wearable computing device 10\* of FIG. 4A or 4B controlling the wearable computing device 10\* to transmit to the one or more external linking devices 20\* the one or more low-power prompting signals 82 at different levels of transmit powers by controlling (e.g., directing, instructing, or configuring) the wearable computing device 10\* to transmit to the one or more external linking devices 20\* the one or more low-power prompting signals 82 at different levels of transmit powers not greater than 0.8 milliwatt of transmit power as transmitted through, for example, antenna 130 (e.g., directional or omni-directional antenna).

In some implementations, operation 707 may include or involve an operation 709 for controlling the wearable computing device to transmit to the one or more external linking devices the one or more low-power prompting signals at different levels of transmit powers by controlling the wearable computing device to transmit to the one or more external linking devices the one or more low-power prompting signals at different levels of transmit powers not greater than 0.5 milliwatt of transmit power. For instance, the prompting signal broadcasting device controlling module 502 of the wearable computing device 10\* of FIG. 4A or 4B controlling the wearable computing device 10\* to transmit to the one or more external linking devices 20\* the one or more low-power prompting signals 82 at different levels of transmit powers by controlling (e.g., directing, instructing, or configuring) the wearable computing device 10\* to transmit (to the one or more external linking devices 20\* the one or more low-power prompting signals 82 at different levels of transmit powers not greater than 0.5 milliwatt of transmit power as transmitted through, for example, antenna 130 (e.g., directional or omni-directional antenna).

In some implementations, operation 707 may include or involve an operation 710 for controlling the wearable computing device to transmit to the one or more external linking devices the one or more low-power prompting signals at different levels of transmit powers by controlling the wearable computing device to transmit to the one or more external linking devices the one or more low-power prompting signals at different levels of transmit powers and pausing following each transmission of the one or more low-power prompting signals at each different level of transmit power in order to monitor for the one or more responsive signals as illustrated in FIG. 7C. For instance, the prompting signal broadcasting device controlling module 502 of the wearable computing device 10\* of FIG. 4A or 4B controlling the wearable computing device 10\* to transmit to the one or more external linking devices 20\* the one or more low-power prompting signals 82 at different levels of transmit powers by controlling (e.g., directing, instructing, or configuring) the wearable computing device 10\* to transmit to the one or more external linking devices 20\* the one or more low-power prompting signals 82 at different levels of transmit powers and pausing following each transmission of the one or more low-power prompting signals 82 at each different level of transmit power in order to monitor (e.g., detect) for the one or more responsive signals (e.g., one or more signals 80 of FIG. 2C). For example, initially transmitting the one or more low-power prompting signals 82 via antenna 130 at 0.1 milliwatt of transmit power, then pausing to monitor for responsive signals, and then transmitting the one or more low-power prompting signals 82 via antenna 130 at 0.2 milliwatt of transmit power, and then pausing to monitor for responsive signals, and then repeating these operations until the one or more low-power prompting signals 82 are transmitted with some maximum transmit power such as 0.8 milliwatt of transmit power.

Referring now to FIG. 7D, in various implementations the operation 705 for controlling the wearable computing device to transmit to the one or more external linking devices the one or more low-power prompting signals in order to prompt the one or more external linking devices to transmit the one or more responsive signals, the one or more low-power prompting signals being discernible over background noise within the communication range of the wearable computing device and not discernible over background noise outside the communication range of the wearable computing device may include or involve an operation 711 for controlling the wearable computing device to transmit to the one or more external linking devices the one or more low-power prompting signals in order to prompt the one or more external linking devices to transmit the one or more responsive signals by controlling the wearable computing device to transmit to the one or more external linking devices the one or more low-power prompting signals using less than 0.8 milliwatt of transmit power. For instance, the prompting signal broadcasting device controlling module 502 of the wearable computing device 10* of FIG. 4A or 4B controlling the wearable computing device 10* to transmit to the one or more external linking devices 20* the one or more low-power prompting signals 82 in order to prompt the one or more external linking devices 20* that detect the one or more low-power prompting signals 82 to transmit the one or more responsive signals (e.g., one or more signals 80) by controlling the wearable computing device 10* to transmit to the one or more external linking devices 20* the one or more low-power prompting signals 82 using less than 0.8 milliwatt of transmit power as transmitted through, for example, antenna 130 (e.g., directional or omnidirectional antenna) and for a predefined increment of time.

In some implementations, operation 705 may include or involve an operation 712 for controlling the wearable computing device to transmit to the one or more external linking devices the one or more low-power prompting signals in order to prompt the one or more external linking devices to transmit the one or more responsive signals by controlling the wearable computing device to transmit to the one or more external linking devices the one or more low-power prompting signals using 0.5 milliwatt or less of transmit power. For instance, the prompting signal broadcasting device controlling module 502 of the wearable computing device 10* of FIG. 4A or 4B controlling the wearable computing device 10* to transmit to the one or more external linking devices 20* the one or more low-power prompting signals 82 in order to prompt the one or more external linking devices 20* that detect the one or more low-power prompting signals 82 to transmit the one or more responsive signals by controlling (e.g., directing, instructing, or configuring) the wearable computing device 10* to transmit to the one or more external linking devices 20* the one or more low-power prompting signals 82 using 0.5 milliwatt or less of transmit power as transmitted through, for example, antenna 130 (e.g., directional or omnidirectional antenna). In some alternative implementations, the low-power prompting signals 82 may be transmitted using 0.2 or 0.3 milliwatt or less of transmit power for a predefined increment of time.

In some implementations, operation 705 may include or involve an operation 713 for controlling the wearable computing device to transmit to the one or more external linking devices the one or more low-power prompting signals in order to prompt the one or more external linking devices to transmit the one or more responsive signals by controlling the wearable computing device to transmit to the one or more external linking devices the one or more low-power prompting signals having one or more frequencies from the 2.4 GHz frequency band, the 5 GHz frequency band, or the 60 GHz frequency band. For instance, the prompting signal broadcasting device controlling module 502 of the wearable computing device 10* of FIG. 4A or 4B controlling the wearable computing device 10* to transmit to the one or more external linking devices 20* the one or more low-power prompting signals 82 in order to prompt the one or more external linking devices 20* to transmit the one or more responsive signals (e.g., one or more signals 80 of FIG. 2C) by controlling (e.g., directing, instructing, or configuring) the wearable computing device 10* to transmit to the one or more external linking devices 20* the one or more low-power prompting signals 82 having one or more frequencies from the 2.4 GHz frequency band (e.g., 2.400 GHz to 2.4835 GHz), the 5 GHz frequency band (e.g., 5.180 GHz to 5.825 GHz), or the 60 GHz frequency band (e.g., 57 GHz to 64 GHz).

Figure 7E:
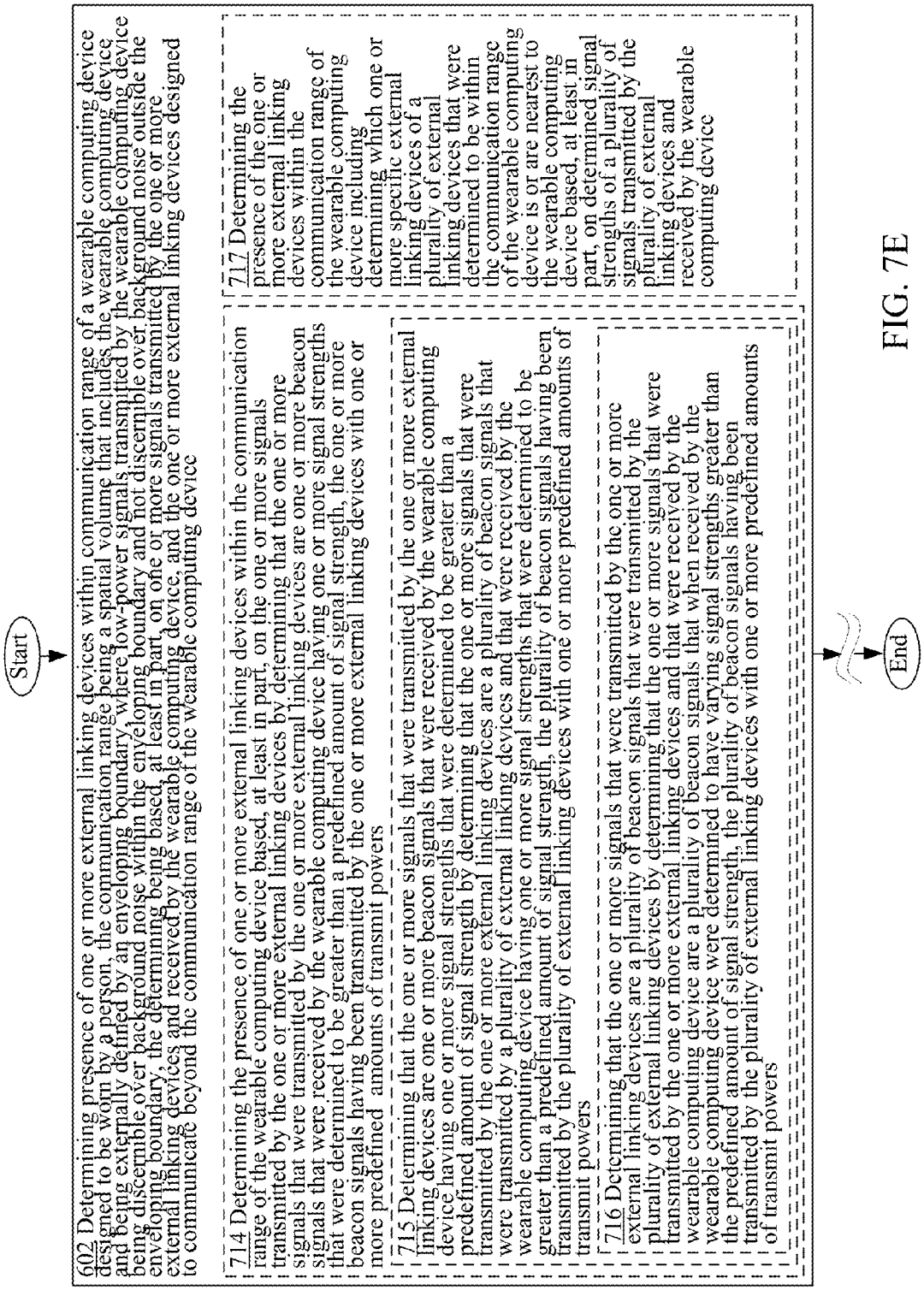
FIG. 7E is a high-level logic flowchart of a process depicting alternate implementations of the external linking device presence determining operation 602 of FIG. 6.

Referring now to FIG. 7E, in various implementations the external linking device presence determining operation 602 may include or involve an operation 714 for determining the presence of one or more external linking devices within the communication range of the wearable computing device based, at least in part, on the one or more signals transmitted by the one or more external linking devices by determining that the one or more signals that were transmitted by the one or more external linking devices are one or more beacon signals that were received by the wearable computing device having one or more signal strengths that were determined to be greater than a predefined amount of signal strength, the one or more beacon signals having been transmitted by the one or more external linking devices with one or more predefined amounts of transmit powers. For instance, the external linking device presence ascertaining module 102* including the beacon signal ascertaining module 510 (see FIG. 5A) of the wearable computing device 10* of FIG. 4A or 4B determining the presence of one or more external linking devices 20* within the communication range 50* of the wearable computing device 10* based, at least in part, on the one or more signals 80 transmitted by the one or more external linking devices 20* when the beacon signal ascertaining module 510 determines or ascertains that the one or more signals 80 that were transmitted by the one or more external linking devices 20* are one or more beacon signals that were received by the wearable computing device 10* having one or more signal strengths that were determined, by the beacon signal strength ascertaining module 512, to be greater than a predefined amount of signal strength, the one or more beacon signals having been transmitted by the one or more external linking devices 20* with one or more predefined (e.g., preset) amounts of transmit powers. In some cases, if it is determined that the signal strength of the beacon signals that are received by the wearable computing device 10* are weak (e.g., less than a predefined amount of signal strength) then that may be indicative that the associated external linking device 20* that transmitted the "weak" beacon signals may be beyond or outside the communication range 50* of the wearable computing device 10*.

As further illustrated in FIG. 7E, in some implementations, operation 714 may further include or involve an operation 715 for determining that the one or more signals that were transmitted by the one or more external linking devices are one or more beacon signals that were received by the wearable computing device having one or more signal strengths that were determined to be greater than a predefined amount of signal strength by determining that the one or more signals that were transmitted by the one or more external linking devices are a plurality of beacon signals that were transmitted by a plurality of external linking devices and that were received by the wearable computing device having one or more signal strengths that were determined to be greater than a predefined amount of signal strength, the plurality of beacon signals having been transmitted by the plurality of external linking devices with one or more predefined amounts of transmit powers. For instance the beacon signal ascertaining module 510 of the wearable computing device 10* of FIG. 4A or 4B determining that the one or more signals 80 that were transmitted by the one or more external linking devices 20* are one or more beacon signals that were received by the wearable computing device 10* having one or more signal strengths that were determined to be greater than a predefined amount of signal strength by determining or ascertaining that the one or more signals 80 that were transmitted by the one or more external linking devices 20* are a plurality of beacon signals that were transmitted by a plurality of external linking devices 20* and that were received by the wearable computing device 10* having one or more signal strengths that were determined (e.g., as determined, for example, by the beacon signal strength ascertaining module 512) to be greater than a predefined amount of signal strength, the plurality of beacon signals having been transmitted by the plurality of external linking devices 20* with one or more predefined amounts of transmit powers.

In some cases, operation 715 may further include or involve an operation 716 for determining that the one or more signals that were transmitted by the one or more external linking devices are a plurality of beacon signals that were transmitted by the plurality of external linking devices by determining that the one or more signals that were transmitted by the one or more external linking devices and that were received by the wearable computing device are a plurality of beacon signals that when received by the wearable computing device were determined to have varying signal strengths greater than the predefined amount of signal strength, the plurality of beacon signals having been transmitted by the plurality of external linking devices with one or more predefined amounts of transmit powers. For instance the beacon signal ascertaining module 510 of the wearable computing device 10* of FIG. 4A or 4B determining that the one or more signals 80 that were transmitted by the one or more external linking devices 20* are a plurality of beacon signals that were transmitted by the plurality of external linking devices 20* by determining or ascertaining that the one or more signals 80 that were transmitted by the one or more external linking devices 20* and that were received by the wearable computing device 10* are a plurality of beacon signals that when received by the wearable computing device 10* were determined by, for example, the beacon signal strength ascertaining module 512 to have varying signal strengths greater than the predefined amount of signal strength, the plurality of beacon signals (e.g., signals 80) having been transmitted by the plurality of external linking devices 20* with one or more predefined amounts of transmit powers.

In some implementations the external linking device presence determining operation 602 may include or involve an operation 717 for determining the presence of the one or more external linking devices within the communication range of the wearable computing device including determining which one or more specific external linking devices of a plurality of external linking devices that were determined to be within the communication range of the wearable computing device is or are nearest to the wearable computing device based, at least in part, on determined signal strengths of a plurality of signals transmitted by the plurality of external linking devices and received by the wearable computing device. For instance, the external linking device presence ascertaining module 102* including the nearest device ascertaining module 514 (see FIG. 5A) of the wearable computing device 10* of FIG. 4A or 4B determining the presence of the one or more external linking devices 20* within the communication range 50* of the wearable computing device 10* including determining or ascertaining, by the nearest device ascertaining module 514, which one or more specific external linking devices 20* of a plurality of external linking devices 20* that were determined to be within the communication range 50* of the wearable computing device 10* (e.g., as determined by the external linking device presence ascertaining module 102*) is or are nearest to the wearable computing device 10* based, at least in part, on determined signal strengths of a plurality of (e.g., beacon or responsive) signals 80 transmitted by the plurality of external linking devices 20* and received by the wearable computing device 10*. In some embodiments, the signal strengths of the plurality of signals 80 transmitted by the plurality of external linking devices 20* and received by the wearable computing device 10* may be determined or ascertained by the signal strength ascertaining module 516 of the wearable computing device 10*, which in some cases may be the same as the beacon signal ascertaining module 510 of the wearable computing device 10*.

Figure 7F:
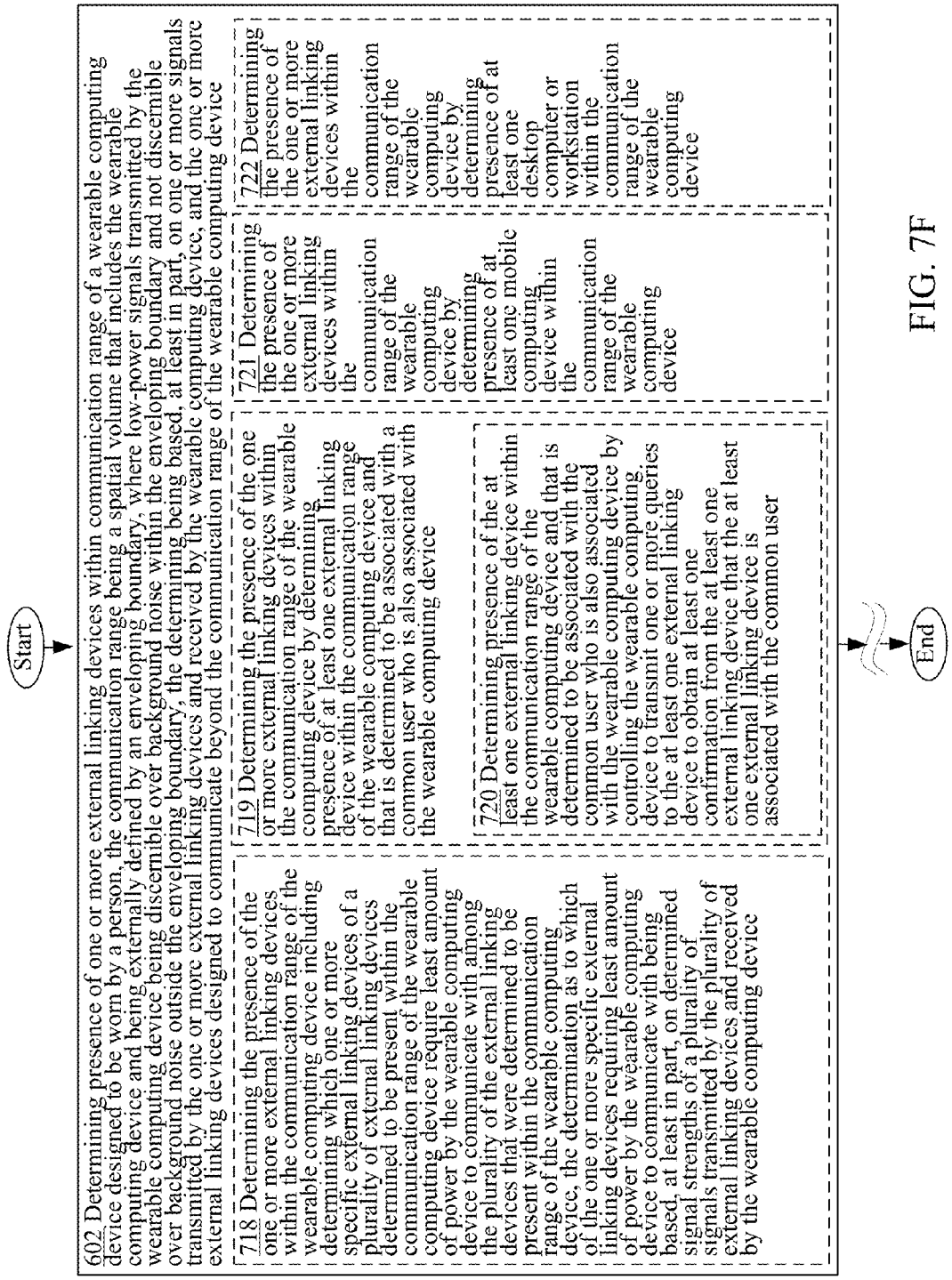
FIG. 7F is a high-level logic flowchart of a process depicting alternate implementations of the external linking device presence determining operation 602 of FIG. 6.

Turning now to FIG. 7F, in some implementations the external linking device presence determining operation 602 may include or involve an operation 718 for determining the presence of the one or more external linking devices within the communication range of the wearable computing device including determining which one or more specific external linking devices of a plurality of external linking devices determined to be present within the communication range of the wearable computing device require least amount of power by the wearable computing device to communicate with among the plurality of the external linking devices that were determined to be present within the communication range of the wearable computing device, the determination as to which of the one or more specific external linking devices requiring least amount of power by the wearable computing device to communicate with being based, at least in part, on determined signal strengths of a plurality of signals transmitted by the plurality of external linking devices and received by the wearable computing device. For instance, the external linking device presence ascertaining module 102* including the least power requirement device ascertaining module 518 (see FIG. 5A) of the wearable computing device 10* of FIG. 4A or 4B determining the presence of the one or more external linking devices 20* within the communication range 50* of the wearable computing device 10* including determining or ascertaining, by the least power requirement device ascertaining module 518, which one or more specific external linking devices 20* of a plurality of external linking devices 20* determined to be present within the communication range 50* of the wearable computing device 10* require least amount of power by the wearable computing device 10* to communicate with (e.g., successfully transmit data to) among the plurality of the external linking devices 20* that were determined to be present within the communication range 50* of the wearable computing device 10*, the determination as to which of the one or more specific external linking devices 20* requiring least amount of power by the wearable computing device 10* to communicate with being based, at least in part, on determined signal strengths (e.g., as determined by the signal strength ascertaining module 516) of a plurality of signals 80 (e.g., beacon or responsive signals) transmitted by the plurality of external linking devices 20* and received by the wearable computing device 10*.

In some implementations the external linking device presence determining operation 602 may include or involve an operation 719 for determining the presence of the one or more external linking devices within the communication range of the wearable computing device by determining presence of at least one external linking device within the communication range of the wearable computing device and that is determined to be associated with a common user who is also associated with the wearable computing device. For instance, the external linking device presence ascertaining module 102* including the common user associated device ascertaining module 520 (see FIG. 5A) of the wearable computing device 10* of FIG. 4A or 4B determining the presence of the one or more external linking devices 20* within the communication range 50* of the wearable computing device 10* by determining or ascertaining presence of at least one external linking device 20* within the communication range 50* of the wearable computing device 10* and that is determined, by the common user associated device ascertaining module 520, to be associated with a common user who is also associated with the wearable computing device 10*. In some cases, an external linking device 20* and a wearable computing device 10* may be associated with a common user when the common user has access rights to the external linking device 20* and the wearable computing device 10*, or when both of the devices are associated with the same identifier associated with the common user.

As further illustrated in FIG. 7F, in some implementations, operation 719 may further include or involve an operation 720 for determining presence of the at least one external linking device within the communication range of the wearable computing device and that is determined to be associated with the common user who is also associated with the wearable computing device by controlling the wearable computing device to transmit one or more queries to the at least one external linking device to obtain at least one confirmation from the at least one external linking device that the at least one external linking device is associated with the common user. For instance, the external linking device presence ascertaining module 102* including the query broadcasting device controlling module 522 (see FIG. 5A) of the wearable computing device 10* of FIG. 4A or 4B determining presence of the at least one external linking device 20* within the communication range 50* of the wearable computing device 10* and that is determined (e.g., as determined by, for example, the common user associated device ascertaining module 520) to be associated with the common user who is also associated with the wearable computing device 10* when the query broadcasting device controlling module 522 controls the wearable computing device 10* to transmit one or more queries (e.g., via, for example, one or more low-power query signals 84) to the at least one external linking device 20* to obtain at least one confirmation from the at least one external linking device 20* that the at least one external linking device 20* is associated with the common user.

In some implementations the external linking device presence determining operation 602 may include or involve an operation 721 for determining the presence of the one or more external linking devices within the communication range of the wearable computing device by determining presence of at least one mobile computing device within the communication range of the wearable computing device. For instance, the external linking device presence ascertaining module 102* of the wearable computing device 10* of FIG. 4A or 4B determining the presence of the one or more external linking devices 20* within the communication range 50* of the wearable computing device 10* by determining or ascertaining presence of at least one mobile computing device (e.g., a Smartphone, a tablet computer, a laptop computer, and so forth) within the communication range 50* of the wearable computing device 10*.

In some implementations the external linking device presence determining operation 602 may include or involve an operation 722 for determining the presence of the one or more external linking devices within the communication range of the wearable computing device by determining presence of at least one desktop computer or workstation within the communication range of the wearable computing device. For instance, the external linking device presence ascertaining module 102* of the wearable computing device 10* of FIG. 4A or 4B determining the presence of the one or more external linking devices 20* within the communication range 50* of the wearable computing device 10* by determining or ascertaining presence of at least one desktop computer or workstation within the communication range 50* of the wearable computing device 10*.

Figure 7G:
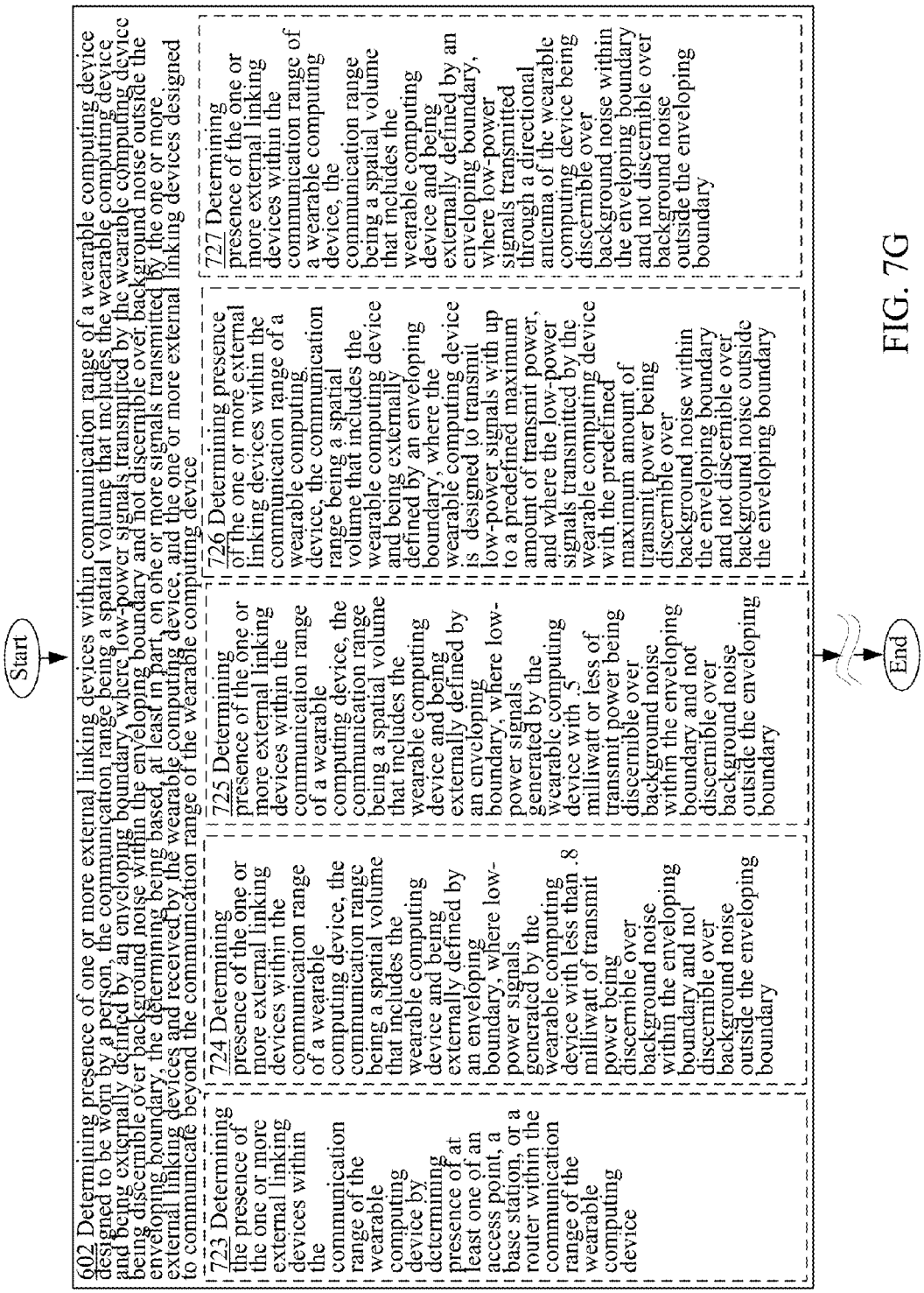
FIG. 7G is a high-level logic flowchart of a process depicting alternate implementations of the external linking device presence determining operation 602 of FIG. 6.

Referring now to FIG. 7G, in some implementations the external linking device presence determining operation 602 may include or involve an operation 723 for determining the presence of the one or more external linking devices within the communication range of the wearable computing device by determining presence of at least one of an access point, a base station, or a router within the communication range of the wearable computing device. For instance, the external linking device presence ascertaining module 102* of the wearable computing device 10* of FIG. 4A or 4B determining the presence of the one or more external linking devices 20* within the communication range 50* of the wearable computing device 10* by determining or ascertaining presence of at least one of an access point, a base station, or a router within the communication range 50* of the wearable computing device 10*.

In some implementations, the external linking device presence determining operation 602 may include or involve an operation 724 for determining presence of the one or more external linking devices within the communication range of a wearable computing device, the communication range being a spatial volume that includes the wearable computing device and being externally defined by an enveloping boundary, where low-power signals generated by the wearable computing device with less than 0.8 milliwatt of transmit power being discernible over background noise within the enveloping boundary and not discernible over background noise outside the enveloping boundary. For instance, the external linking device presence ascertaining module 102* of the wearable computing device 10* of FIG. 4A or 4B determining presence of the one or more external linking devices 20* within the communication range 50* of a wearable computing device 10*, the communication range 50* being a spatial volume that includes the wearable computing device 10* and being externally defined by an enveloping boundary 52*, where low-power signals 70* (see, for example, FIG. 2B) generated by the wearable computing device 10* with less than 0.8 milliwatt of transmit power being discernible over background noise within the enveloping boundary 52* and not discernible over background noise outside the enveloping boundary 52*. That is, references to "low-power signals" or similar such phrases may be in reference to wireless signals that were transmitted with low transmit power such as less than 0.8 milliwatt of transmit power.

In some implementations, the external linking device presence determining operation 602 may include or involve an operation 725 for determining presence of the one or more external linking devices within the communication range of a wearable computing device, the communication range being a spatial volume that includes the wearable computing device and being externally defined by an enveloping boundary, where low-power signals generated by the wearable computing device with 0.5 milliwatt or less of transmit power being discernible over background noise within the enveloping boundary and not discernible over background noise outside the enveloping boundary. For instance, the external linking device presence ascertaining module 102* of the wearable computing device 10* of FIG. 4A or 4B determining presence of the one or more external linking devices 20* within the communication range 50* of a wearable computing device 10*, the communication range 50* being a spatial volume that includes the wearable computing device 10* and being externally defined by an enveloping boundary 52*, where low-power signals 70* generated by the wearable computing device 10* with 0.5 milliwatt or less of transmit power being discernible over background noise (e.g., background noise as a result of, for example, background radiation) within the enveloping boundary 52* and not discernible over background noise outside the enveloping boundary 52*.

In some implementations, the external linking device presence determining operation 602 may include or involve an operation 726 for determining presence of the one or more external linking devices within the communication range of a wearable computing device, the communication range being a spatial volume that includes the wearable computing device and being externally defined by an enveloping boundary, where the wearable computing device is designed to transmit low-power signals with up to a predefined maximum amount of transmit power, and where the low-power signals transmitted by the wearable computing device with the predefined maximum of amount transmit power being discernible over background noise within the enveloping boundary and not discernible over background noise outside the enveloping boundary. For instance, the external linking device presence ascertaining module 102* of the wearable computing device 10* of FIG. 4A or 4B determining presence of the one or more external linking devices 20* within the communication range 50* of a wearable computing device 10*, the communication range 50* being a spatial volume that includes the wearable computing device 10* and being externally defined by an enveloping boundary 52*, where the wearable computing device 10* is designed to transmit via an antenna 130 low-power signals 70* with up to a predefined maximum amount of transmit power, and where the low-power signals 70* transmitted by the wearable computing device 10* with the predefined maximum amount of transmit power being discernible over background noise within the enveloping boundary 52* and not discernible over background noise outside the enveloping boundary 52*.

In some implementations, the external linking device presence determining operation 602 may include or involve an operation 727 for determining presence of the one or more external linking devices within the communication range of a wearable computing device, the communication range being a spatial volume that includes the wearable computing device and being externally defined by an enveloping boundary, where low-power signals transmitted through a directional antenna of the wearable computing device being discernible over background noise within the enveloping boundary and not discernible over background noise outside the enveloping boundary. For instance, the external linking device presence ascertaining module 102* of the wearable computing device 10* of FIG. 4A or 4B determining presence of the one or more external linking devices 20* within the communication range 50* of a wearable computing device 10*, the communication range 50* being a spatial volume that includes the wearable computing device 10* and being externally defined by an enveloping boundary 52*, where low-power signals 70* transmitted through a directional antenna (e.g., antenna 130 of FIG. 4A or 4B) of the wearable computing device 10* being discernible over background noise (e.g., noise as a result of background radiation) within the enveloping boundary 52* and not discernible over background noise outside the enveloping boundary 52*. Note that in various implementations, the directional antenna that may be employed by the wearable computing device 10* may be a metamaterial antenna.

Figure 7H:
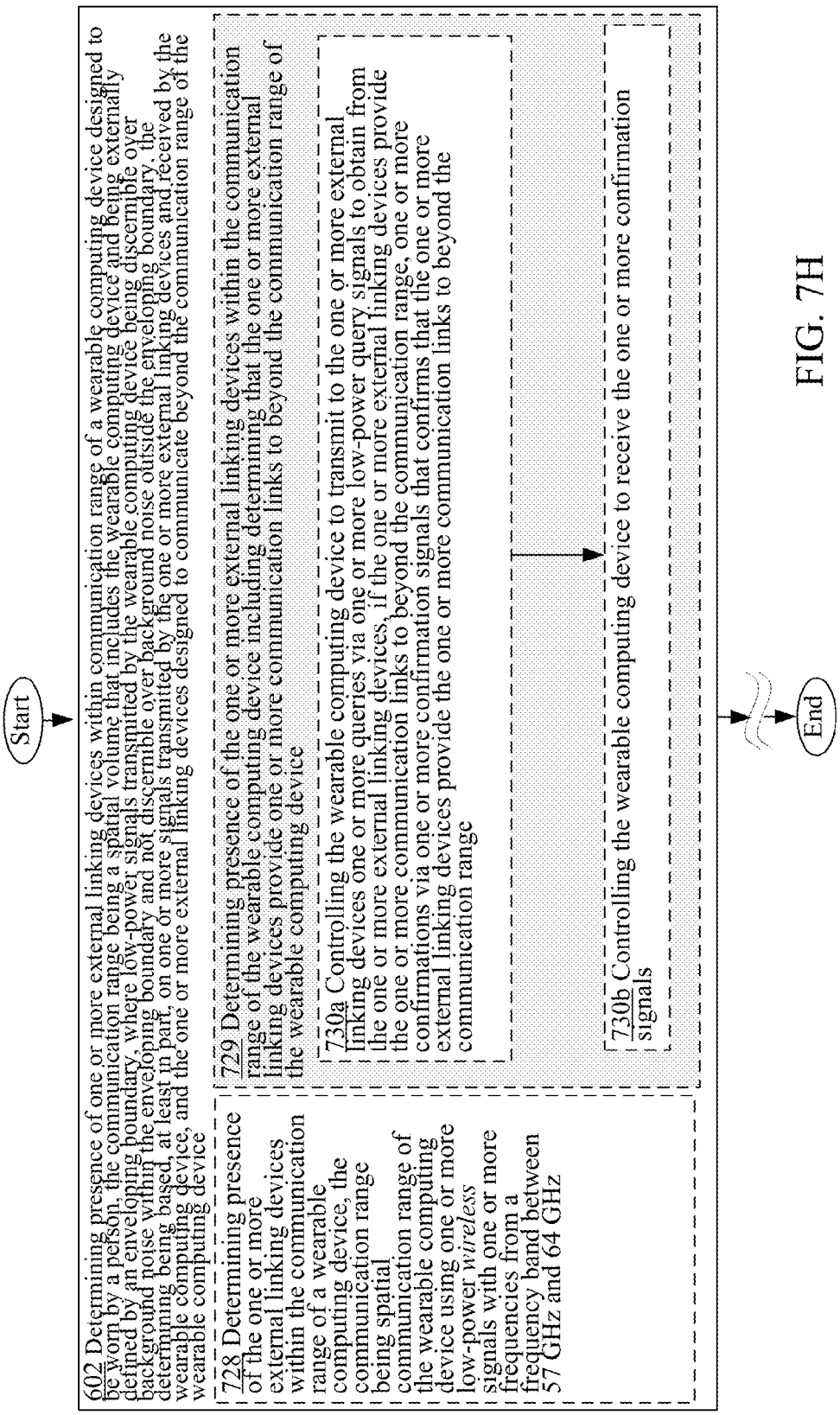
FIG. 7H is a high-level logic flowchart of a process depicting alternate implementations of the external linking device presence determining operation 602 of FIG. 6.

Turning now to FIG. 7H, in some implementations, the external linking device presence determining operation 602 may include or involve an operation 728 for determining presence of the one or more external linking devices within the communication range of a wearable computing device, the communication range being spatial communication range of the wearable computing device using one or more low-power wireless signals with one or more frequencies from a frequency band between 57 GHz and 64 GHz. For instance, the external linking device presence ascertaining module 102* of the wearable computing device 10* of FIG. 4A or 4B determining presence of the one or more external linking devices 20* within the communication range 50* of a wearable computing device 10*, the communication range 50* being spatial communication range of the wearable computing device 10* using one or more low-power wireless signals with one or more frequencies from a frequency band between 57 GHz and 64 GHz.

In various implementations, the external linking device presence determining operation 602 may include or involve an operation 729 for determining presence of the one or more external linking devices within the communication range of the wearable computing device including determining that the one or more external linking devices provide one or more communication links to beyond the communication range of the wearable computing device. For instance, the external linking device presence ascertaining module 102* including the communication link capable device ascertaining module 524 (see FIG. 5A) of the wearable computing device 10* of FIG. 4A or 4B determining presence of the one or more external linking devices 20* within the communication range 50* of the wearable computing device 10* including determining, by the communication link capable device ascertaining module 524, that the one or more external linking devices 20* provide one or more communication links 90* (e.g., Wi-Fi links, cellular network links, Ethernet, and so forth) to beyond the communication range 50* of the wearable computing device 10*.

In order to implement operation 729, in some cases, operation 729 may actually include or involve an operation 730a for controlling the wearable computing device to transmit to the one or more external linking devices one or more queries via one or more low-power query signals to obtain from the one or more external linking devices, if the one or more external linking devices provide the one or more communication links to beyond the communication range, one or more confirmations via one or more confirmation signals that confirms that the one or more external linking devices provide the one or more communication links to beyond the communication range and an operation 730b for controlling the wearable computing device to receive the one or more confirmation signals. For instance, the communication link query broadcasting device controlling module 526 (see FIG. 5A) of the wearable computing device 10* of FIG. 4A or 4B controlling (e.g., directing, instructing, or configuring) the wearable computing device 10* to transmit or broadcast to the one or more external linking devices 20* one or more queries via one or more low-power query signals 84 to obtain from the one or more external linking devices 20*, if the one or more external linking devices 20* provide the one or more communication links 90* to beyond the communication range 50*, one or more confirmations via one or more confirmation signals 85 that confirms that the one or more external linking devices 20* provide the one or more communication links 90* to beyond the communication range 50* and the communication link confirmation receiving device controlling module 528 (see FIG. 5A) of the wearable computing device 10* of FIG. 4A or 4B controlling (e.g., directing, instructing, o configuring) the wearable computing device 10* to receive the one or more confirmation signals 85.

Figure 7J:
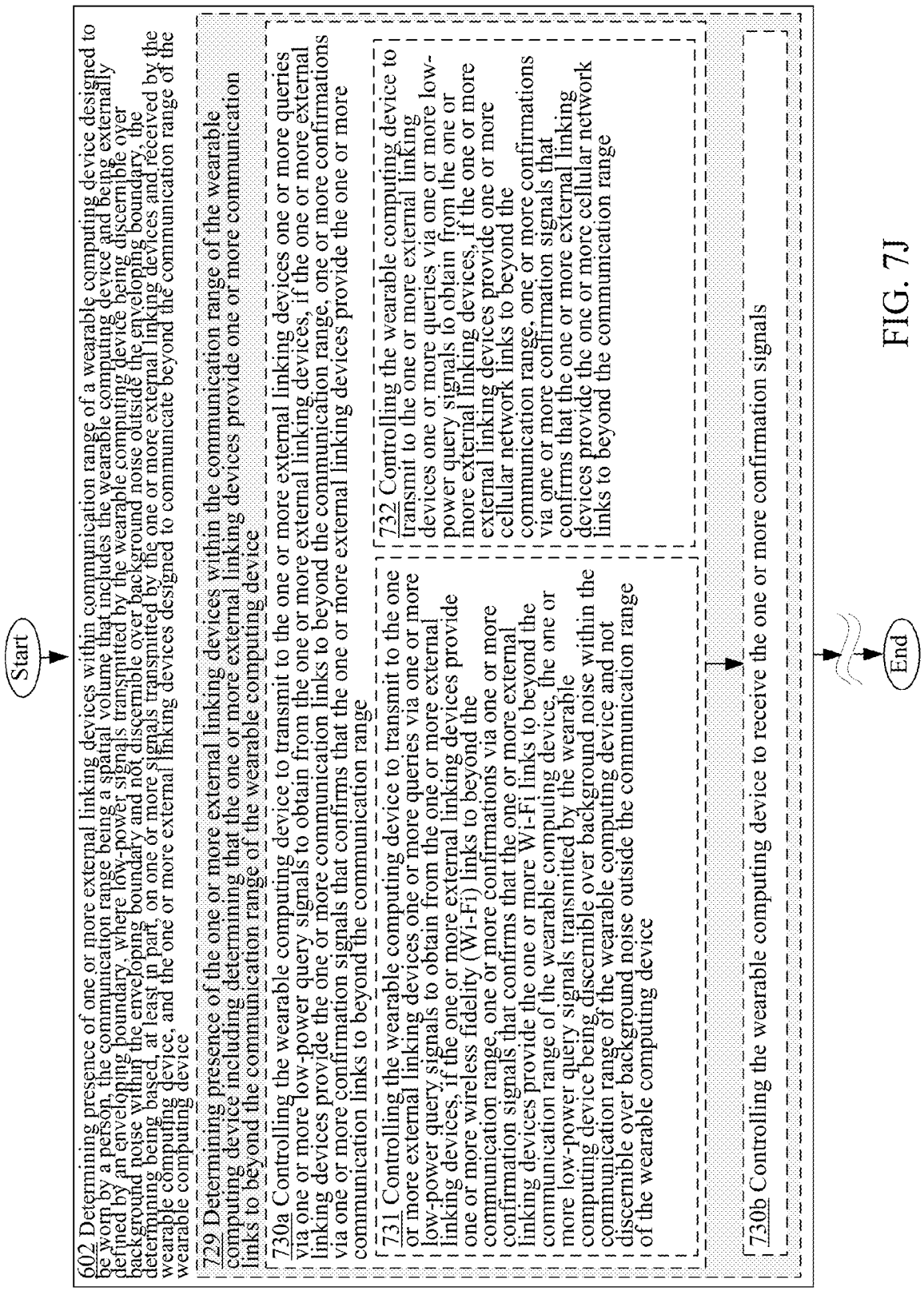
FIG. 7J is a high-level logic flowchart of a process depicting alternate implementations of the external linking device presence determining operation 602 of FIG. 6.

Referring now to FIG. 7J, in various implementations, operation 730a may actually include or involve an operation 731 for controlling the wearable computing device to transmit to the one or more external linking devices one or more queries via one or more low-power query signals to obtain from the one or more external linking devices, if the one or more external linking devices provide one or more wireless fidelity (Wi-Fi) links to beyond the communication range, one or more confirmations via one or more confirmation signals that confirms that the one or more external linking devices provide the one or more Wi-Fi links to beyond the communication range of the wearable computing device, the one or more low-power query signals transmitted by the wearable computing device being discernible over background noise within the communication range of the wearable computing device and not discernible over background noise outside the communication range of the wearable computing device. For instance, the communication link query broadcasting device controlling module 526 of the wearable computing device 10* of FIG. 4A or 4B controlling (e.g., directing, instructing, or configuring) the wearable computing device 10* to transmit or broadcast to the one or more external linking devices 20* one or more queries via one or more low-power query signals 84 to obtain from the one or more external linking devices 20*, if the one or more external linking devices 20* provide one or more wireless fidelity (Wi-Fi) links to beyond the communication range 50*, one or more confirmations via one or more confirmation signals 85 that confirms that the one or more external linking devices 20* provide the one or more Wi-Fi links to beyond the communication range 50* of the wearable computing device 10*, the one or more low-power query signals 84 (e.g., query signals transmitted with less than 0.8 milliwatt of transmit power) transmitted by the wearable computing device 10* being discernible over background noise (e.g., noise as result of background radiation) within the communication range 50* of the wearable computing device 10* and not discernible over background noise outside the communication range 50* of the wearable computing device 10*.

In the same or alternative implementations, operation 730a may additionally or alternatively include an operation 732 for controlling the wearable computing device to transmit to the one or more external linking devices one or more queries via one or more low-power query signals to obtain from the one or more external linking devices, if the one or more external linking devices provide one or more cellular network links to beyond the communication range, one or more confirmations via one or more confirmation signals that confirms that the one or more external linking devices provide the one or more cellular network links to beyond the communication range. For instance, the communication link query broadcasting device controlling module 526 of the wearable computing device 10* of FIG. 4A or 4B controlling (e.g., directing, instructing, or configuring) the wearable computing device 10* to transmit or broadcast to the one or more external linking devices 20* one or more queries via one or more low-power query signals 84 to obtain from the one or more external linking devices 20*, if the one or more external linking devices 20* provide one or more cellular network links to beyond the communication range 50*, one or more confirmations via one or more confirmation signals 85 that confirms that the one or more external linking devices 20* provide the one or more cellular network links to beyond the communication range 50*.

Figure 7K:
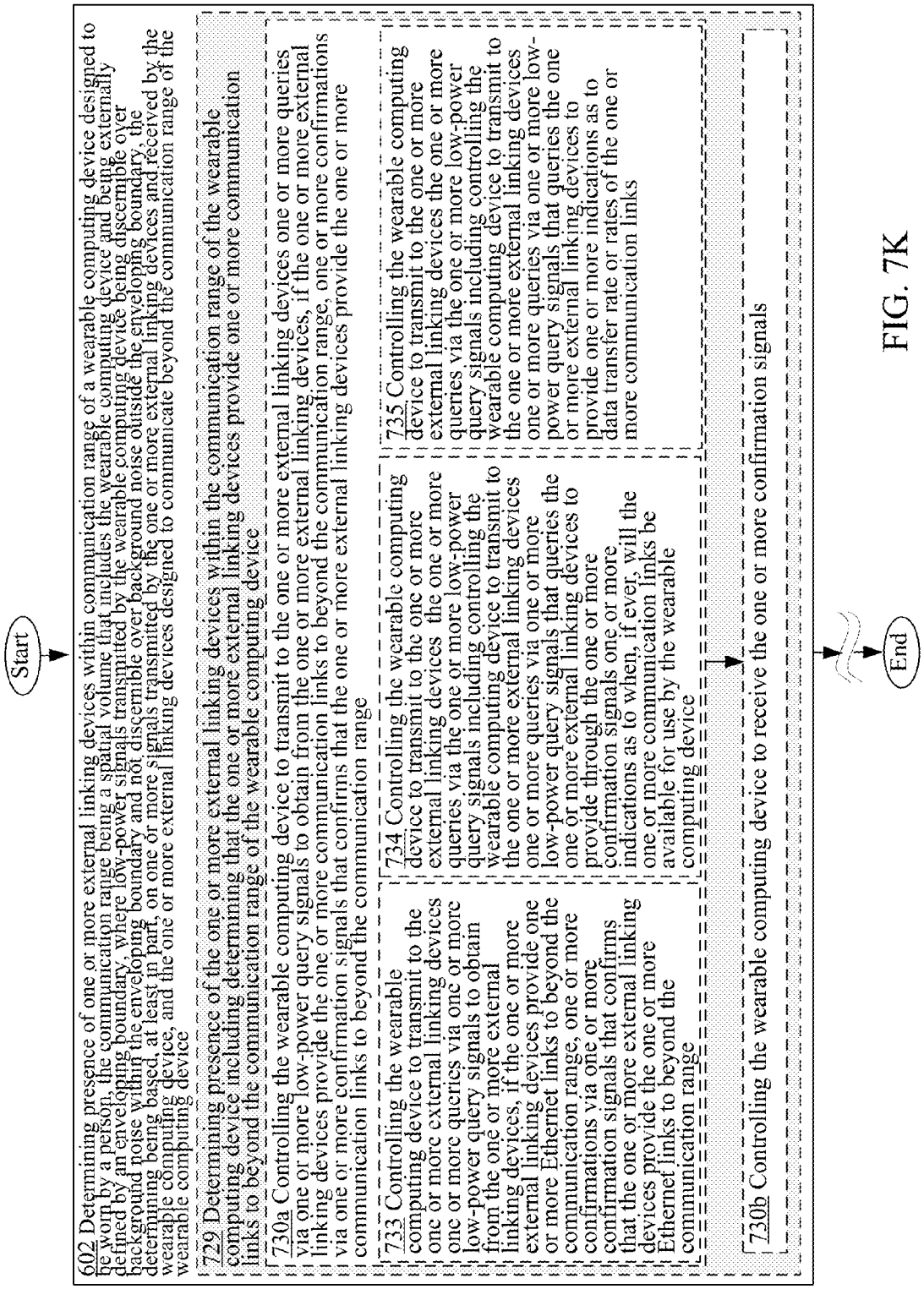
FIG. 7K is a high-level logic flowchart of a process depicting alternate implementations of the external linking device presence determining operation 602 of FIG. 6.

In the same or alternative implementations, operation 730a may additionally or alternatively include an operation 733 for controlling the wearable computing device to transmit to the one or more external linking devices one or more queries via one or more low-power query signals to obtain from the one or more external linking devices, if the one or more external linking devices provide one or more Ethernet links to beyond the communication range, one or more confirmations via one or more confirmation signals that confirms that the one or more external linking devices provide the one or more Ethernet links to beyond the communication range as illustrated in FIG. 7K. For instance, the communication link query broadcasting device controlling module 526 of the wearable computing device 10* of FIG. 4A or 4B controlling (e.g., directing, instructing, or configuring) the wearable computing device 10* to transmit or broadcast to the one or more external linking devices 20* one or more queries via one or more low-power query signals 84 to obtain from the one or more external linking devices 20*, if the one or more external linking devices 20* provide one or more Ethernet links to beyond the communication range 50*, one or more confirmations via one or more confirmation signals 85 that confirms that the one or more external linking devices 20* provide the one or more Ethernet links to beyond the communication range 50*.

In the same or alternative implementations, operation 730a may additionally or alternatively include an operation 734 for controlling the wearable computing device to transmit to the one or more external linking devices the one or more queries via the one or more low-power query signals including controlling the wearable computing device to transmit to the one or more external linking devices one or more queries via one or more low-power query signals that queries the one or more external linking devices to provide through the one or more confirmation signals one or more indications as to when, if ever, will the one or more communication links be available for use by the wearable computing device. For instance, the communication link query broadcasting device controlling module 526 of the wearable computing device 10* of FIG. 4A or 4B controlling the wearable computing device 10* to transmit or broadcast to the one or more external linking devices 10* the one or more queries via the one or more low-power query signals 84 including controlling (e.g., directing, instructing, or configuring) the wearable computing device 10* to transmit or broadcast to the one or more external linking devices 20* one or more queries via one or more low-power query signals 84 that queries the one or more external linking devices 20* to provide through the one or more confirmation signals 85 one or more indications as to when, if ever, will the one or more communication links 90* be available for use by the wearable computing device 10*.

In the same or alternative implementations, operation 730a may additionally or alternatively include an operation 735 for controlling the wearable computing device to transmit to the one or more external linking devices the one or more queries via the one or more low-power query signals including controlling the wearable computing device to transmit to the one or more external linking devices one or more queries via one or more low-power query signals that queries the one or more external linking devices to provide one or more indications as to data transfer rate or rates of the one or more communication links. For instance, the communication link query broadcasting device controlling module 526 of the wearable computing device 10* of FIG. 4A or 4B controlling the wearable computing device 10* to transmit or broadcast to the one or more external linking devices 20* the one or more queries via the one or more low-power query signals 84 including controlling (e.g., directing, instructing, or configuring) the wearable computing device 10* to transmit or broadcast to the one or more external linking devices 20* one or more queries via one or more low-power query signals 84 that queries the one or more external linking devices 20* to provide one or more indications as to data transfer rate or rates of the one or more communication links 90*.

Figure 7L:
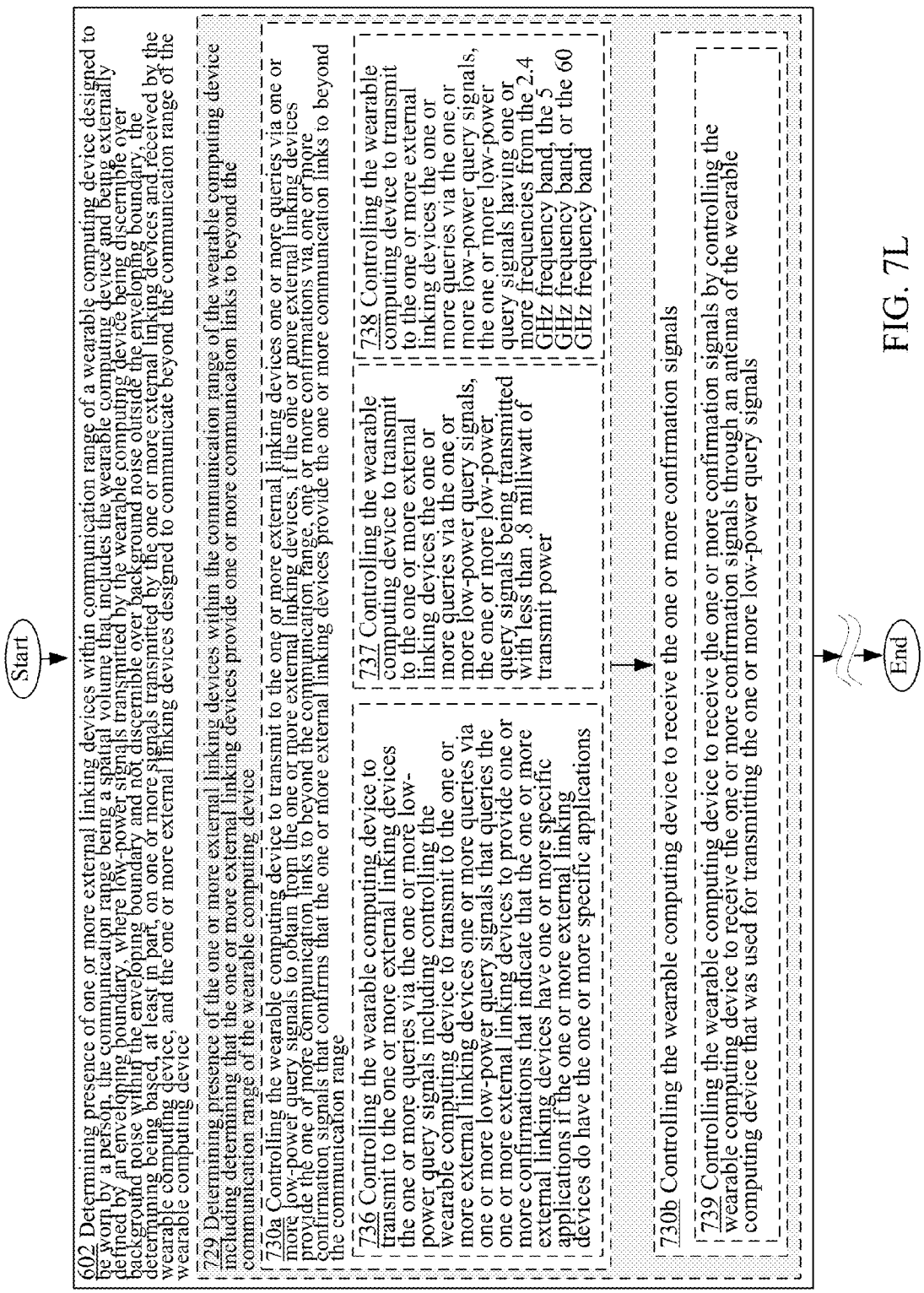
FIG. 7L is a high-level logic flowchart of a process depicting alternate implementations of the external linking device presence determining operation 602 of FIG. 6.

Referring to FIG. 7L, in the same or alternative implementations, operation 730a may additionally or alternatively include an operation 736 for controlling the wearable computing device to transmit to the one or more external linking devices the one or more queries via the one or more low-power query signals including controlling the wearable computing device to transmit to the one or more external linking devices one or more queries via one or more low-power query signals that queries the one or more external linking devices to provide one or more confirmations that indicate that the one or more external linking devices have one or more specific applications if the one or more external linking devices do have the one or more specific applications. For instance, the communication link query broadcasting device controlling module 526 including the application query broadcasting device controlling module 530 (see FIG. 5A) of the wearable computing device 10* of FIG. 4A or 4B controlling the wearable computing device 10* to transmit to the one or more external linking devices 20* the one or more queries via the one or more low-power query signals 84 including controlling (e.g., directing, instructing, or configuring), by the application query broadcasting device controlling module 530, the wearable computing device 10* to transmit or broadcast to the one or more external linking devices 20* one or more queries via one or more low-power query signals 84 that queries the one or more external linking devices 20* to provide one or more confirmations (e.g., via one or more confirmation signals 85) that indicate that the one or more external linking devices 20* have one or more specific applications (e.g., specific applications that support applications being executed by the wearable computing device such as IM or text messaging application) if the one or more external linking devices 20* do have the one or more specific applications.

In some implementations, operation 730a may include or involve an operation 737 for controlling the wearable computing device to transmit to the one or more external linking devices the one or more queries via the one or more low-power query signals, the one or more low-power query signals being transmitted with less than 0.8 milliwatt of transmit power. For instance, the communication link query broadcasting device controlling module 526 of the wearable computing device 10* of FIG. 4A or 4B controlling (e.g., directing, instructing, or configuring) the wearable computing device 10* to transmit to the one or more external linking devices 20* the one or more queries via the one or more low-power query signals 84, the one or more low-power query signals 84 being transmitted through an antenna 130 of the wearable computing device 10* with less than 0.8 milliwatt of transmit power.

In some implementations, operation 730a may include or involve an operation 738 for controlling the wearable computing device to transmit to the one or more external linking devices the one or more queries via the one or more low-power query signals, the one or more low-power query signals having one or more frequencies from the 2.4 GHz frequency band, the 5 GHz frequency band, or the 60 GHz frequency band. For instance, the communication link query broadcasting device controlling module 526 of the wearable computing device 10* of FIG. 4A or 4B controlling (e.g., directing, instructing, or configuring) the wearable computing device 10* to transmit or broadcast to the one or more external linking devices 20* the one or more queries via the one or more low-power query signals 84, the one or more low-power query signals 84 having one or more frequencies from the 2.4 GHz frequency band (e.g., frequency range between 2.400 GHz and 2.4835 GHz), the 5 GHz frequency band (e.g., frequency range between 5.180 GHz and 5.825 GHz), or the 60 GHz frequency band (e.g., frequency range between 57 GHz and 64 GHz).

In some implementations, operation 730b for controlling the wearable computing device to receive the one or more confirmation signals may actually include or involve an operation 739 for controlling the wearable computing device to receive the one or more confirmation signals by controlling the wearable computing device to receive the one or more confirmation signals through an antenna of the wearable computing device that was used for transmitting the one or more low-power query signals. For instance, the communication link confirmation receiving device controlling module 528 of the wearable computing device 10* of FIG. 4A or 4B controlling the wearable computing device 10* to receive the one or more confirmation signals 85 by controlling (e.g., directing, instructing, or configuring) the wearable computing device 10* to receive the one or more confirmation signals 85 through an antenna 130 (e.g., a directional antenna such as a metamaterial antenna or an omnidirectional antenna) of the wearable computing device 10* that was used for transmitting the one or more low-power query signals 84.

Figure 7M:
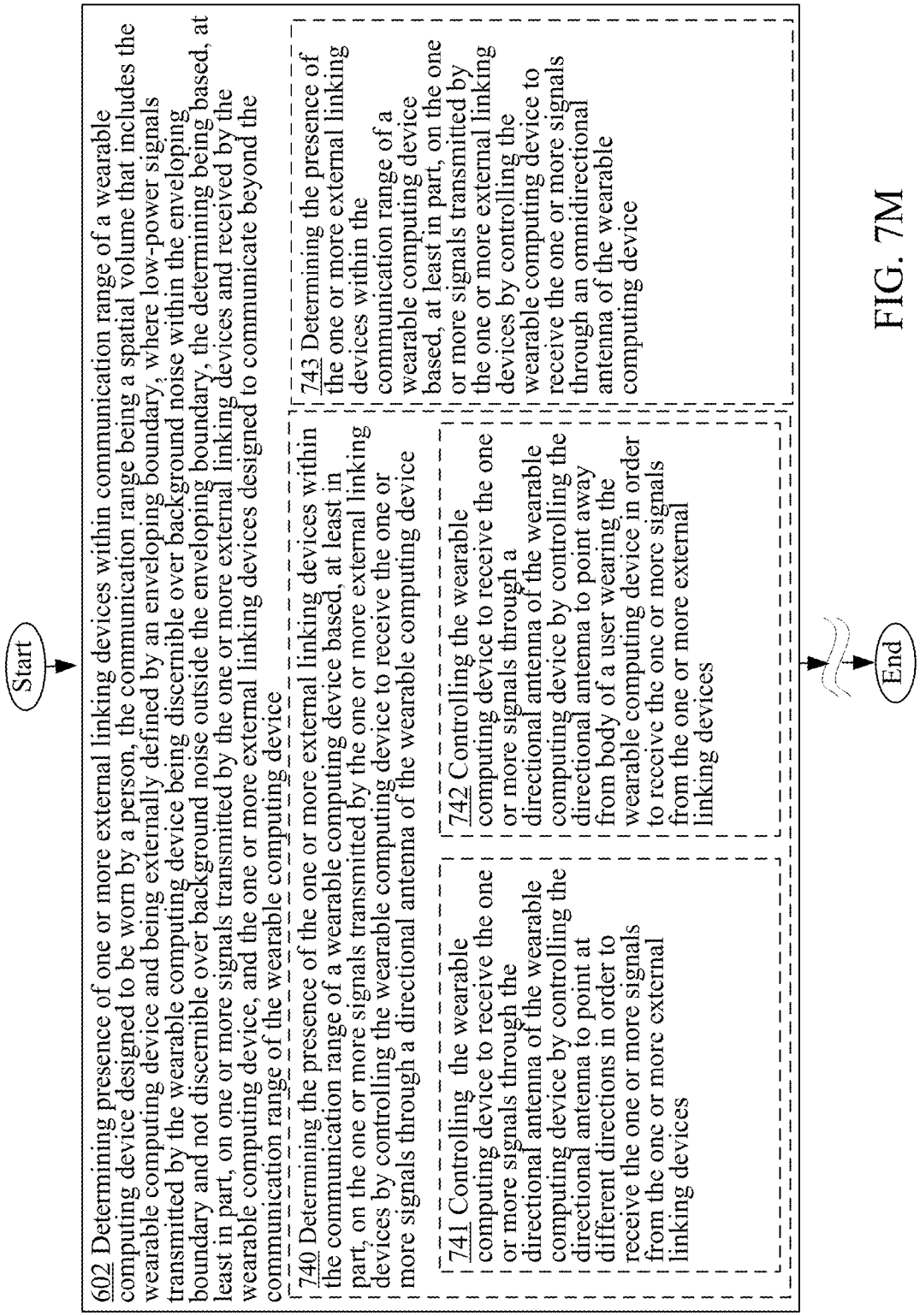
FIG. 7M is a high-level logic flowchart of a process depicting alternate implementations of the external linking device presence determining operation 602 of FIG. 6.

Referring to FIG. 7M, in various implementations, the external linking device presence determining operation 602 may include or involve an operation 740 for determining the presence of the one or more external linking devices within the communication range of a wearable computing device based, at least in part, on the one or more signals transmitted by the one or more external linking devices by controlling the wearable computing device to receive the one or more signals through a directional antenna of the wearable computing device. For instance, the external linking device presence ascertaining module 102* including the receiving directional antenna controlling module 530 (see FIG. 5A) of the wearable computing device 10* of FIG. 4A or 4B determining or ascertaining the presence of the one or more external linking devices 20* within the communication range 50* of a wearable computing device 10* based, at least in part, on the one or more signals 80 transmitted by the one or more external linking devices 20* when the receiving directional antenna controlling module 530 controls the wearable computing device 10* to receive the one or more signals 80 through a directional antenna (e.g., metamaterial antenna) of the wearable computing device 10*.

In some cases, operation 740 may further include or involve an operation 741 for controlling the wearable computing device to receive the one or more signals through the directional antenna of the wearable computing device by controlling the directional antenna to point at different directions in order to receive the one or more signals from the one or more external linking devices. For instance, the receiving directional antenna controlling module 530 of the wearable computing device 10* of FIG. 4A or 4B controlling the wearable computing device 10* to receive the one or more signals 80 through the directional antenna of the wearable computing device 10* by controlling (e.g., directing, instructing, or configuring) the directional antenna to point at different directions (e.g., adjusting field of regard of the directional antenna) in order to receive the one or more signals 80 from the one or more external linking devices 20*.

In the same or alternative implementations, operation 740 may additionally or alternatively include or involve an operation 742 for controlling the wearable computing device to receive the one or more signals through a directional antenna of the wearable computing device by controlling the directional antenna to point away from the body of a user wearing the wearable computing device in order to receive the one or more signals from the one or more external linking devices.

For instance, the receiving directional antenna controlling module 530 of the wearable computing device 10* of FIG. 4A or 4B controlling the wearable computing device 10* to receive the one or more signals 80 through a directional antenna of the wearable computing device 10* by controlling (e.g., directing, instructing, or configuring) the directional antenna (e.g., adjusting field of regard of the directional antenna) to point away from body of a user wearing the wearable computing device 10* in order to receive the one or more signals 80 from the one or more external linking devices 20*.

In various implementations, the external linking device presence determining operation 602 may include or involve and an operation 743 for determining the presence of the one or more external linking devices within the communication range of a wearable computing device based, at least in part, on the one or more signals transmitted by the one or more external linking devices by controlling the wearable computing device to receive the one or more signals through an omnidirectional antenna of the wearable computing device. For instance, the external linking device presence ascertaining module 102* including the receiving omnidirectional antenna controlling module 532 (see FIG. 5A) of the wearable computing device 10* of FIG. 4A or 4B determining the presence of the one or more external linking devices 20* within the communication range 50* of the wearable computing device 10* based, at least in part, on the one or more signals 80 transmitted by the one or more external linking devices 20* when the receiving omnidirectional antenna controlling module 532 controls (e.g., directs, instructs, or configures) the wearable computing device 10* to receive the one or more signals 80 through an omnidirectional antenna of the wearable computing device 10*.

Figure 8A:
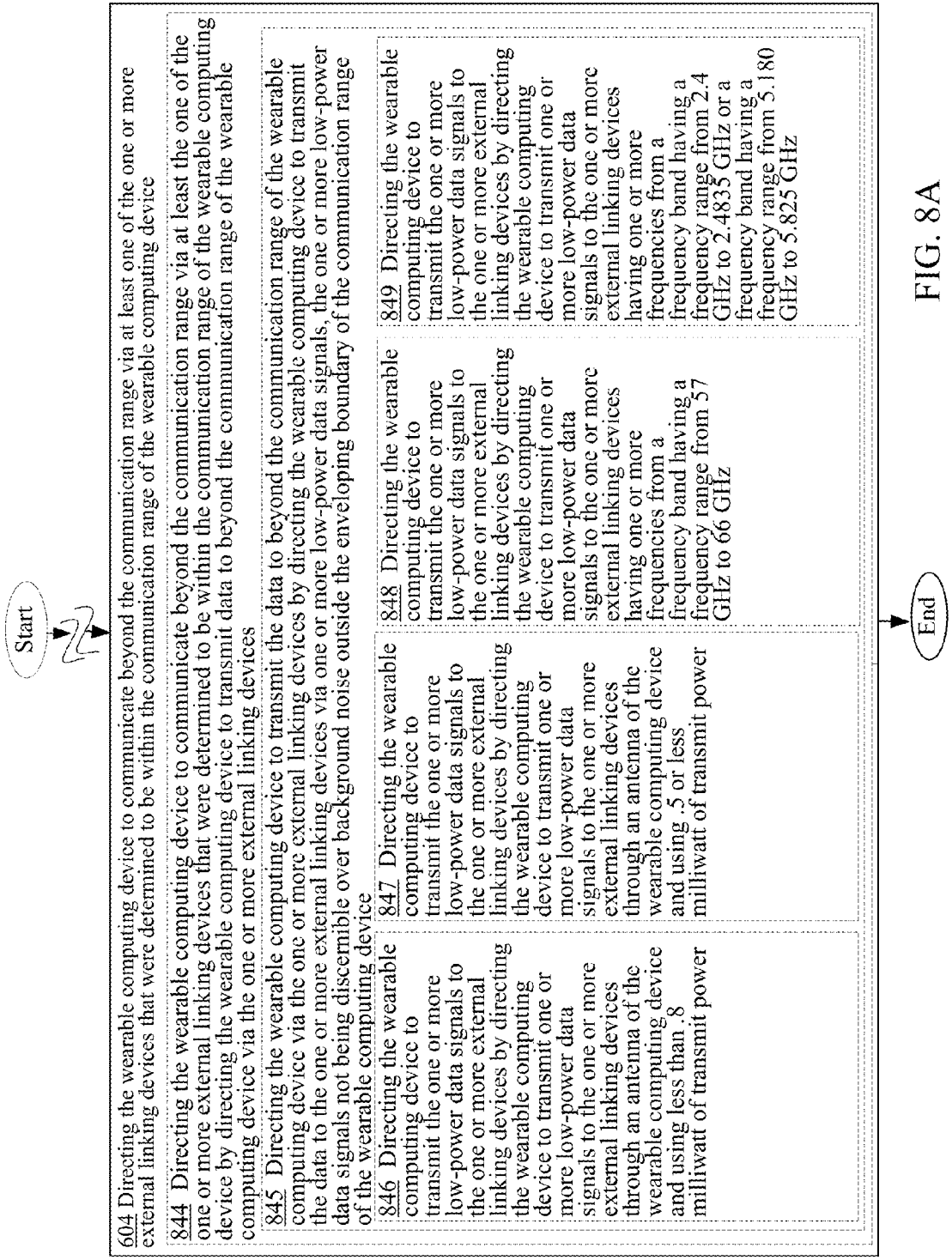
FIG. 8A is a high-level logic flowchart of a process depicting alternate implementations of the communicating directing operation 604 of FIG. 6.

Referring back to the communicating directing operation 604 of FIG. 6, the communicating directing operation 604 similar to the external linking device presence determining operation 602 of FIG. 6 may be executed in a number of different ways in various alternative embodiments as illustrated, for example, in FIGS. 8A, 8B, 8C, 8D, 8E, 8F, 8G, 8H, and 8J. In some cases, for example, the communicating directing operation 604 may actually include or involve an operation 844 for directing the wearable computing device to communicate beyond the communication range via at least the one of the one or more external linking devices that were determined to be within the communication range of the wearable computing device by directing the wearable computing device to transmit data to beyond the communication range of the wearable computing device via the one or more external linking devices as illustrated in FIG. 8A. For instance, the communicating device controlling module 104* including the data transmitting device controlling module 534 (see FIG. 5B) of the wearable computing device 10* of FIG. 4A or 4B directing the wearable computing device 10* to communicate beyond the communication range 50* via at least the one of the one or more external linking devices 20* that were determined to be within the communication range 50* of the wearable computing device 10* when the data transmitting device controlling module 534 directs or controls the wearable computing device 10* to transmit data (e.g., outbound data 86* of FIG. 1D) to beyond the communication range 50* of the wearable computing device 10* via the one or more external linking devices 20*. In various implementations, the wearable computing device 10* may be made to transmit the data (e.g., outbound data 86* of FIG. 1D) by controlling or directing one or more components of the wearable computing device 10* including, for example, a transceiver 118 and/or an antenna 130, to transmit low-power signals 70* (e.g., transmitted using less than 1 milliwatt of transmit power) embodying the data (e.g., outbound data 86*).

As further illustrated in FIG. 8A, operation 844 may further include one or more additional operations in various alternative implementations including, in some cases, an operation 845 for directing the wearable computing device to transmit the data to beyond the communication range of the wearable computing device via the one or more external linking devices by directing the wearable computing device to transmit the data to the one or more external linking devices via one or more low-power data signals, the one or more low-power data signals not being discernible over background noise outside the enveloping boundary of the communication range of the wearable computing device. For instance, the data transmitting device controlling module 534 of the wearable computing device 10* of FIG. 4A or 4B directing the wearable computing device 10* to transmit the data (e.g., outbound data 86*) to beyond the communication range 50* of the wearable computing device 10* via the one or more external linking devices 20* by directing or controlling the wearable computing device 10* to transmit the data (e.g., outbound data 86*) to the one or more external linking devices 20* via one or more low-power data signals (e.g., one or more low power signals 70*), the one or more low-power data signals 70* (e.g., signals transmitted with less than 0.8 milliwatt of transmit power) not being discernible over background noise (e.g., noise as a result of background radiation) outside the enveloping boundary 52* of the communication range 50* of the wearable computing device 10*.

In various implementations, operation 845 may further include or involve one or more additional operations including, in some cases, an operation 846 for directing the wearable computing device to transmit the one or more low-power data signals to the one or more external linking devices by directing the wearable computing device to transmit one or more low-power data signals to the one or more external linking devices through an antenna of the wearable computing device and using less than 0.8 milliwatt of transmit power. For instance, the data transmitting device controlling module 534 of the wearable computing device 10* of FIG. 4A or 4B directing the wearable computing device 10* to transmit the one or more low-power data signals (e.g., one or more low power signals 70*) to the one or more external linking devices 20* by directing or controlling the wearable computing device 10* to transmit or broadcast one or more low-power data signals (e.g., one or more low power signals 70*) to the one or more external linking devices 20* through an antenna 130 (e.g., omnidirectional or directional antenna) of the wearable computing device 10* and using less than 0.8 milliwatt of transmit power to transmit the one or more low-power data signals.

In some implementations, operation 845 may include or involve an operation 847 for directing the wearable computing device to transmit the one or more low-power data signals to the one or more external linking devices by directing the wearable computing device to transmit one or more low-power data signals to the one or more external linking devices through an antenna of the wearable computing device and using 0.5 or less milliwatt of transmit power. For instance, the data transmitting device controlling module 534 of the wearable computing device 10* of FIG. 4A or 4B directing the wearable computing device 10* to transmit the one or more low-power data signals (e.g., one or more low power signals 70*) to the one or more external linking devices 20* by directing or controlling the wearable computing device 10* to transmit one or more low-power data signals (e.g., one or more low power signals 70*) to the one or more external linking devices 20* through an antenna of the wearable computing device and using 0.5 or less milliwatt of transmit power to transmit the one or more low-power data signals.

In some implementations, operation 845 may include or involve an operation 848 for directing the wearable computing device to transmit the one or more low-power data signals to the one or more external linking devices by directing the wearable computing device to transmit one or more low-power data signals to the one or more external linking devices having one or more frequencies from a frequency band having a frequency range from 57 GHz to 64 GHz. For instance, the data transmitting device controlling module 534 of the wearable computing device 10* of FIG. 4A or 4B directing the wearable computing device 10* to transmit the one or more low-power data signals (e.g., one or more low power signals 70*) to the one or more external linking devices 20* by directing or controlling the wearable computing device 10* to transmit one or more low-power data signals (e.g., one or more low power signals 70*) to the one or more external linking devices 20* having one or more frequencies from a frequency band having a frequency range from 57 GHz to 64 GHz.

In some implementations, operation 845 may include or involve an operation 849 for directing the wearable computing device to transmit the one or more low-power data signals to the one or more external linking devices by directing the wearable computing device to transmit one or more low-power data signals to the one or more external linking devices having one or more frequencies from a frequency band having a frequency range from 2.4 GHz to 2.4835 GHz or a frequency band having a frequency range from 5.180 GHz to 5.825 GHz. For instance, the data transmitting device controlling module 534 of the wearable computing device 10* of FIG. 4A or 4B directing the wearable computing device 10* to transmit the one or more low-power data signals (e.g., one or more low power signals 70*) to the one or more external linking devices 20* by directing or controlling the wearable computing device 10* to transmit one or more low-power data signals (e.g., one or more low power signals 70*) to the one or more external linking devices 20* having one or more frequencies from a frequency band having a frequency range from 2.4 GHz to 2.4835 GHz or a frequency band having a frequency range from 5.180 GHz to 5.825 GHz.

Figure 8B:
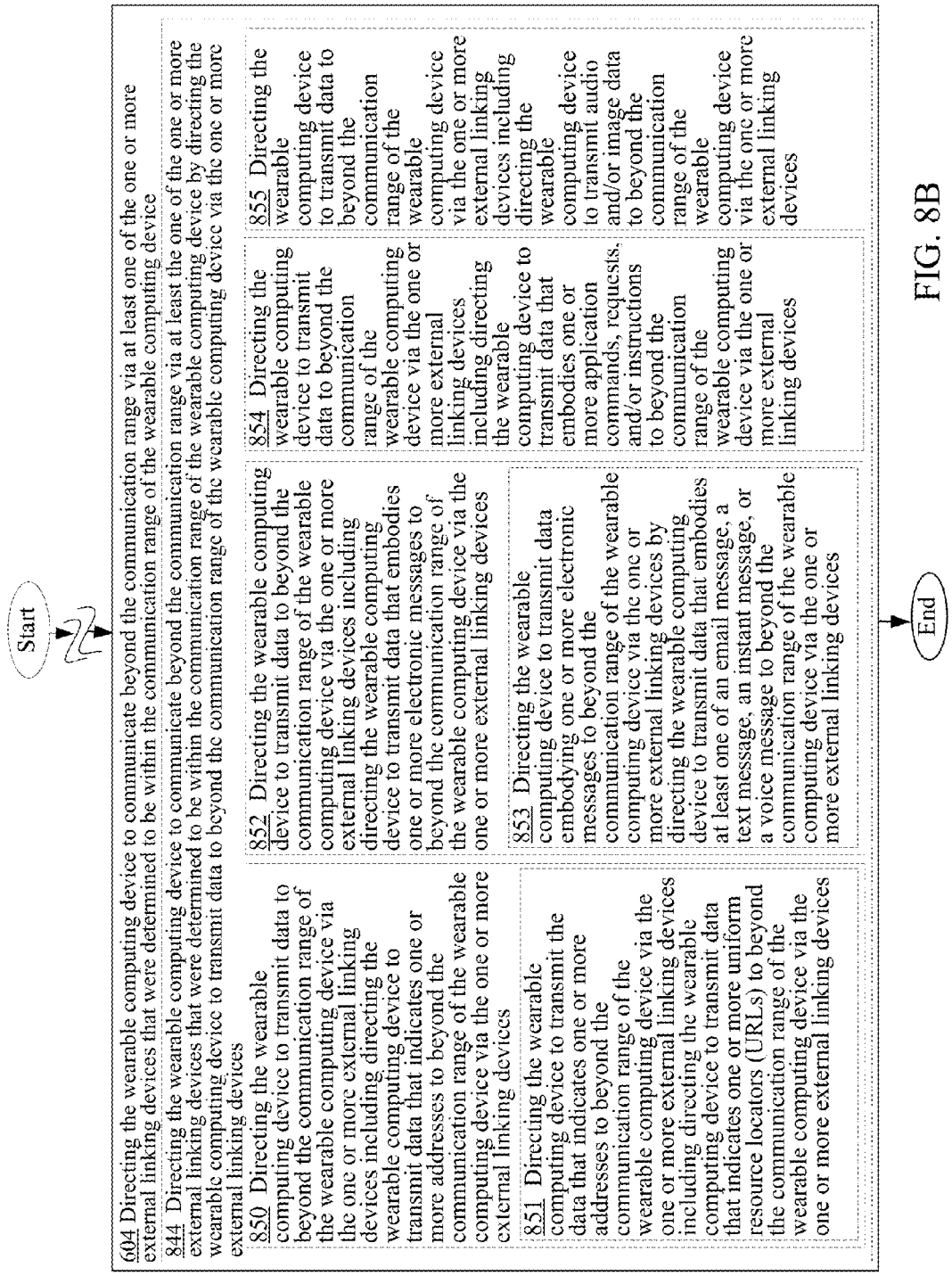
FIG. 8B is a high-level logic flowchart of a process depicting alternate implementations of the communicating directing operation 604 of FIG. 6.

In some implementations, operation 844 for directing the wearable computing device to communicate beyond the communication range via at least the one of the one or more external linking devices that were determined to be within the communication range of the wearable computing device by directing the wearable computing device to transmit data to beyond the communication range of the wearable computing device via the one or more external linking devices may include or involve an operation 850 for directing the wearable computing device to transmit data to beyond the communication range of the wearable computing device via the one or more external linking devices including directing the wearable computing device to transmit data that indicates one or more addresses to beyond the communication range of the wearable computing device via the one or more external linking devices as illustrated in FIG. 8B. For instance, the data transmitting device controlling module 534 of the wearable computing device 10* of FIG. 4A or 4B directing the wearable computing device 10* to transmit data (e.g., outbound data 86*) to beyond the communication range 50* of the wearable computing device 10* via the one or more external linking devices 20* including directing or controlling the wearable computing device 10* to transmit data (e.g., outbound data 86*) that indicates one or more addresses to beyond the communication range 50* of the wearable computing device 10* via the one or more external linking devices 20*.

In some cases, operation 850 may further include or involve an operation 851 for directing the wearable computing device to transmit the data that indicates one or more addresses to beyond the communication range of the wearable computing device via the one or more external linking devices including directing the wearable computing device to transmit data that indicates one or more uniform resource locators (URLs) to beyond the communication range of the wearable computing device via the one or more external linking devices. For instance, the data transmitting device controlling module 534 of the wearable computing device 10* of FIG. 4A or 4B directing the wearable computing device 10* to transmit the data (e.g. outbound data 86*) that indicates one or more addresses to beyond the communication range 50* of the wearable computing device 10* via the one or more external linking devices 20* including directing or controlling the wearable computing device 10* to transmit data (e.g., outbound data 86*) that indicates one or more uniform resource locators (URLs) to beyond the communication range 50* of the wearable computing device 10* via the one or more external linking devices 20*.

In the same or alternative implementations, operation 844 may include or involve an operation 852 for directing the wearable computing device to transmit data to beyond the communication range of the wearable computing device via the one or more external linking devices including directing the wearable computing device to transmit data that embodies one or more electronic messages to beyond the communication range of the wearable computing device via the one or more external linking devices. For instance, the data transmitting device controlling module 534 of the wearable computing device 10* of FIG. 4A or 4B directing the wearable computing device 10* to transmit data (e.g., outbound data 86*) to beyond the communication range of the wearable computing device 10* via the one or more external linking devices 20* including directing or controlling the wearable computing device 10* to transmit data (e.g., outbound data 86*) that embodies one or more electronic messages (e.g., user generated textual, audio, and/or video messages) to beyond the communication range 50* of the wearable computing device 10* via the one or more external linking devices 20*.

In some cases, operation 852 may actually include or involve an operation 853 for directing the wearable computing device to transmit data embodying one or more electronic messages to beyond the communication range of the wearable computing device via the one or more external linking devices by directing the wearable computing device to transmit data that embodies at least one of an email message, a text message, an instant message, or a voice message to beyond the communication range of the wearable computing device via the one or more external linking devices. For instance, the data transmitting device controlling module 534 of the wearable computing device 10* of FIG. 4A or 4B directing the wearable computing device 10* to transmit data (e.g., outbound data 86*) embodying one or more electronic messages to beyond the communication range 50* of the wearable computing device 10* via the one or more external linking devices 20* by directing or controlling the wearable computing device 10* to transmit data (e.g., outbound data 86*) that embodies at least one of an email message, a text message, an instant message, or a voice message (e.g., telephone call) to beyond the communication range 50* of the wearable computing device 10* via the one or more external linking devices 20*.

In the same or alternative implementations, operation 844 may include or involve an operation 854 for directing the wearable computing device to transmit data to beyond the communication range of the wearable computing device via the one or more external linking devices including directing the wearable computing device to transmit data that embodies one or more application commands, requests, and/or instructions to beyond the communication range of the wearable computing device via the one or more external linking devices. For instance, the data transmitting device controlling module 534 of the wearable computing device 10* of FIG. 4A or 4B directing the wearable computing device 10* to transmit data to beyond the communication range 50* of the wearable computing device 10* via the one or more external linking devices 20* including directing or controlling the wearable computing device 10* to transmit data (e.g. outbound data 86*) that embodies one or more application commands, requests, and/or instructions (e.g., gaming commands or commands for web-based word processing applications, email retrieval requests, and so forth) to beyond the communication range 50* of the wearable computing device 10* via the one or more external linking devices 20*.

In the same or alternative implementations, operation 844 may include or involve an operation 855 for directing the wearable computing device to transmit data to beyond the communication range of the wearable computing device via the one or more external linking devices including directing the wearable computing device to transmit audio and/or image data to beyond the communication range of the wearable computing device via the one or more external linking devices. For instance, the data transmitting device controlling module 534 of the wearable computing device 10* of FIG. 4A or 4B directing the wearable computing device 10* to transmit data to beyond the communication range 50* of the wearable computing device 10* via the one or more external linking devices 20* including directing or controlling the wearable computing device 10* to transmit audio and/or image data (e.g., outbound data 86*) to beyond the communication range 50* of the wearable computing device 10* via the one or more external linking devices 20*.

Figure 8C:
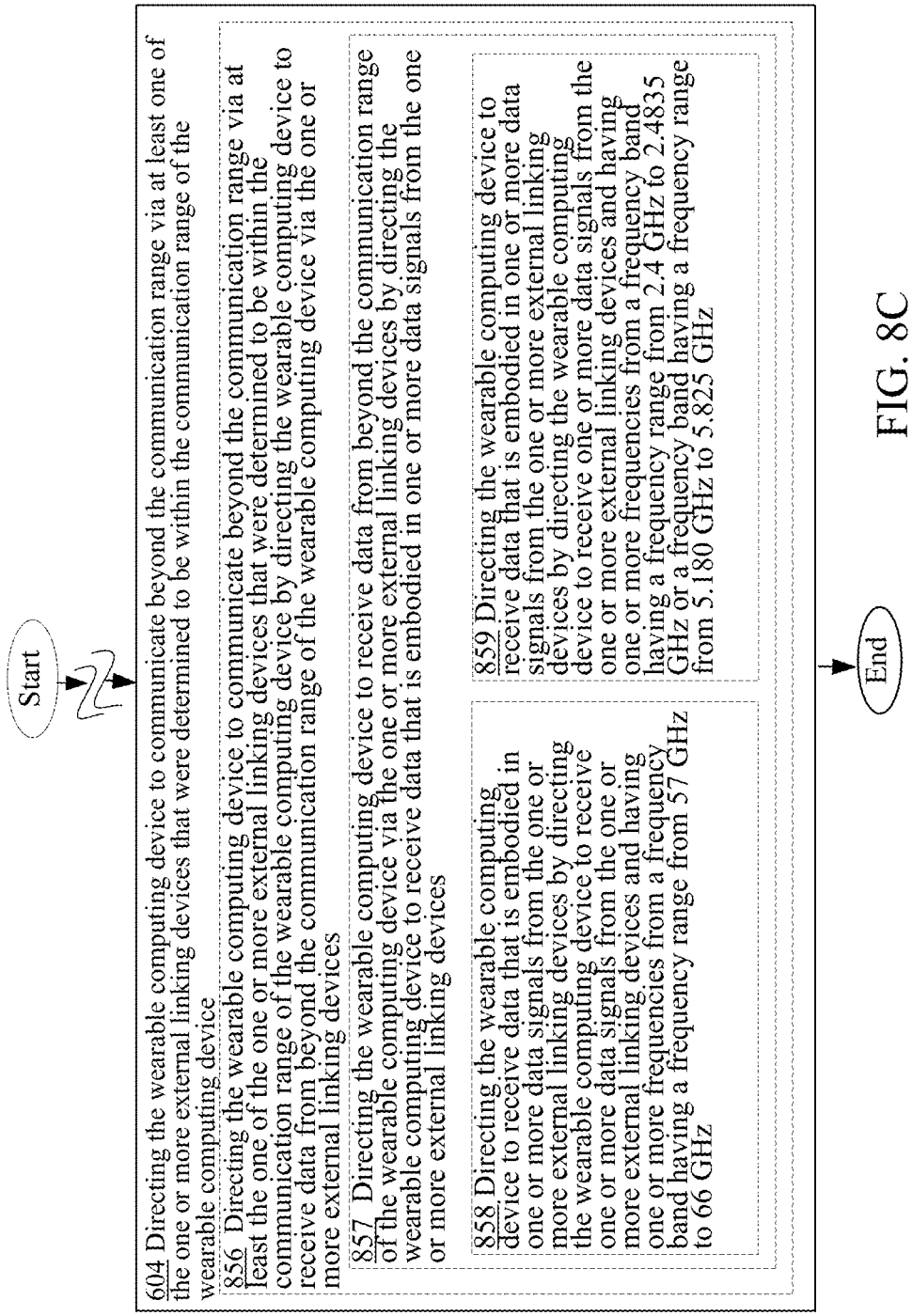
FIG. 8C is a high-level logic flowchart of a process depicting alternate implementations of the communicating directing operation 604 of FIG. 6.
Figure 8D:
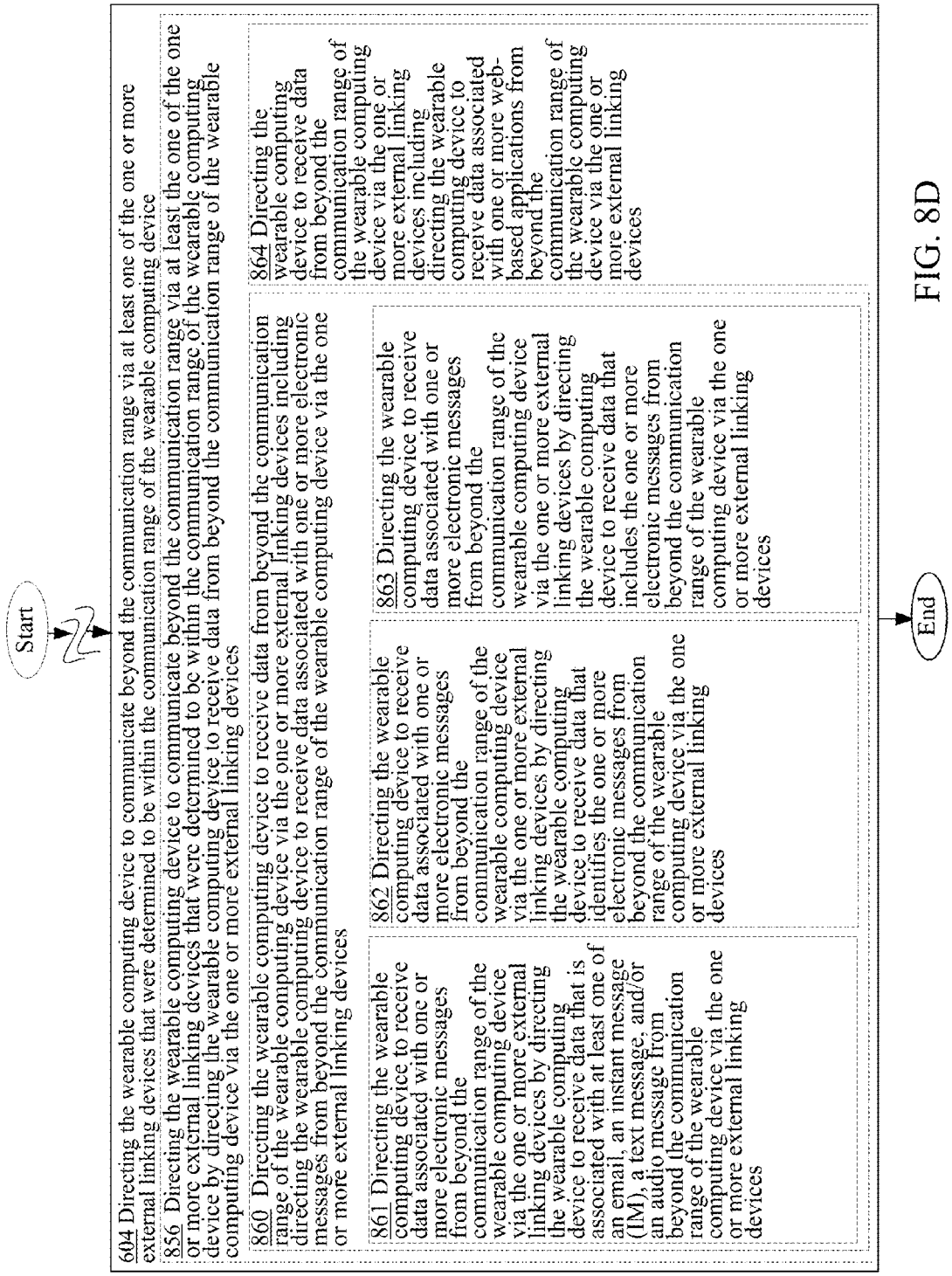
FIG. 8D is a high-level logic flowchart of a process depicting alternate implementations of the communicating directing operation 604 of FIG. 6.
Figure 8E:
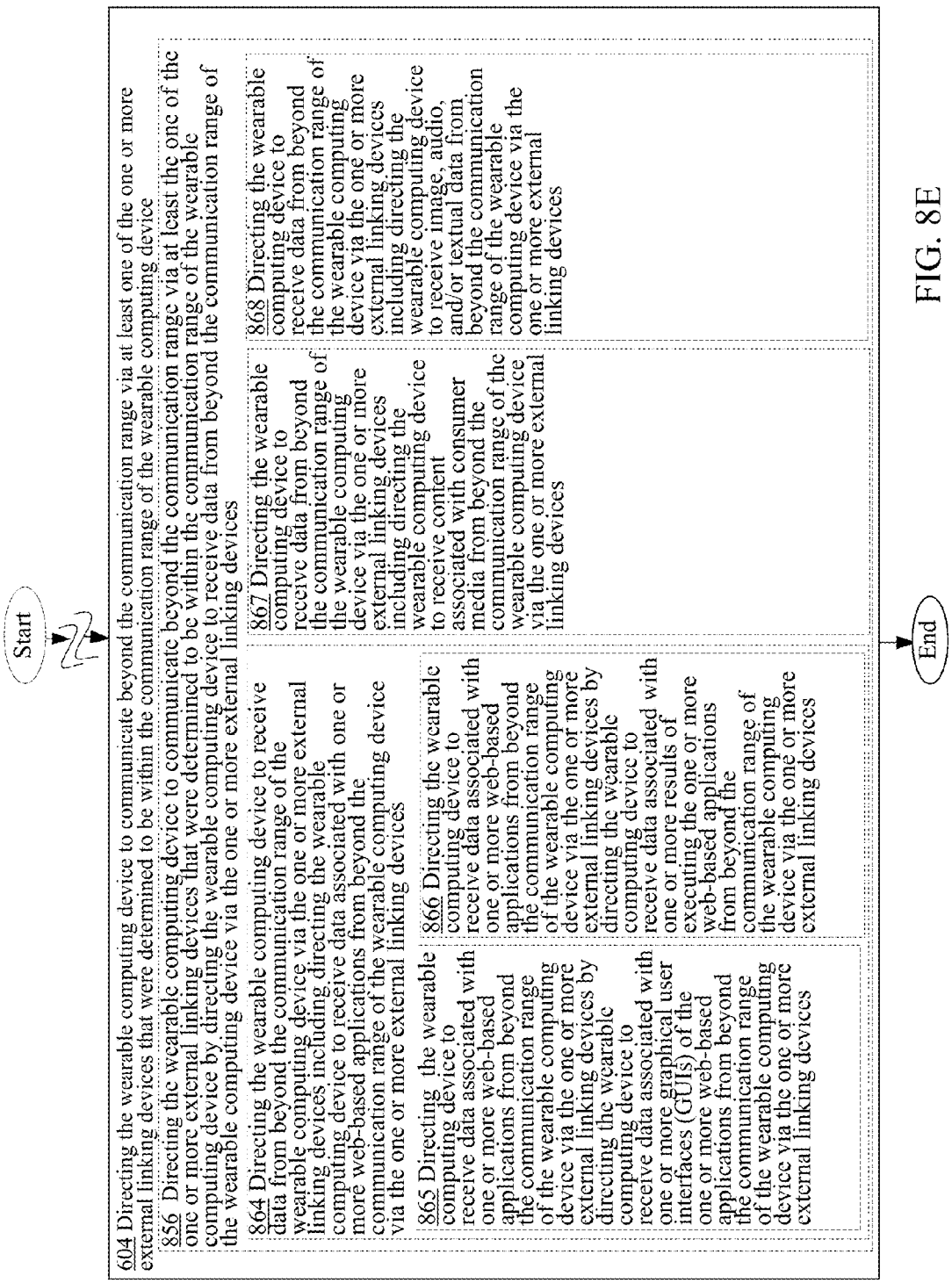
FIG. 8E is a high-level logic flowchart of a process depicting alternate implementations of the communicating directing operation 604 of FIG. 6.
Figure 8J:
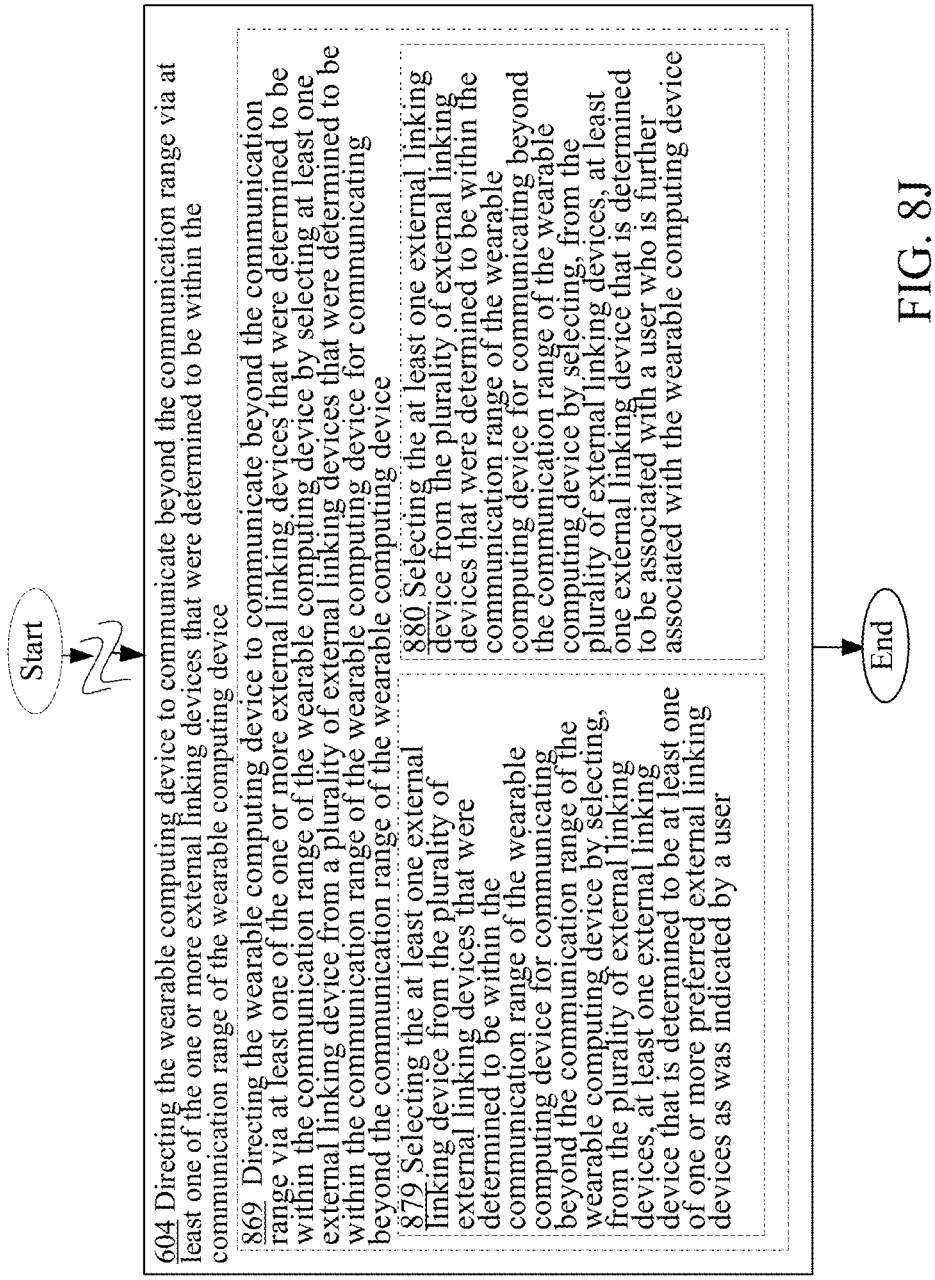
FIG. 8J is a high-level logic flowchart of a process depicting alternate implementations of the communicating directing operation 604 of FIG. 6.

Referring now to FIGS. 8C, 8D, and 8E, in various embodiments, the communicating directing operation 604 may actually include or involve an operation 856 for directing the wearable computing device to communicate beyond the communication range via at least the one of the one or more external linking devices that were determined to be within the communication range of the wearable computing device by directing the wearable computing device to receive data from beyond the communication range of the wearable computing device via the one or more external linking devices. For instance, the communicating device controlling module 104* including the data receiving device controlling module 536 (see FIG. 5B) of the wearable computing device 10* of FIG. 4A or 4B directing the wearable computing device 10* to communicate beyond the communication range 50* via at least the one of the one or more external linking devices 20* that were determined to be within the communication range 50* of the wearable computing device when the data receiving device controlling module 536 directs or controls the wearable computing device 10* to receive data (e.g., inbound data 87* of FIG. 2D) from beyond the communication range 50* of the wearable computing device 10* via the one or more external linking devices 20*. In various implementations, the wearable computing device 10* may be made to receive the data (e.g., inbound data 87* of FIG. 2D) by controlling or directing one or more components of the wearable computing device 10* including, for example, a transceiver 118 and/or an antenna 130, to receive one or more signals embodying the data (e.g., inbound data 87*) from the one or more external linking devices 20*.

As further illustrated in FIGS. 8C, 8D, and 8E, operation 856 for controlling or directing the wearable computing device 10* to receive data may actually involve or include one or more additional operations including, in some cases, an operation 857 for directing the wearable computing device to receive data from beyond the communication range of the wearable computing device via the one or more external linking devices by directing the wearable computing device to receive data that is embodied in one or more data signals from the one or more external linking devices as illustrated, for example, in FIG. 8C. For instance the data receiving device controlling module 536 of the wearable computing device 10* of FIG. 4A or 4B directing the wearable computing device 10* to receive data (e.g., inbound data 87*) from beyond the communication range 50* of the wearable computing device 10* via the one or more external linking devices 20* by directing or controlling the wearable computing device 10* to receive data (e.g., inbound data 87*) that is embodied in one or more data signals from the one or more external linking devices 20*. For example, the transceiver 118 and/or the antenna 130 (e.g., directional antenna) of the wearable computing device 10* being configured to receive the data (e.g., inbound data 87* in the form of data signals) from the one or more external linking device 20*.

In some implementations, operation 857 may include an operation 858 for directing the wearable computing device to receive data that is embodied in one or more data signals from the one or more external linking devices by directing the wearable computing device to receive one or more data signals from the one or more external linking devices and having one or more frequencies from a frequency band having a frequency range from 57 GHz to 64 GHz. For instance the data receiving device controlling module 536 of the wearable computing device 10* of FIG. 4A or 4B directing the wearable computing device 10* to receive data that is embodied in one or more data signals from the one or more external linking device 20* by directing or controlling the wearable computing device 10* to receive (e.g., configuring the transceiver 118 to receive) one or more data signals from the one or more external linking devices 20* and having one or more frequencies from a frequency band (e.g., 60 GHz frequency band) having a frequency range from 57 GHz to 64 GHz.

In some implementations, operation 857 may include an operation 859 for directing the wearable computing device to receive data that is embodied in one or more data signals from the one or more external linking devices by directing the wearable computing device to receive one or more data signals from the one or more external linking devices and having one or more frequencies from a frequency band having a frequency range from 2.4 GHz to 2.4835 GHz or a frequency band having a frequency range from 5.180 GHz to 5.825 GHz. For instance the data receiving device controlling module 536 of the wearable computing device 10* of FIG. 4A or 4B directing the wearable computing device 10* to receive data (e.g., inbound data 87*) that is embodied in one or more data signals from the one or more external linking devices 20* by directing or controlling the wearable computing device 10* to receive one or more data signals from the one or more external linking devices 20* and having one or more frequencies from a frequency band (e.g., 2.4 GHz frequency band) having a frequency range from 2.4 GHz to 2.4835 GHz or a frequency band (e.g., 5 GHz frequency band) having a frequency range from 5.180 GHz to 5.825 GHz.

In the same or alternative implementations, operation 856 may additionally or alternatively include an operation 860 for directing the wearable computing device to receive data from beyond the communication range of the wearable computing device via the one or more external linking devices including directing the wearable computing device to receive data associated with one or more electronic messages from beyond the communication range of the wearable computing device via the one or more external linking devices as illustrated, for example, in FIG. 8D. For instance the data receiving device controlling module 536 of the wearable computing device 10* of FIG. 4A or 4B directing the wearable computing device 10* to receive data from beyond the communication range 50* of the wearable computing device 10* via the one or more external linking devices 20* including directing or controlling the wearable computing device 10* to receive data (e.g., inbound data 87*) associated with one or more electronic messages from beyond the communication range 50* of the wearable computing device 10* via the one or more external linking devices 20*. In some implementations, the data associated with the one or more electronic messages may include, for example, data embodying content of the one or more electronic messages, data providing one or more identifiers (e.g., source name or address, source telephone number, and so forth) of the one or more electronic messages, data providing one or more titles/subject headings of the one or more electronic messages if there are any, and/or other types of data/information that may be associated with the one or more electronic messages.

As further illustrated in FIG. 8D, in some implementations, operation 860 may actually include an operation 861 for directing the wearable computing device to receive data associated with one or more electronic messages from beyond the communication range of the wearable computing device via the one or more external linking devices by directing the wearable computing device to receive data that is associated with at least one of an email, an instant message (IM), a text message, and/or an audio message from beyond the communication range of the wearable computing device via the one or more external linking devices. For instance the data receiving device controlling module 536 of the wearable computing device 10* of FIG. 4A or 4B directing the wearable computing device 10* to receive data associated with one or more electronic messages from beyond the communication range 50* of the wearable computing device 10* via the one or more external linking devices 20* by directing or controlling the wearable computing device 10* to receive data that is associated with at least one of an email, an IM, a text message, and/or an audio message (e.g., a telephone call via VoIP) from beyond the communication range 50* of the wearable computing device 10* via the one or more external linking devices 20*.

In the same or alternative implementations, operation 860 may additionally or alternatively include an operation 862 for directing the wearable computing device to receive data associated with one or more electronic messages from beyond the communication range of the wearable computing device via the one or more external linking devices by directing the wearable computing device to receive data that identifies the one or more electronic messages from beyond the communication range of the wearable computing device via the one or more external linking devices. For instance the data receiving device controlling module 536 of the wearable computing device 10* of FIG. 4A or 4B directing the wearable computing device 10* to receive data (e.g., inbound data 87*) associated with one or more electronic messages from beyond the communication range 50* of the wearable computing device 10* via the one or more external linking devices 20* by directing or controlling the wearable computing device 10* to receive data (e.g., inbound data 87*) that identifies the one or more electronic messages from beyond the communication range 50* of the wearable computing device 10* via the one or more external linking devices 20*.

In the same or alternative implementations, operation 860 may additionally or alternatively include an operation 863 for directing the wearable computing device to receive data associated with one or more electronic messages from beyond the communication range of the wearable computing device via the one or more external linking devices by directing the wearable computing device to receive data that includes the one or more electronic messages from beyond the communication range of the wearable computing device via the one or more external linking devices. For instance the data receiving device controlling module 536 of the wearable computing device 10* of FIG. 4A or 4B directing the wearable computing device 10* to receive data associated with one or more electronic messages from beyond the communication range 50* of the wearable computing device 10* via the one or more external linking devices 20* by directing or controlling the wearable computing device 10* to receive data that includes the one or more electronic messages from beyond the communication range 50* of the wearable computing device 10* via the one or more external linking devices 20*.

In the same or alternative implementations, operation 856 may additionally or alternatively include an operation 864 for directing the wearable computing device to receive data from beyond the communication range of the wearable computing device via the one or more external linking devices including directing the wearable computing device to receive data associated with one or more web-based applications from beyond the communication range of the wearable computing device via the one or more external linking devices. For instance the data receiving device controlling module 536 of the wearable computing device 10* of FIG. 4A or 4B directing the wearable computing device 10* to receive data from beyond the communication range 50* of the wearable computing device 10* via the one or more external linking devices 20* including directing or controlling the wearable computing device 10* (e.g., configuring a transceiver 118) to receive data (e.g., inbound data 87*) associated with one or more web-based applications (e.g., productivity applications such as word processing application, gaming applications, personal manager applications such as Microsoft Outlook, and so forth) from beyond the communication range 50* of the wearable computing device 10* via the one or more external linking devices 20*.

Turning now to FIG. 8E, in various implementations, operation 864 may actually include or involve an operation 865 for directing the wearable computing device to receive data associated with one or more web-based applications from beyond the communication range of the wearable computing device via the one or more external linking devices by directing the wearable computing device to receive data associated with one or more graphical user interfaces (GUIs) of the one or more web-based applications from beyond the communication range of the wearable computing device via the one or more external linking devices. For instance the data receiving device controlling module 536 of the wearable computing device 10* of FIG. 4A or 4B directing the wearable computing device 10* to receive data (e.g., inbound data 87*) associated with one or more web-based applications from beyond the communication range 50* of the wearable computing device 10\* via the one or more external linking devices 20\* by directing or controlling the wearable computing device 10\* to receive data associated with one or more GUIs (e.g., data for generating the one or more GUIs) of the one or more web-based applications from beyond the communication range 50\* of the wearable computing device 10\* via the one or more external linking devices 20\*.

In the same or alternative implementations, operation 864 may additionally or alternatively include an operation 866 for directing the wearable computing device to receive data associated with one or more web-based applications from beyond the communication range of the wearable computing device via the one or more external linking devices by directing the wearable computing device to receive data associated with one or more results of executing the one or more web-based applications from beyond the communication range of the wearable computing device via the one or more external linking devices. For instance the data receiving device controlling module 536 of the wearable computing device 10\* of FIG. 4A or 4B directing the wearable computing device 10\* to receive data (e.g., inbound data 87\*) associated with one or more web-based applications from beyond the communication range 50\* of the wearable computing device 10\* via the one or more external linking devices 20\* by directing or controlling the wearable computing device 10\* to receive data associated with one or more results of executing the one or more web-based applications (e.g., word processing or spreadsheet applications, gaming applications, search engines, and so forth) from beyond the communication range 50\* of the wearable computing device 10\* via the one or more external linking devices 20\*.

In the same or alternative implementations, operation 856 may additionally or alternatively include an operation 867 for directing the wearable computing device to receive data from beyond the communication range of the wearable computing device via the one or more external linking devices including directing the wearable computing device to receive content associated with consumer media from beyond the communication range of the wearable computing device via the one or more external linking devices. For instance the data receiving device controlling module 536 of the wearable computing device 10\* of FIG. 4A or 4B directing the wearable computing device 10\* to receive data (e.g., inbound data 87\*) from beyond the communication range 50\* of the wearable computing device 10\* via the one or more external linking devices 20\* including directing or controlling the wearable computing device 10\* to receive content associated with consumer media (e.g., news, digital novels, movies, and so forth) from beyond the communication range 50\* of the wearable computing device 10\*via the one or more external linking devices 20\*.

In the same or alternative implementations, operation 856 may additionally or alternatively include an operation 868 for directing the wearable computing device to receive data from beyond the communication range of the wearable computing device via the one or more external linking devices including directing the wearable computing device to receive image, audio, and/or textual data from beyond the communication range of the wearable computing device via the one or more external linking devices. For instance the data receiving device controlling module 536 of the wearable computing device 10\* of FIG. 4A or 4B directing the wearable computing device 10\* to receive data (e.g., inbound data 87\*) from beyond the communication range 50\* of the wearable computing device 10\* via the one or more external linking devices 20\* including directing or controlling the wearable computing device 10\* (e.g., directing the transceiver 118 of the wearable computing device 10\*) to receive image, audio, and/or textual data from beyond the communication range 50\* of the wearable computing device 10\* via the one or more external linking devices 20\*.

In some cases when multiple external linking devices 20\* are detected within the communication range 50\* of the wearable computing device 10\*, a selection operation may be implemented in order to select at least one of the plurality external linking devices 20\* that were detected within the communication range 50\* for use by the wearable computing device 10\* in communicating beyond the communication range 50\* of the wearable computing device 10\*. For example, and turning now to FIGS. 8F, 8G, 8H, and 8J, in various implementations, the communicating directing operation 604 may include an operation 869 for directing the wearable computing device to communicate beyond the communication range via at least one of the one or more external linking devices that were determined to be within the communication range of the wearable computing device by selecting at least one external linking device from a plurality of external linking devices that were determined to be within the communication range of the wearable computing device for communicating beyond the communication range of the wearable computing device. For instance the communicating device controlling module 104\* including the external linking device choosing module 538 (see FIG. 5B) of the wearable computing device 10\* of FIG. 4A or 4B directing the wearable computing device 10\* to communicate beyond the communication range 50\* via at least one of the one or more external linking devices 20\* that were determined to be within the communication range 50\* of the wearable computing device 10\* by selecting or choosing at least one external linking device 20\* from a plurality of external linking devices 20\* that were determined to be within the communication range 50\* of the wearable computing device 10\* for communicating beyond the communication range 50\* of the wearable computing device 10\*.

As further illustrated in FIGS. 8F, 8G, 8H, and 8J, operation 869 may actually include or involve one or more additional operations including, in some cases, an operation 870 for selecting the at least one external linking device from the plurality of external linking devices that were determined to be within the communication range of the wearable computing device for communicating beyond the communication range of the wearable computing device by selecting, from the plurality of external linking devices, at least one external linking device that requires least amount of power to communicate with by the wearable computing device from amongst the plurality of external linking devices that were determined to be within the communication range of the wearable computing device. For instance the external linking device choosing module 538 including the minimum power requirement device choosing module 540 (see FIG. 5B) of the wearable computing device 10\* of FIG. 4A or 4B selecting the at least one external linking device 20\* from the plurality of external linking devices 20\* that were determined to be within the communication range 50\* of the wearable computing device 10\* for communicating beyond the communication range 50\* of the wearable computing device 10\* when the minimum power requirement device choosing module 540 selects or chooses, from the plurality of external linking devices 20\*, at least one external linking device 20\* that requires least amount of power to communicate with by the wearable computing device 10\* from amongst the plurality of external linking devices 20\* that were determined to be within the communication range 50\* of the wearable computing device 10\*. For example, selecting an external linking device 20* that is nearest to the wearable computing device 10* in order to minimize the power requirements for transmitting data signals that are destined for beyond the communication range 50* of the wearable computing device 10* via the "nearest" external linking device 20*.

As further illustrated in FIG. 8F, in some implementations, operator 870 may further include or involve an operation 871 for selecting, from the plurality of external linking devices, the at least one external linking device that requires least amount of power to communicate with by the wearable computing device from amongst the plurality of external linking devices that were determined to be within the communication range of the wearable computing device by selecting, from the plurality of external linking devices, at least one external linking device that transmitted one or more signals that were received by the wearable computing device with greatest signal strength or strengths compared to the signal strength or strengths of one or more other signals received by the wearable computing device that were transmitted by one or more other external linking devices that were determined to be within the communication range of the wearable computing device. For instance, the minimum power requirement device choosing module 540 including the signal strength ascertaining module 842 (see FIG. 5B) of the wearable computing device 10* of FIG. 4A or 4B selecting, from the plurality of external linking devices 20*, the at least one external linking device 20* that requires least amount of power to communicate with by the wearable computing device 10* from amongst the plurality of external linking devices 20* that were determined to be within the communication range 50* of the wearable computing device 10* by selecting or choosing, from the plurality of external linking devices 20*, at least one external linking device 20* that transmitted one or more signals that were received by the wearable computing device 10* with greatest signal strength or strengths as determined by the signal strength ascertaining module 842 compared to the signal strength or strengths of one or more other signals received by the wearable computing device 10* that were transmitted by one or more other external linking devices 20* that were determined to be within the communication range 50* of the wearable computing device 10*.

In the same or alternative implementations, operation 870 may additionally or alternatively include an operation 872 for selecting, from the plurality of external linking devices, the at least one external linking device that requires least amount of power to communicate with by the wearable computing device from amongst the plurality of external linking devices that were determined to be within the communication range of the wearable computing device by selecting, from the plurality of external linking devices, at least one external linking device that require least amount of power to successfully transmit data to by the wearable computing device from amongst the plurality of external linking devices that were determined to be within the communication range of the wearable computing device and that can be communicated with by the wearable computing device using one or more frequencies from a frequency band having a range between 57 GHz to 64 GHz. For instance, the minimum power requirement device choosing module 540 of the wearable computing device 10* of FIG. 4A or 4B selecting, from the plurality of external linking devices 20*, the at least one external linking device 20* that requires least amount of power to communicate with by the wearable computing device 10* from amongst the plurality of external linking devices 20* that were determined to be within the communication range 50* of the wearable computing device 10* by selecting or choosing, from the plurality of external linking devices 20*, at least one external linking device 20* that require least amount of power to successfully transmit data to by the wearable computing device 10* from amongst the plurality of external linking devices 20* that were determined to be within the communication range 50* of the wearable computing device 10* and that can be communicated with by the wearable computing device 10* using one or more frequencies from a frequency band having a range between 57 GHz to 64 GHz. There are a number of ways that may be implemented in order to determine whether a particular external linking device 20* that has been determined to be within the communication range 50* of the wearable computing device 10* is capable of being communicated with using a particular frequency band. One way, for example, is to simply direct the wearable computing device 10* to transmit to the particular external linking device 20* one or more low-power query signals 84 using the specific frequency band and waiting to see if the particular linking device 20* responds to the one or more low-power query signals 84.

In the same or alternative implementations, operation 870 may additionally or alternatively include an operation 873 for selecting, from the plurality of external linking devices, the at least one external linking device that requires least amount of power to communicate with by the wearable computing device from amongst the plurality of external linking devices by selecting, from the plurality of external linking devices, the at least one external linking device based, at least in part, on responsive signals transmitted by the plurality of external linking devices in response to the external linking devices detecting one or more low-power prompting signals that were transmitted by the wearable computing device at different levels of transmit powers as illustrated, for example, in FIG. 8G. For instance, the minimum power requirement device choosing module 540 of the wearable computing device 10* of FIG. 4A or 4B selecting, from the plurality of external linking devices 20*, the at least one external linking device 20* that requires least amount of power to communicate with by the wearable computing device 10* from amongst the plurality of external linking devices 20* by selecting or choosing, from the plurality of external linking devices 20*, the at least one external linking device 20* based, at least in part, on responsive signals (e.g., one or more signals 80 of FIG. 1C) transmitted by the plurality of external linking devices 20* in response to the external linking devices 20* detecting one or more low-power prompting signals 82 that were transmitted by the wearable computing device 10* at different levels of transmit powers. In some embodiments, an inference can be made that the external linking device 20* that responds to the one or more low-power prompting signals 82 at the lowest transmit power (as opposed to a responding to the one or more low-power prompting signals 82 transmitted at higher transmit power) may require least amount of power to communicate with by the wearable computing device 10*.

As further illustrated in FIG. 8G, operation 873 may further include or involve an operation 874 for selecting, from the plurality of external linking devices, the at least one external linking device based, at least in part, on a determination that the at least one external linking device from the plurality of external linking devices responded earliest to one or more low-power prompting signals that were transmitted by the wearable computing device at incrementally increasing levels of transmit power, where the at least one external linking device responding to the one or more low-power prompting signals that were transmitted by the wearable computing device at incrementally increasing levels of transmit power by transmitting one or more responsive signals back to the wearable computing device. For instance the minimum power requirement device choosing module 540 of the wearable computing device 10* of FIG. 4A or 4B selecting, from the plurality of external linking devices 20*, the at least one external linking device 20* based, at least in part, on a determination (e.g., as determined by, for example, the responsive signal ascertaining module 504) that the at least one external linking device 20* from the plurality of external linking devices 20* responded earliest to one or more low-power prompting signals 82 that were transmitted by the wearable computing device 10* at incrementally increasing levels of transmit power, where the at least one external linking device 20* responding to the one or more low-power prompting signals 82 that were transmitted by the wearable computing device 10* at incrementally increasing levels of transmit power by transmitting one or more responsive signals (e.g., one or more signals 80) back to the wearable computing device 10*.

Turning to FIG. 8H, in various implementations, operation 869 may include or involve an operation 875 for selecting the at least one external linking device from the plurality of external linking devices that were determined to be within the communication range of the wearable computing device for communicating beyond the communication range of the wearable computing device by selecting, from the plurality of external linking devices, at least one external linking device that was determined to provide earliest access to one or more communication links to beyond the communication range of the wearable computing device amongst the plurality of external linking devices. For instance the external linking device choosing module 538 including the earliest access providing device choosing module 544 (see FIG. 5B) of the wearable computing device 10* of FIG. 4A or 4B selecting the at least one external linking device 20* from the plurality of external linking devices 20* that were determined to be within the communication range 50* of the wearable computing device 10* for use in communicating beyond the communication range 50* of the wearable computing device 10* when the earliest access providing device choosing module 544 selects or chooses, from the plurality of external linking devices 20*, at least one external linking device 20* that was determined to provide earliest access to one or more communication links (e.g., a Wi-Fi link, a cellular data network link, Ethernet, and so forth) to beyond the communication range 50* of the wearable computing device 10* amongst the plurality of external linking devices 20*.

In some cases, operation 875 may further include or involve an operation 876 for selecting, from the plurality of external linking devices, the at least one external linking device that was determined to provide earliest access to one or more communication links to beyond the communication range of the wearable computing device amongst the plurality of external linking devices, the determination that the at least one external linking device provides earliest access to one or more communication links to beyond the communication range of the wearable computing device by querying the at least one external linking device to provide one or more indications as to when the access to one or more communication links will be available for use by the wearable computing device. For instance the earliest access providing device choosing module 544 including the access querying module 546 (see FIG. 5B) of the wearable computing device 10* of FIG. 4A or 4B selecting, from the plurality of external linking devices 20*, the at least one external linking device 20* that was determined to provide earliest access to one or more communication links to beyond the communication range 50* of the wearable computing device 10* amongst the plurality of external linking devices 20*, the determination that the at least one external linking device 20* provides earliest access to one or more communication links 50* to beyond the communication range 50* of the wearable computing device 10* by querying (e.g., transmitting one or more low power querying signals 84 embodying one or more queries as illustrated, for example, in FIG. 1C) the at least one external linking device 20* to provide one or more indications (e.g., via one or more confirmation signals 85) as to when the access to one or more communication links will be available for use by the wearable computing device 10*.

In the same or alternative implementations, operation 869 may additionally or alternatively include an operation 877 for selecting the at least one external linking device from the plurality of external linking devices that were determined to be within the communication range of the wearable computing device for communicating beyond the communication range of the wearable computing device by selecting, from the plurality of external linking devices, at least one external linking device that was determined to provide access to one or more communication links with highest data transfer rate to beyond the communication range of the wearable computing device amongst the plurality of external linking devices. For instance the external linking device choosing module 538 including the highest data rate device choosing module 548 (see FIG. 5B) of the wearable computing device 10* of FIG. 4A or 4B selecting the at least one external linking device 20* from the plurality of external linking devices 20* that were determined to be within the communication range 50* of the wearable computing device 10* for communicating beyond the communication range 50* of the wearable computing device 10* when the highest data rate device choosing module 548 selects or chooses, from the plurality of external linking devices 20*, at least one external linking device 20* that was determined to provide access to one or more communication links (e.g., a Wi-Fi link, a cellular data network link, Ethernet, and so forth) with highest data transfer rate to beyond the communication range 50* of the wearable computing device 10* amongst the plurality of external linking devices 20*.

In some implementations, operation 877 may, in turn, further include or involve an operation 878 for selecting, from the plurality of external linking devices, the at least one external linking device that was determined to provide access to one or more communication links with the highest data transfer rate to beyond the communication range of the wearable computing device amongst the plurality of external linking devices, the determination that the at least one external linking device provides access to one or more communication links that have the highest data transfer rate to beyond the communication range of the wearable computing device amongst the plurality of external linking devices is by querying the at least one external linking device to provide one or more indications as to the data transfer rate of the one or more communication links available through the at least one external linking device. For instance the highest data rate device choosing module 548 including the data transfer rate querying module 550 (see FIG. 5B) of the wearable computing device 10* of FIG. 4A or 4B selecting, from the plurality of external linking devices 20*, the at least one external linking device 20* that was determined to provide access to one or more communication links with the highest data transfer rate to beyond the communication range 50* of the wearable computing device 10* amongst the plurality of external linking devices 20*, the determination that the at least one external linking device 20* provides access to one or more communication links that have the highest data transfer rate to beyond the communication range 50* of the wearable computing device 10\* amongst the plurality of external linking devices 20\* is by having the data transfer rate querying module 550, via one or more low-power query signals 84, query the at least one external linking device 20\* to provide one or more indications as to the data transfer rate of the one or more communication links available through the at least one external linking device 20\*.

In the same or alternative implementations, operation 869 may additionally or alternatively include an operation 879 for selecting the at least one external linking device from the plurality of external linking devices that were determined to be within the communication range of the wearable computing device for communicating beyond the communication range of the wearable computing device by selecting, from the plurality of external linking devices, at least one external linking device that is determined to be at least one of one or more preferred external linking devices as was indicated by a user. For instance the external linking device choosing module 538 including the preferred device choosing module 552 (see FIG. 5B) of the wearable computing device 10\* of FIG. 4A or 4B selecting the at least one external linking device 20\* from the plurality of external linking devices 20\* that were determined to be within the communication range 50\* of the wearable computing device 10\* for communicating beyond the communication range 50\* of the wearable computing device 10\* when the preferred device choosing module 552 selects or chooses, from the plurality of external linking devices 20\*, at least one external linking device 20\* that is determined to be at least one of one or more preferred external linking devices 20\* as was indicated by a user. That is, a user may identify certain external linking devices 20\* or certain types of external linking devices 20\* that the user prefers to use for communicating beyond the communication range 50\* of the wearable computing device 10\*. Thus, based on the identification inputted by a user, the preferred device choosing module 552 may select one or more specific external linking devices 20\* for communicating beyond the communication range 50\* of the wearable computing device 10\*.

In the same or alternative implementations, operation 869 may additionally or alternatively include an operation 880 for selecting the at least one external linking device from the plurality of external linking devices that were determined to be within the communication range of the wearable computing device for communicating beyond the communication range of the wearable computing device by selecting, from the plurality of external linking devices, at least one external linking device that is determined to be associated with a user who is further associated with the wearable computing device. For instance the external linking device choosing module 538 including the common user associated device choosing module 554 (see FIG. 5B) of the wearable computing device 10\* of FIG. 4A or 4B selecting the at least one external linking device 20\* from the plurality of external linking devices 20\* that were determined to be within the communication range 50\* of the wearable computing device 10\* for communicating beyond the communication range 50\* of the wearable computing device 10\* when the common user associated device choosing module 554 selects or chooses, from the plurality of external linking devices 20\*, at least one external linking device 20\* that is determined to be associated with a user who is further associated with the wearable computing device 10\*.

Figure 9:
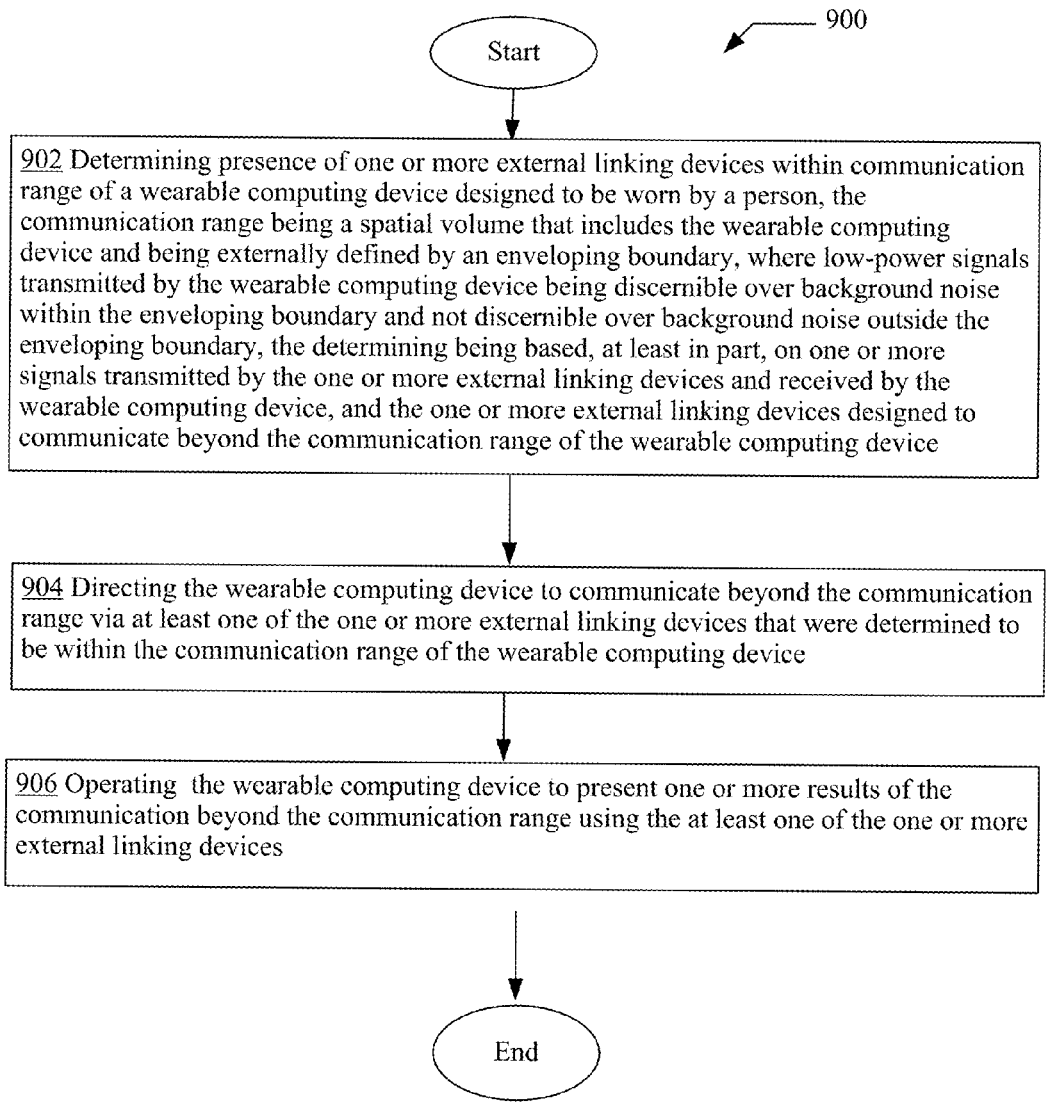
FIG. 9 is another high-level logic flowchart of another process, e.g., operational flow 900, according to some embodiments.

Turning now to FIG. 9 illustrating another operational flow 900. Operational flow 900 includes certain operations that mirror the operations included in operational flow 600 of FIG. 6. These operations include an external linking device presence determining operation 902 and a communicating directing operation 904 that corresponds to and mirrors the external linking device presence determining operation 602 and the communicating directing operation 604, respectively, of FIG. 6.

In addition, operational flow 900 further includes a presenting device operating operation 906 for operating the wearable computing device to present one or more results of the communication beyond the communication range using the at least one of the one or more external linking devices. For instance, the presenting device controlling module 106\* of the wearable computing device 10\* of FIG. 4A or 4B operating or controlling the wearable computing device 10\* to present one or more results (e.g., an email, a telephone call, result of executing a web-based application, consumer media such as a movie, and so forth) of the communication beyond the communication range 50\* using the at least one of the one or more external linking devices 20\*.

Figure 10A:
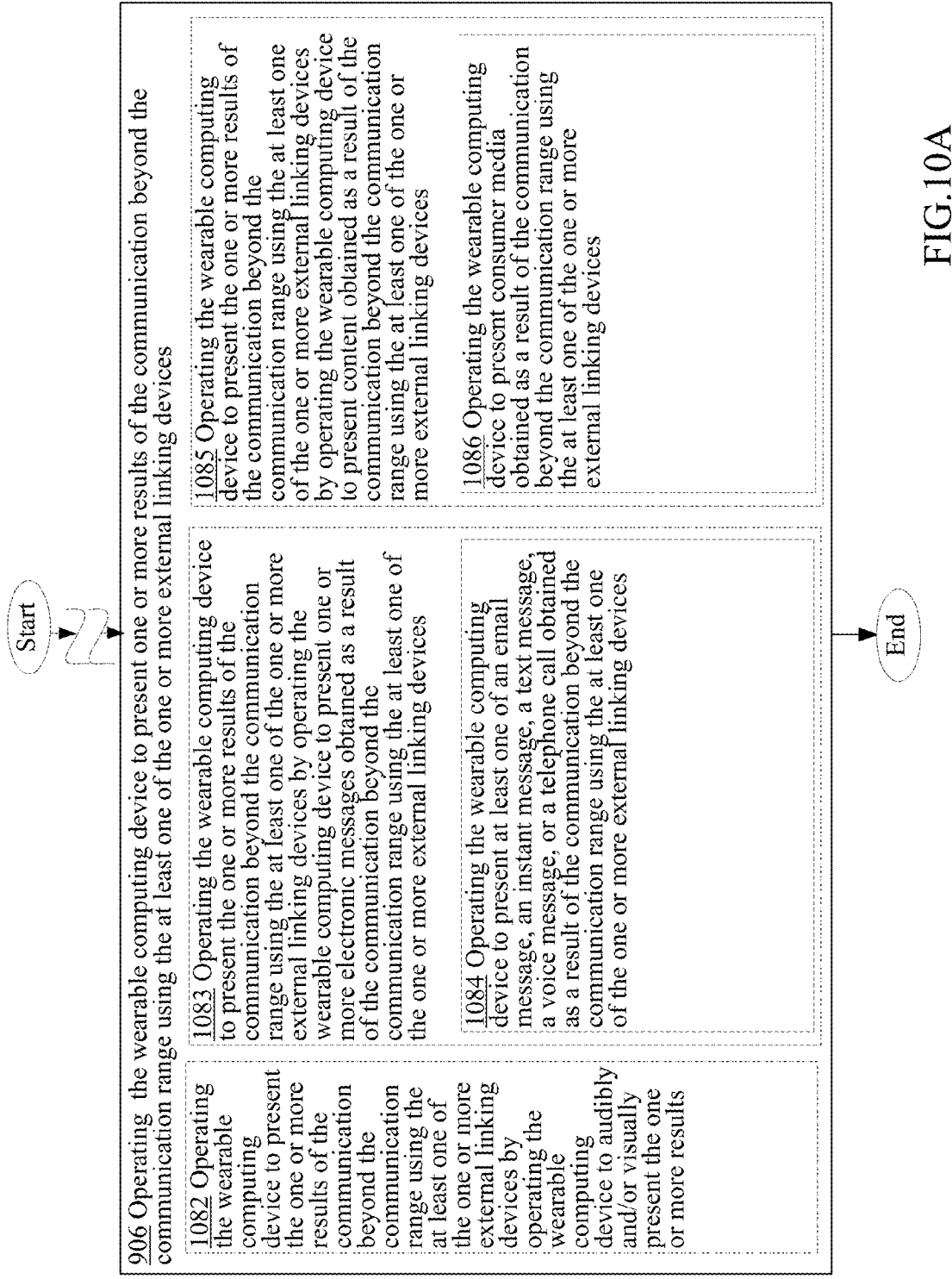
FIG. 10A is a high-level logic flowchart of a process depicting alternate implementations of the presenting device operating operation 906 of FIG. 9.
Figure 10B:
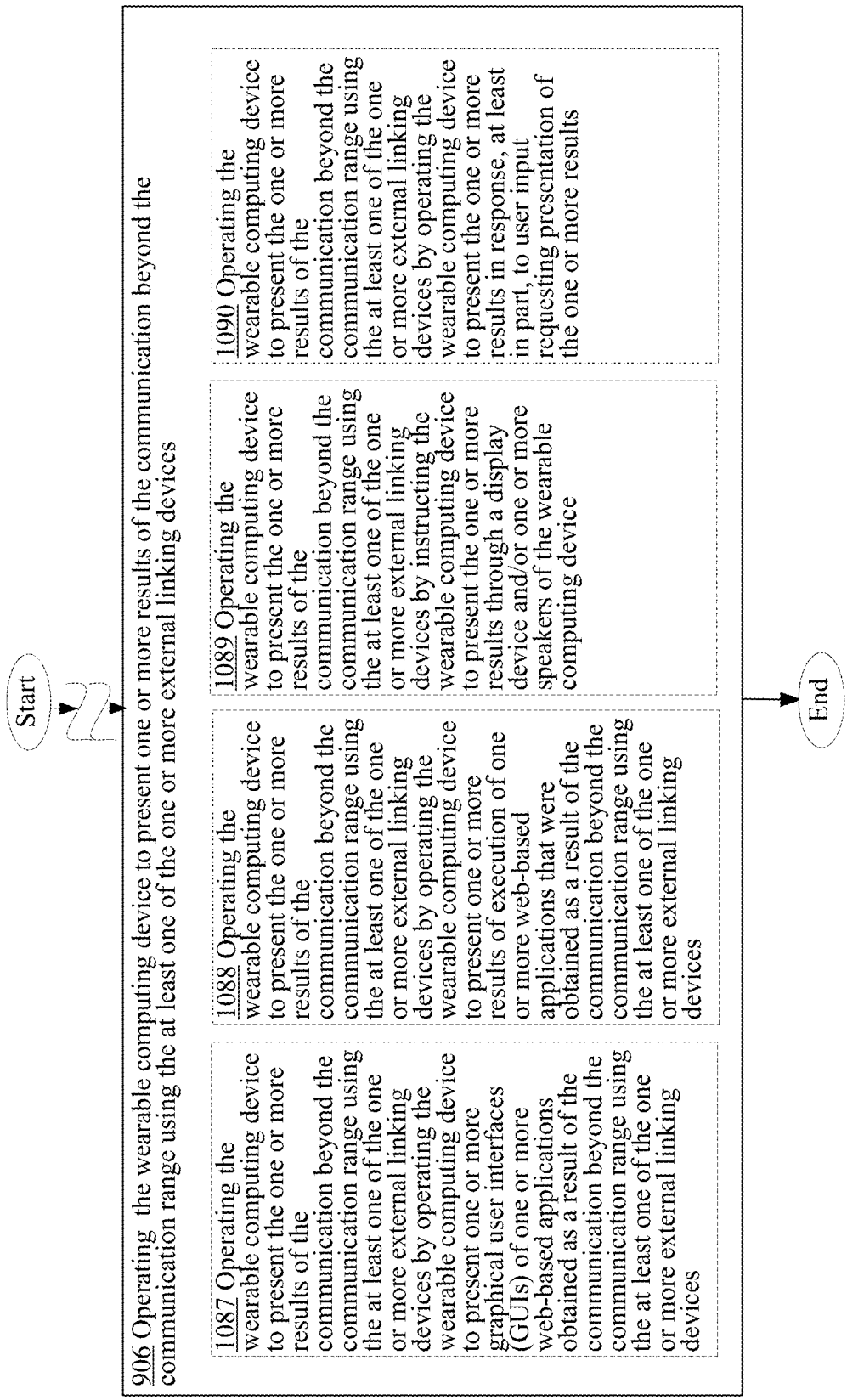
FIG. 10B is a high-level logic flowchart of a process depicting alternate implementations of the presenting device operating operation 906 of FIG. 9.

As further illustrated in FIGS. 10A and 10*b*, the presenting device operating operation 906 of FIG. 9 may be implemented in a variety of different ways in various alternative implementations. For example, in various implementations, the presenting device operating operation 906 may actually include or involve an operation 1082 for operating the wearable computing device to present the one or more results of the communication beyond the communication range using the at least one of the one or more external linking devices by operating the wearable computing device to audibly and/or visually present the one or more results. For instance, the presenting device controlling module 106\* of the wearable computing device 10\* of FIG. 4A or 4B operating the wearable computing device 10\* to present the one or more results of the communication beyond the communication range 50\* using the at least one of the one or more external linking devices 20\* by operating or controlling the wearable computing device 10\* to audibly and/or visually present the one or more results.

In the same or alternative implementations, the presenting device operating operation 906 may include or involve an operation 1083 for operating the wearable computing device to present the one or more results of the communication beyond the communication range using the at least one of the one or more external linking devices by operating the wearable computing device to present one or more electronic messages obtained as a result of the communication beyond the communication range using the at least one of the one or more external linking devices. For instance, the presenting device controlling module 106\* including the electronic message presenting device controlling module 560 (see FIG. 8C) of the wearable computing device 10\* of FIG. 4A or 4B operating the wearable computing device 10\* to present the one or more results of the communication beyond the communication range 50\* using the at least one of the one or more external linking devices 20\* when the electronic message presenting device controlling module 560 operates or controls (e.g., configures) the wearable computing device 10\* to audibly and/or visually present one or more electronic messages obtained as a result of the communication beyond the communication range 50\* using the at least one of the one or more external linking devices 20\*.

In some implementations, operation 1083 may further include or involve an operation 1084 for operating the wearable computing device to present at least one of an email message, an instant message, a text message, a voice message, or a telephone call obtained as a result of the communication beyond the communication range using the at least one of the one or more external linking devices. For instance, the electronic message presenting device controlling module 560 of the wearable computing device 10* of FIG. 4A or 4B operating the wearable computing device 10* to present at least one of an email message, an instant message, a text message, a voice message, or a telephone call obtained as a result of the communication beyond the communication range 50* using the at least one of the one or more external linking devices 20*.

In some implementations, the presenting device operating operation 906 may include or involve an operation 1085 for operating the wearable computing device to present the one or more results of the communication beyond the communication range using the at least one of the one or more external linking devices by operating the wearable computing device to present content obtained as a result of the communication beyond the communication range using the at least one of the one or more external linking devices. For instance, the electronic message presenting device controlling module 560 including the content presenting device controlling module 562 (see FIG. 5C) of the wearable computing device 10* of FIG. 4A or 4B operating the wearable computing device 10* to present the one or more results of the communication beyond the communication range 50* using the at least one of the one or more external linking devices 20* when the content presenting device controlling module 562 operates or controls the wearable computing device 10* to present content obtained as a result of the communication beyond the communication range 50* using the at least one of the one or more external linking devices 20*.

In some cases, operation 1085 may further include or involve an operation 1086 for operating the wearable computing device to present consumer media obtained as a result of the communication beyond the communication range using the at least one of the one or more external linking devices. For instance, the content presenting device controlling module 562 of the wearable computing device 10* of FIG. 4A or 4B operating the wearable computing device 10* to present consumer media (e.g., news, movies, digital novels, and so forth) obtained as a result of the communication beyond the communication range 50* using the at least one of the one or more external linking devices 20*.

Turning now to FIG. 10B, in some implementations, the presenting device operating operation 906 may include or involve an operation 1087 for operating the wearable computing device to present the one or more results of the communication beyond the communication range using the at least one of the one or more external linking devices by operating the wearable computing device to present one or more graphical user interfaces (GUIs) of one or more web-based applications obtained as a result of the communication beyond the communication range using the at least one of the one or more external linking devices. For instance, the presenting device controlling module 106* including the GUI presenting device controlling module 564 (see FIG. 5C) of the wearable computing device 10* of FIG. 4A or 4B operating the wearable computing device 10* to present the one or more results of the communication beyond the communication range 50* using the at least one of the one or more external linking devices 20* when the GUI presenting device controlling module 564 operates or controls the wearable computing device 10* to present one or more graphical user interfaces (GUIs) of one or more web-based applications (e.g., productivity applications such as a word processing application and/or a spreadsheet application, gaming applications, search engines, personal information manager applications such as Microsoft Outlook, and so forth) obtained as a result of the communication beyond the communication range 50* using the at least one of the one or more external linking devices 20*.

In the same or alternative implementations, the presenting device operating operation 906 may additionally or alternatively include an operation 1088 for operating the wearable computing device to present the one or more results of the communication beyond the communication range using the at least one of the one or more external linking devices by operating the wearable computing device to present one or more results of execution of one or more web-based applications that were obtained as a result of the communication beyond the communication range using the at least one of the one or more external linking devices. For instance, the electronic message presenting device controlling module 560 including the web-based application result presenting device controlling operating module 565 (see FIG. 5C) of the wearable computing device 10* of FIG. 4A or 4B operating the wearable computing device 10* to present the one or more results of the communication beyond the communication range 50* using the at least one of the one or more external linking devices 20* when the web-based application result presentation presenting device controlling operating module 564 operates or controls the wearable computing device 10* to present one or more results of execution of one or more web-based applications that were obtained as a result of the communication beyond the communication range 50* using the at least one of the one or more external linking devices 20*.

In the same or alternative implementations, the presenting device operating operation 906 may additionally or alternatively include an operation 1089 for operating the wearable computing device to present the one or more results of the communication beyond the communication range using the at least one of the one or more external linking devices by instructing the wearable computing device to present the one or more results through a display device and/or one or more speakers of the wearable computing device. For instance, the electronic message presenting device controlling module 560 including the presenting device instructing module 566 (see FIG. 5C) of the wearable computing device 10* of FIG. 4A or 4B operating the wearable computing device 10* to present the one or more results of the communication beyond the communication range 50* using the at least one of the one or more external linking devices 20* when the presenting device instructing module 566 instructs the wearable computing device 10* to present the one or more results through a display device and/or one or more speakers of the wearable computing device 10*

In the same or alternative implementations, the presenting device operating operation 906 may additionally or alternatively include an operation 1090 for operating the wearable computing device to present the one or more results of the communication beyond the communication range using the at least one of the one or more external linking devices by operating the wearable computing device to present the one or more results in response, at least in part, to user input requesting presentation of the one or more results. For instance, the presenting device controlling module 106* of the wearable computing device 10* of FIG. 4A or 4B operating the wearable computing device 10* to present the one or more results of the communication beyond the communication range 50* using the at least one of the one or more external linking devices 20* by operating or controlling the wearable computing device 10* to present the one or more results in response, at least in part, to user input requesting presentation of the one or more results.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device; and directing the wearable computing device to communicate beyond the communication range via at least one of the one or more external linking devices that were determined to be within the communication range of the wearable computing device.

2. A computationally-implemented system, comprising:

means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device; and means for directing the wearable computing device to communicate beyond the communication range via at least one of the one or more external linking devices that were determined to be within the communication range of the wearable computing device.

3. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining the presence of one or more external linking devices within the communication range of the wearable computing device based, at least in part, on the one or more signals transmitted by the one or more external linking devices including means for determining that the one or more signals that were transmitted by the one or more external linking devices are one or more responsive signals that were transmitted by the one or more external linking devices after the one or more external linking devices received one or more low-power prompting signals from the wearable computing device, the one or more low-power prompting signals that were transmitted by the wearable computing device being discernible over background noise within the enveloping boundary and not discernible over background noise outside the enveloping boundary.

4. The computationally-implemented system of claim 3, wherein said means for determining the presence of one or more external linking devices within the communication range of the wearable computing device based, at least in part, on the one or more signals transmitted by the one or more external linking devices including means for determining that the one or more signals that were transmitted by the one or more external linking devices are one or more responsive signals that were transmitted by the one or more external linking devices after the one or more external linking devices received one or more low-power prompting signals from the wearable computing device, the one or more low-power prompting signals that were transmitted by the wearable computing device being discernible over background noise within the enveloping boundary and not discernible over background noise outside the enveloping boundary comprises:

means for controlling the wearable computing device to transmit to the one or more external linking devices the one or more low-power prompting signals in order to prompt the one or more external linking devices to transmit the one or more responsive signals, the one or more low-power prompting signals being discernible over background noise within the communication range of the wearable computing device and not discernible over background noise outside the communication range of the wearable computing device.

5. The computationally-implemented system of claim 4, wherein said means for controlling the wearable computing device to transmit to the one or more external linking devices the one or more low-power prompting signals in order to prompt the one or more external linking devices to transmit the one or more responsive signals, the one or more low-power prompting signals being discernible over background noise within the communication range of the wearable computing device and not discernible over background noise outside the communication range of the wearable computing device comprises:

means controlling the wearable computing device to transmit to the one or more external linking devices the one or more low-power prompting signals in order to prompt the one or more external linking devices to transmit the one or more responsive signals including means for controlling the wearable computing device to transmit to the one or more external linking devices the one or more low-power prompting signals at different levels of transmit powers.

6. The computationally-implemented system of claim 5, wherein said means for controlling the wearable computing device to transmit to the one or more external linking devices the one or more low-power prompting signals in order to prompt the one or more external linking devices to transmit the one or more responsive signals including means for controlling the wearable computing device to transmit to the one or more external linking devices the one or more low-power prompting signals at different levels of transmit powers comprises:

means for controlling the wearable computing device to transmit to the one or more external linking devices the one or more low-power prompting signals at different levels of transmit powers including means for controlling the wearable computing device to transmit to the one or more external linking devices the one or more low-power prompting signals at different levels of transmit powers not greater than 0.8 milliwatt of transmit power.

7. The computationally-implemented system of claim 5, wherein said means for controlling the wearable computing device to transmit to the one or more external linking devices the one or more low-power prompting signals in order to prompt the one or more external linking devices to transmit the one or more responsive signals including means for controlling the wearable computing device to transmit to the one or more external linking devices the one or more low-power prompting signals at different levels of transmit powers comprises:

means for controlling the wearable computing device to transmit to the one or more external linking devices the one or more low-power prompting signals at different levels of transmit powers including means for controlling the wearable computing device to transmit to the one or more external linking devices the one or more low-power prompting signals at different levels of transmit powers and pausing following each transmission of the one or more low-power prompting signals at each different level of transmit power in order to monitor for the one or more responsive signals.

8. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining the presence of one or more external linking devices within the communication range of the wearable computing device based, at least in part, on the one or more signals transmitted by the one or more external linking devices including means for determining that the one or more signals that were transmitted by the one or more external linking devices are one or more beacon signals that were received by the wearable computing device having one or more signal strengths that were determined to be greater than a predefined amount of signal strength, the one or more beacon signals having been transmitted by the one or more external linking devices with one or more predefined amounts of transmit powers.

9. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining the presence of the one or more external linking devices within the communication range of the wearable computing device including means for determining which one or more specific external linking devices of a plurality of external linking devices that were determined to be within the communication range of the wearable computing device is or are nearest to the wearable computing device based, at least in part, on determined signal strengths of a plurality of signals transmitted by the plurality of external linking devices and received by the wearable computing device.

10. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining the presence of the one or more external linking devices within the communication range of the wearable computing device including means for determining which one or more specific external linking devices of a plurality of external linking devices determined to be present within the communication range of the wearable computing device require least amount of power by the wearable computing device to communicate with among the plurality of the external linking devices that were determined to be present within the communication range of the wearable computing device, the determination as to which of the one or more specific external linking devices requiring least amount of power by the wearable computing device to communicate with being based, at least in part, on determined signal strengths of a plurality of signals transmitted by the plurality of external linking devices and received by the wearable computing device.

11. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining the presence of the one or more external linking devices within the communication range of the wearable computing device including means for determining presence of at least one external linking device within the communication range of the wearable computing device and that is determined to be associated with a common user who is also associated with the wearable computing device.

12. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining presence of the one or more external linking devices within the communication range of a wearable computing device, the communication range being a spatial volume that includes the wearable computing device and being externally defined by an enveloping boundary, where low-power signals generated by the wearable computing device with less than 0.8 milliwatt of transmit power being discernible over background noise within the enveloping boundary and not discernible over background noise outside the enveloping boundary.

13. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining presence of the one or more external linking devices within the communication range of a wearable computing device, the communication range being spatial communication range of the wearable computing device using one or more low-power wireless signals with one or more frequencies from a frequency band between 57 GHz and 64 GHz.

14. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining presence of the one or more external linking devices within the communication range of the wearable computing device including means for determining that the one or more external linking devices provide one or more communication links to beyond the communication range of the wearable computing device.

15. The computationally-implemented system of claim 14, wherein said means for determining presence of the one or more external linking devices within the communication range of the wearable computing device including means for determining that the one or more external linking devices provide one or more communication links to beyond the communication range of the wearable computing device comprises:

means for controlling the wearable computing device to transmit to the one or more external linking devices one or more queries via one or more low-power query signals to obtain from the one or more external linking devices, if the one or more external linking devices provide the one or more communication links to beyond the communication range, one or more confirmations via one or more confirmation signals that confirms that the one or more external linking devices provide the one or more communication links to beyond the communication range; and means for controlling the wearable computing device to receive the one or more confirmation signals.

16. The computationally-implemented system of claim 15, wherein said means for controlling the wearable computing device to transmit to the one or more external linking devices one or more queries via one or more low-power query signals to obtain from the one or more external linking devices, if the one or more external linking devices provide the one or more communication links to beyond the communication range, one or more confirmations via one or more confirmation signals that confirms that the one or more external linking devices provide the one or more communication links to beyond the communication range comprises:

means controlling the wearable computing device to transmit to the one or more external linking devices one or more queries via one or more low-power query signals to obtain from the one or more external linking devices, if the one or more external linking devices provide one or more wireless fidelity (Wi-Fi) links to beyond the communication range, one or more confirmations via one or more confirmation signals that confirms that the one or more external linking devices provide the one or more Wi-Fi links to beyond the communication range of the wearable computing device, the one or more low-power query signals transmitted by the wearable computing device being discernible over background noise within the communication range of the wearable computing device and not discernible over background noise outside the communication range of the wearable computing device.

17. The computationally-implemented system of claim 15, wherein said means for controlling the wearable computing device to transmit to the one or more external linking devices one or more queries via one or more low-power query signals to obtain from the one or more external linking devices, if the one or more external linking devices provide the one or more communication links to beyond the communication range, one or more confirmations via one or more confirmation signals that confirms that the one or more external linking devices provide the one or more communication links to beyond the communication range comprises:

means for controlling the wearable computing device to transmit to the one or more external linking devices the one or more queries via the one or more low-power query signals including means for controlling the wearable computing device to transmit to the one or more external linking devices one or more queries via one or more low-power query signals that queries the one or more external linking devices to provide through the one or more confirmation signals one or more indications as to when, if ever, will the one or more communication links be available for use by the wearable computing device.

18. The computationally-implemented system of claim 15, wherein said means for controlling the wearable computing device to transmit to the one or more external linking devices one or more queries via one or more low-power query signals to obtain from the one or more external linking devices, if the one or more external linking devices provide the one or more communication links to beyond the communication range, one or more confirmations via one or more confirmation signals that confirms that the one or more external linking devices provide the one or more communication links to beyond the communication range comprises:

means for controlling the wearable computing device to transmit to the one or more external linking devices the one or more queries via the one or more low-power query signals including means for controlling the wearable computing device to transmit to the one or more external linking devices one or more queries via one or more low-power query signals that queries the one or more external linking devices to provide one or more indications as to data transfer rate or rates of the one or more communication links.

19. The computationally-implemented system of claim 2, wherein said means for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device comprises:

means for determining the presence of the one or more external linking devices within the communication range of a wearable computing device based, at least in part, on the one or more signals transmitted by the one or more external linking devices including means for controlling the wearable computing device to receive the one or more signals through a directional antenna of the wearable computing device.

20. The computationally-implemented system of claim 19, wherein said means for determining the presence of the one or more external linking devices within the communication range of a wearable computing device based, at least in part, on the one or more signals transmitted by the one or more external linking devices including means for controlling the wearable computing device to receive the one or more signals through a directional antenna of the wearable computing device comprises:

means for controlling the wearable computing device to receive the one or more signals through a directional antenna of the wearable computing device including means for controlling the directional antenna to point away from the body of a user wearing the wearable computing device in order to receive the one or more signals from the one or more external linking devices.

21. The computationally-implemented system of claim 2, wherein said means for directing the wearable computing device to communicate beyond the communication range via at least one of the one or more external linking devices that were determined to be within the communication range of the wearable computing device comprises:

means for directing the wearable computing device to communicate beyond the communication range via at least the one of the one or more external linking devices that were determined to be within the communication range of the wearable computing device including means for directing the wearable computing device to transmit data to beyond the communication range of the wearable computing device via the one or more external linking devices.

22. The computationally-implemented system of claim 21, wherein said means for directing the wearable computing device to communicate beyond the communication range via at least the one of the one or more external linking devices that were determined to be within the communication range of the wearable computing device including means for directing the wearable computing device to transmit data to beyond the communication range of the wearable computing device via the one or more external linking devices comprises:

means for directing the wearable computing device to transmit the data to beyond the communication range of the wearable computing device via the one or more external linking devices including means for directing the wearable computing device to transmit the data to the one or more external linking devices via one or more low-power data signals, the one or more low-power data signals not being discernible over background noise outside the enveloping boundary of the communication range of the wearable computing device.

23. The computationally-implemented system of claim 22 wherein said means for directing the wearable computing device to transmit the data to beyond the communication range of the wearable computing device via the one or more external linking devices including means for directing the wearable computing device to transmit the data to the one or more external linking devices via one or more low-power data signals, the one or more low-power data signals not being discernible over background noise outside the enveloping boundary of the communication range of the wearable computing device comprises:

means for directing the wearable computing device to transmit the one or more low-power data signals to the one or more external linking devices including means for directing the wearable computing device to transmit one or more low-power data signals to the one or more external linking devices through an antenna of the wearable computing device and using less than 0.8 milliwatt of transmit power.

24. The computationally-implemented system of claim 22 wherein said means for directing the wearable computing device to transmit the data to beyond the communication range of the wearable computing device via the one or more external linking devices including means for directing the wearable computing device to transmit the data to the one or more external linking devices via one or more low-power data signals, the one or more low-power data signals not being discernible over background noise outside the enveloping boundary of the communication range of the wearable computing device comprises:

means for directing the wearable computing device to transmit the one or more low-power data signals to the one or more external linking devices including means for directing the wearable computing device to transmit one or more low-power data signals to the one or more external linking devices having one or more frequencies from a frequency band having a frequency range from 57 GHz to 64 GHz.

25. The computationally-implemented system of claim 21, wherein said means for directing the wearable computing device to communicate beyond the communication range via at least the one of the one or more external linking devices that were determined to be within the communication range of the wearable computing device including means for directing the wearable computing device to transmit data to beyond the communication range of the wearable computing device via the one or more external linking devices comprises:

means for directing the wearable computing device to transmit data to beyond the communication range of the wearable computing device via the one or more external linking devices including means for directing the wearable computing device to transmit data that indicates one or more addresses to beyond the communication range of the wearable computing device via the one or more external linking devices.

26. The computationally-implemented system of claim 21, wherein said means for directing the wearable computing device to communicate beyond the communication range via at least the one of the one or more external linking devices that were determined to be within the communication range of the wearable computing device including means for directing the wearable computing device to transmit data to beyond the communication range of the wearable computing device via the one or more external linking devices comprises:

means for directing the wearable computing device to transmit data to beyond the communication range of the wearable computing device via the one or more external linking devices including means for directing the wearable computing device to transmit data that embodies one or more electronic messages to beyond the communication range of the wearable computing device via the one or more external linking devices.

27. The computationally-implemented system of claim 21, wherein said means for directing the wearable computing device to communicate beyond the communication range via at least the one of the one or more external linking devices that were determined to be within the communication range of the wearable computing device including means for directing the wearable computing device to transmit data to beyond the communication range of the wearable computing device via the one or more external linking devices comprises:

means directing the wearable computing device to transmit data to beyond the communication range of the wearable computing device via the one or more external linking devices including means for directing the wearable computing device to transmit audio and/or image data to beyond the communication range of the wearable computing device via the one or more external linking devices.

28. The computationally-implemented system of claim 2, wherein said means for directing the wearable computing device to communicate beyond the communication range via at least one of the one or more external linking devices that were determined to be within the communication range of the wearable computing device comprises:

means for directing the wearable computing device to communicate beyond the communication range via at least the one of the one or more external linking devices that were determined to be within the communication range of the wearable computing device including means for directing the wearable computing device to receive data from beyond the communication range of the wearable computing device via the one or more external linking devices.

29. The computationally-implemented system of claim 28, wherein said means for directing the wearable computing device to communicate beyond the communication range via at least the one of the one or more external linking devices that were determined to be within the communication range of the wearable computing device including means for directing the wearable computing device to receive data from beyond the communication range of the wearable computing device via the one or more external linking devices comprises:

means for directing the wearable computing device to receive data from beyond the communication range of the wearable computing device via the one or more external linking devices including means for directing the wearable computing device to receive data associated with one or more electronic messages from beyond the communication range of the wearable computing device via the one or more external linking devices.

30. The computationally-implemented system of claim 2, wherein said means for directing the wearable computing device to communicate beyond the communication range via at least one of the one or more external linking devices that were determined to be within the communication range of the wearable computing device comprises:

means for directing the wearable computing device to communicate beyond the communication range via at least one of the one or more external linking devices that were determined to be within the communication range of the wearable computing device including means for selecting at least one external linking device from a plurality of external linking devices that were determined to be within the communication range of the wearable computing device for communicating beyond the communication range of the wearable computing device.

31. The computationally-implemented system of claim 30 wherein said means for directing the wearable computing device to communicate beyond the communication range via at least one of the one or more external linking devices that were determined to be within the communication range of the wearable computing device including means for selecting at least one external linking device from a plurality of external linking devices that were determined to be within the communication range of the wearable computing device for communicating beyond the communication range of the wearable computing device comprises:

means for selecting the at least one external linking device from the plurality of external linking devices that were determined to be within the communication range of the wearable computing device for communicating beyond the communication range of the wearable computing device including means for selecting, from the plurality of external linking devices, at least one external linking device that requires least amount of power to communicate with by the wearable computing device from amongst the plurality of external linking devices that were determined to be within the communication range of the wearable computing device.

32. The computationally-implemented system of claim 31, wherein said means for selecting the at least one external linking device from the plurality of external linking devices that were determined to be within the communication range of the wearable computing device for communicating beyond the communication range of the wearable computing device including means for selecting, from the plurality of external linking devices, at least one external linking device that requires least amount of power to communicate with by the wearable computing device from amongst the plurality of external linking devices that were determined to be within the communication range of the wearable computing device comprises:

means for selecting, from the plurality of external linking devices, the at least one external linking device that requires least amount of power to communicate with by the wearable computing device from amongst the plurality of external linking devices that were determined to be within the communication range of the wearable computing device by selecting, from the plurality of external linking devices, at least one external linking device that transmitted one or more signals that were received by the wearable computing device with greatest signal strength or strengths compared to the signal strength or strengths of one or more other signals received by the wearable computing device that were transmitted by one or more other external linking devices that were determined to be within the communication range of the wearable computing device.

33. The computationally-implemented system of claim 31, wherein said means for selecting the at least one external linking device from the plurality of external linking devices that were determined to be within the communication range of the wearable computing device for communicating beyond the communication range of the wearable computing device including means for selecting, from the plurality of external linking devices, at least one external linking device that requires least amount of power to communicate with by the wearable computing device from amongst the plurality of external linking devices that were determined to be within the communication range of the wearable computing device comprises:

means selecting, from the plurality of external linking devices, the at least one external linking device that requires least amount of power to communicate with by the wearable computing device from amongst the plurality of external linking devices including means for selecting, from the plurality of external linking devices, the at least one external linking device based, at least in part, on responsive signals transmitted by the plurality of external linking devices in response to the external linking devices detecting one or more low-power prompting signals that were transmitted by the wearable computing device at different levels of transmit powers.

34. The computationally-implemented system of claim 30 wherein said means for directing the wearable computing device to communicate beyond the communication range via at least one of the one or more external linking devices that were determined to be within the communication range of the wearable computing device including means for selecting at least one external linking device from a plurality of external linking devices that were determined to be within the communication range of the wearable computing device for communicating beyond the communication range of the wearable computing device comprises:

means for selecting the at least one external linking device from the plurality of external linking devices that were determined to be within the communication range of the wearable computing device for communicating beyond the communication range of the wearable computing device including means for selecting, from the plurality of external linking devices, at least one external linking device that was determined to provide earliest access to one or more communication links to beyond the communication range of the wearable computing device amongst the plurality of external linking devices.

35. The computationally-implemented system of claim 30 wherein said means for directing the wearable computing device to communicate beyond the communication range via at least one of the one or more external linking devices that were determined to be within the communication range of the wearable computing device including means for selecting at least one external linking device from a plurality of external linking devices that were determined to be within the communication range of the wearable computing device for communicating beyond the communication range of the wearable computing device comprises:

means for selecting the at least one external linking device from the plurality of external linking devices that were determined to be within the communication range of the wearable computing device for communicating beyond the communication range of the wearable computing device including means for selecting, from the plurality of external linking devices, at least one external linking device that was determined to provide access to one or more communication links with highest data transfer rate to beyond the communication range of the wearable computing device amongst the plurality of external linking devices.

36. The computationally-implemented system of claim 2, further comprising:

means for operating the wearable computing device to present one or more results of the communication beyond the communication range using the at least one of the one or more external linking devices.

37. The computationally-implemented system of claim 36 wherein said means for operating the wearable computing device to present one or more results of the communication beyond the communication range using the at least one of the one or more external linking devices comprises:

means for operating the wearable computing device to present the one or more results of the communication beyond the communication range using the at least one of the one or more external linking devices including means for operating the wearable computing device to present one or more electronic messages obtained as a result of the communication beyond the communication range using the at least one of the one or more external linking devices.

38. The computationally-implemented system of claim 36 wherein said means for operating the wearable computing device to present one or more results of the communication beyond the communication range using the at least one of the one or more external linking devices comprises:

means operating the wearable computing device to present the one or more results of the communication beyond the communication range using the at least one of the one or more external linking devices including means for operating the wearable computing device to present content obtained as a result of the communication beyond the communication range using the at least one of the one or more external linking devices.

39. A system, comprising:

circuitry for determining presence of one or more external linking devices within communication range of a wearable computing device designed to be worn by a person, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, the determining being based, at least in part, on one or more signals transmitted by the one or more external linking devices and received by the wearable computing device, and the one or more external linking devices designed to communicate beyond the communication range of the wearable computing device; and circuitry for directing the wearable computing device to communicate beyond the communication range via at least one of the one or more external linking devices that were determined to be within the communication range of the wearable computing device.

* * * * *

UNITED STATES PATENT AND TRADEMARK OFFICE
CERTIFICATE OF CORRECTION

| | |
|---|---|
| PATENT NO. | : 9,167,407 B2 |
| APPLICATION NO. | : 14/043395 |
| DATED | : October 20, 2015 |
| INVENTOR(S) | : Holman et al. |

It is certified that error appears in the above-identified patent and that said Letters Patent is hereby corrected as shown below:

In the claims

Column 72, line 38, claim 5
"means controlling the wearable computing device" s/b
--means for controlling the wearable computing device--

Column 76, line 40, claim 16
"means controlling the wearable computing device" s/b
--means for controlling the wearable computing device--

Column 79, line 56, claim 27
"means directing the wearable computing device" s/b
--means for directing the wearable computing device--

Column 81, line 43, claim 33
"means selecting, from the plurality" s/b
--means for selecting, from the plurality--

Column 82, line 60, claim 38
"means operating the wearable computing device" s/b
--means for operating the wearable computing device--

Signed and Sealed this
Fifth Day of July, 2016

Michelle K. Lee
*Director of the United States Patent and Trademark Office*